US012673870B2

(12) United States Patent

Gajdardziska-Josifovska et al.

(10) Patent No.: US 12,673,870 B2
(45) Date of Patent: Jul. 7, 2026

(54) GRAPHENE MONOXIDE COMPOSITIONS OF MATTER AND ELECTRODES COMPRISING THEM

(71) Applicant: COnovate, Inc., Shorewood, WI (US)

(72) Inventors: Marija Gajdardziska-Josifovska, Fox Point, WI (US); Marvin Schofield, Milwaukee, WI (US); Yakov Kutsovsky, Arlington, MA (US); Carol J. Hirschmugl, Shorewood, WI (US)

(73) Assignee: COnovate, Inc., Wauwatosa, WI (US)

( * ) Notice: Subject to any disclaimer, the term of this patent is extended or adjusted under 35 U.S.C. 154(b) by 7 days.

(21) Appl. No.: 18/467,034

(22) Filed: Sep. 14, 2023

(65) Prior Publication Data

US 2024/0140805 A1 May 2, 2024

Related U.S. Application Data

(62) Division of application No. 17/148,010, filed on Jan. 13, 2021, now Pat. No. 11,807,535.

(60) Provisional application No. 62/971,074, filed on Feb. 6, 2020.

(51) Int. Cl.
*C01B 32/198* (2017.01)
*B82Y 40/00* (2011.01)

(52) U.S. Cl.
CPC ............. *C01B 32/198* (2017.08); *B82Y 40/00* (2013.01); *C01P 2002/02* (2013.01); *C01P 2004/64* (2013.01); *C01P 2006/12* (2013.01)

(58) Field of Classification Search
CPC ....... C01B 32/198; B82Y 40/00; B82Y 30/00; C01P 2002/02; C01P 2004/64; C01P 2006/12; C01P 2002/07; H01M 4/133; H01M 4/134; H01M 4/136; H01M 4/38; H01M 4/5825; H01M 4/587; H01M 4/625; H01M 10/0525; Y02E 60/10
See application file for complete search history.

(56) References Cited

U.S. PATENT DOCUMENTS

2013/0344390 A1* 12/2013 Chen ......................... C30B 7/00
977/734

OTHER PUBLICATIONS

Mattson, et al., "Evidence of nanocrystalline semiconducting graphene monoxide during thermal reduction of graphene oxide in vacuum," ACS Nano, 2011, pp. 9710-9717, vol. 5, No. 12.
Xiang, et al., "Structural motifs in oxidized graphene: A genetic algorithm study based on density functional theory," Physical Review B 82, 2010, 5 pages, DOI: 10.1103/PhysRevB.82.035416.
Pu, et al., "Strain-induced band-gap engineering of graphene monoxide and its effect on graphene," Physical Review B 87, 2013, 6 pages, DOI: 10.1103/PhysRevB.87.085417.

(Continued)

*Primary Examiner* — Daniel S Gatewood
(74) *Attorney, Agent, or Firm* — Bell & Manning, LLC

(57) ABSTRACT

A composition of graphene-based nanomaterials characterized by at least one area of one atomic layer of graphene monoxide, wherein at least a portion of oxygen molecules present in the graphene monoxide are incorporated into specific crystalline structural moieties, methods of making the same, electrodes in electrochemical devices incorporating the same, and compositions of lithium and graphene monoxide containing materials that result from cycling said electrodes.

18 Claims, 34 Drawing Sheets

A) α-GmO

B). β-GmO

C) γ-GmO

D) δ-GmO

(56) References Cited

OTHER PUBLICATIONS

Qui, et al., "Explosive thermal reduction of graphene oxide-based materials: Mechanism and safety implications," Carbon, 2014, pp. 215-223, vol. 72, https://doi.org/10.1016/j.carbon.2014.02.005.

Xia, et al., "Layer-by-layer assembled MoO2-graphene thin film as a high-capacity and binder-free anode for lithium-ion batteries," Nanoscale, 2012, pp. 4707-4711, vol. 4, DOI: 10.1039/c2nr30742a.

First Examination Report in IN Patent Application No. 202247049258 dated Dec. 12, 2025, 15 pages.

* cited by examiner

A) α-GmO

B). β-GmO

C) γ-GmO

D) δ-GmO

A) 1,3-dioxetane

B) 1,5-dioxacyclooctane

C) 1,4,7-trioxacyclononane

D) 3,5,8,10-tetraoxa-1,6-cyclodecadiene

E) Polycarbonyl chain

| k, 1/A | d, A | I, a.u. |
|--------|------|---------|
| 0.39 | 2.58 | 8 |
| 0.47 | 2.13 | 65 |
| 0.67 | 1.48 | 13 |
| 0.81 | 1.23 | 100 |
| 0.94 | 1.06 | 19 |

A)

B)

C)

A)

(B

| k, 1/A | d, A | I, a.u. |
|--------|------|---------|
| 0.27 | 3.67 | 3 |
| 0.47 | 2.13 | 100 |
| 0.81 | 1.23 | 92 |
| 0.94 | 1.06 | 20 |
| 0.99 | 1.01 | 7 |

C)

(D

E)

| k, 1/A | d, A | I, a.u. |
|--------|------|---------|
| 0.41 | 2.44 | 100 |
| 0.47 | 2.14 | 95 |
| 0.68 | 1.47 | 30 |
| 0.81 | 1.23 | 17 |
| 1.06 | 0.94 | 5 |

A)

B)

| k, 1/A | d, A | l, a.u. |
|--------|------|---------|
| 0.38 | 2.63 | 7 |
| 0.47 | 2.13 | 59 |
| 0.68 | 1.46 | 16 |
| 0.81 | 1.23 | 100 |
| 0.94 | 1.06 | 56 |

C)

(D

E)

A)

B)

| k, 1/A | d, A | I, a.u. |
|---|---|---|
| 0.40 | 2.51 | 10 |
| 0.47 | 2.13 | 93 |
| 0.68 | 1.48 | 9 |
| 0.81 | 1.23 | 100 |
| 0.94 | 1.06 | 18 |

C)

(D

E)

A)

B)

| k, 1/A | d, A | I, a.u. |
|--------|------|---------|
| 0.35 | 2.83 | 4 |
| 0.47 | 2.13 | 83 |
| 0.63 | 1.59 | 2 |
| 0.81 | 1.23 | 100 |
| 0.94 | 1.06 | 23 |

C)

(D

E)

| k, 1/A | d, A | I, a.u. |
|--------|------|---------|
| 0.39 | 2.56 | 7 |
| 0.47 | 2.13 | 67 |
| 0.68 | 1.48 | 12 |
| 0.81 | 1.23 | 100 |
| 0.94 | 1.06 | 17 |

A)

B)

C)

D)

A)
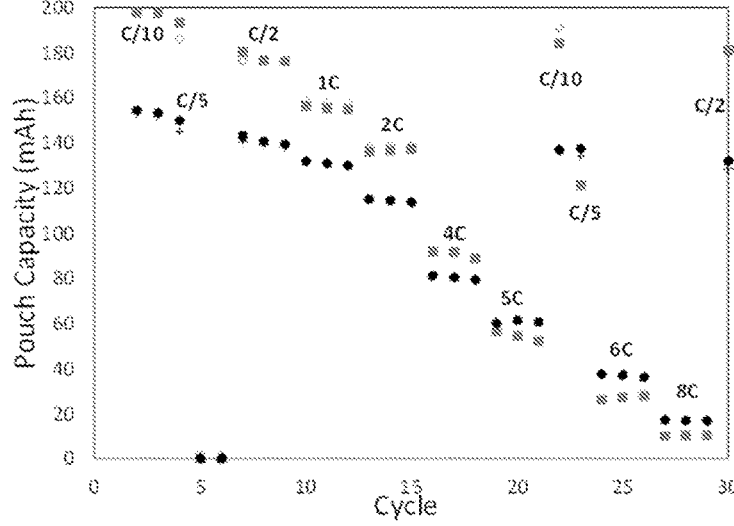
B)
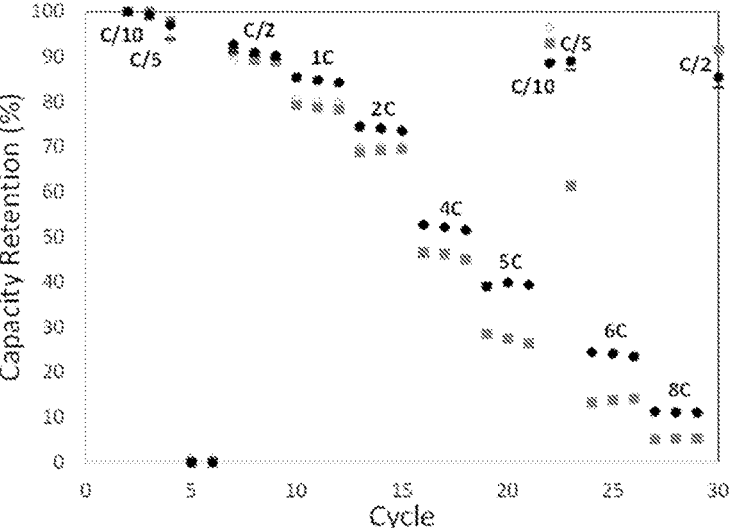
FIG. 18
C)
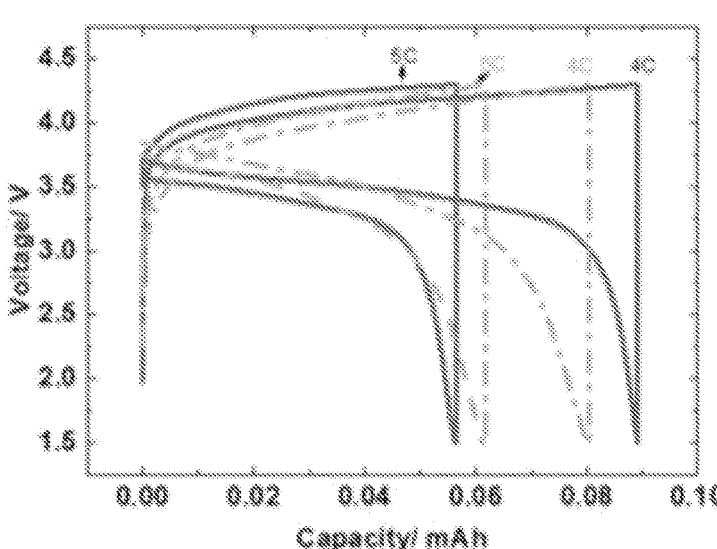

A)

B)

A)

B)

A

B

A) Li2C6O6

B) Li2C2O2 structure

GRAPHENE MONOXIDE COMPOSITIONS OF MATTER AND ELECTRODES COMPRISING THEM

CROSS-REFERENCE TO RELATED APPLICATIONS

The present application is a divisional of U.S. patent application Ser. No. 17/148,010 that was filed Jan. 13, 2021, the entire contents of which are incorporated herein by reference; which is a Non-Provisional of U.S. Provisional Patent Application No. 62/971,074 that was filed Feb. 6, 2020, the entire contents of which are hereby incorporated by reference.

REFERENCE TO GOVERNMENT RIGHTS

This invention was made with government support under 1843306 awarded by the National Science Foundation and DE-SC0018795 awarded by the Department of Energy. The government has certain rights in the invention.

BACKGROUND

Graphene-derived products have recently been commercialized. An important part of this materials landscape includes oxygenated graphene materials. The oxygenated graphene-based materials contain oxygen functional groups associated with the carbon atoms including randomly distributed epoxide, carbonyl, carboxyl and hydroxyl groups and carbon atoms having arrangement that include many structural defects in the hexagonal honeycomb carbon backbone that is known as graphene, and can be referred to as graphene oxide, partially reduced graphene oxide, reduced graphene oxide. These are listed in the order of highest to lowest oxygen content, with the typical oxygen contents ranging from about 0.5:1 atomic oxygen to carbon to about 0.05:1 atomic oxygen to carbon ratios. Oxygenated graphene materials are being produced at scale for many applications including sensors, water filters, electrodes in electrochemical cells, anti-corrosion coatings, and additives to rubber and plastics. One of the distinct characteristics of graphene and the oxygenated graphene materials is that they have high surface area.

The dominant method for production or synthesis of graphene oxide includes treating graphite with acids and oxidizing agents at controlled temperature (e.g., Hummer's method) to separate it into individual defective and oxygenated graphene sheets. Graphene oxide powder has a large exotherm between 150-250° C. due to the various oxygen functional groups that are present on the graphene oxide, making it a challenge to be used in applications that require a dry powder. Usually graphene oxide dispersion is heat treated to produce partially reduced graphene oxide or reduced graphene oxide.

Graphene monoxide is the only member of the family of oxygenated graphene materials that is a solid form of carbon monoxide and can have oxygen to carbon atomic ratio of 1:1. Like graphene oxide the graphene monoxide materials described herein are platform materials that can be used for many applications, like the electrochemical cells that are realized herein.

SUMMARY

Graphene (G) is a single atomic layer of graphite. While the three-dimensional crystal structure of graphite (Gr) is hexagonal close packed, single graphitic layer or graphene has the structure of a hexagonal honeycomb consisting only of carbon atoms. The broader graphene family of materials includes several distinct oxidized forms in decreasing order of oxygen content: graphene monoxide (GmO), graphene oxide (GO), partially reduced graphene oxide (prGO) and reduced graphene oxide (rGO). The structures in this family of graphenic materials provide desirable properties both at the quantum nano level and at the macroscopic level. The compositions of matter that are disclosed herein are based on GmO, having an average atomic carbon-to-oxygen ratio of 1:1, and tuned composites of GmO and G. In some embodiments these compositions are the result of a process that starts with GO.

When GO is used as starting material for the family of G materials, most conventional methods for its processing are designed to remove the four types of oxygen functional groups that are attached in a disordered manner on the defective graphene crystal network. These methods aim to produce rGO, which is labeled and marketed as graphene when the atomic percent of remaining oxygen is low. Some applications of GO require limited reduction of its functional groups producing prGO, which contains an intermediate amount of oxygen as compared to GO and rGO, while retaining the same nature of functional groups. The oxygen functional groups in GmO are more numerous and are distinct from those in GO, prGO and rGO. In some embodiments, the GmO-based composites disclosed herein are comprised of GmO, G, and transition metal oxides (TMO) and are named GmGT materials.

Ordered GmO crystalline monolayers have been predicted by density functional theory (DFT) in two publications (Xiang, H. J. et al (2010) "Structural motifs in oxidized graphene: a genetic algorithm study based on density functional theory," *Physical Review B* 035416:82(3) and Mattson, E. C. et al. (2011) "Evidence of nanocrystalline semiconducting graphene monoxide during thermal reduction of graphene oxide in vacuum," *ACS Nano* 5:9710-9717) and reported experimentally in one of these references (Mattson, E. C. et al. (2011)) and in a patent (Chen et al, U.S. Pat. No. 9,236,633.). This synthesis method, however, is not scalable and allows for the creation of only nanograms of the GmO-based material. (The method takes place inside a vacuum of an electron microscope, with irradiation by high-energy electrons and X-ray Bremstrahlung showers.) The Chen et al. patent describes producing a GmO phase on a metal grid.

The crystalline GmO and the GmO:G and TMO ratios produced herein are structurally distinct from the Chen et al. materials and can be produced at gram scale. The method disclosed herein is compatible with further industrial scale up, and the amount of material produced is sufficient to accomplish creation of electrochemical cells.

The current disclosure reports creation of composition of matter by process for the family of GmGT composite materials and characterization of these materials. In some embodiments new compositions of matter of pure GmO are presented as four different crystal phases and their chemical building blocks, and connected with perturbations in processing methods. The produced materials are incorporated into electrodes to demonstrate their enhanced performance in electrochemical cells over other carbon-based electrodes in speed of charging, gravimetric capacity, low temperature operation and minimized growth of Li dendrites. GmGT anode materials that are cycled in batteries in single or multiple lithiation (charging) and delithiation (discharging) cycles are autopsied to show that GmO fingerprints remain detectable. New compositions of matter are predicted for interactions of Li and GmO, giving a theoretical specific capacity of ~957mAh/g for these Li-GmO materials.

In addition to electrochemical applications, the GmO containing materials in general and the specific GmGT family of materials are platform materials for a wide range of applications. The properties of these materials are distinct from other carbon-oxygen materials, and will have beneficial performance in catalysis applications, nuclear fuel packaging, general adsorption and absorption applications, corrosion resistance, electrical sensing applications, membrane and filtration applications, photonics, 3D printable materials, and composite applications to improve mechanical, electrical and thermal performance. The flexible nature of the GmO-containing materials could enable flexible and wearable electronics, textiles, flexible membranes, and intercalations of polymer materials.

Thus, disclosed herein are the following embodiments:

1. A composition of matter comprising:
at least one atomic layer of graphene monoxide, wherein at least a portion of oxygen molecules present in the graphene monoxide are incorporated into structures having chemical moieties, wherein the chemical moieties are selected from the group consisting of 1,3 dioxetane rings, 1,5-dioxa-cyclooctane rings, 1,4,7-trioxa-cyclononane rings, (3,5,8,10)-tetraoxa-(1,6)-cyclodecadiene rings, and polycarbonyl chains.

2. The composition of matter of embodiment 1, wherein the chemical moieties are atomically ordered in one or more phases of two-dimensional graphene monoxide crystal structures having a carbon-to-oxygen atomic ratio of about 1:1;
wherein interatomic lattice spacings for the crystal structures display a selected area electron diffraction signature selected from the group consisting of 0.39-0.42 $\mathring{A}^{-1}$ and 0.68-0.76 $\mathring{A}^{-1}$; 0.39 $\mathring{A}^{-1}$ and 0.45 $\mathring{A}^{-1}$; 0.33 $\mathring{A}^{-1}$ and 0.88 $\mathring{A}^{-1}$; and 0.38-0.33 $\mathring{A}^{-1}$ and 0.77-0.78 $\mathring{A}^{-1}$.

3. The composition of matter of embodiment 1, further comprising at least one transition metal oxide.

4. The composition of matter of embodiment 3, wherein the transition metal oxide comprises a transition metal selected from the group consisting of Ti, V, Cr, Zr, Nb, Mo, Fe, Co, Ni, Hf, Ta, and W.

5. The composition of matter of embodiment 3, wherein interatomic lattice spacings for the crystal structures display a selected area electron diffraction signature selected from the group consisting of 0.39-0.42 $\mathring{A}^{-1}$ and 0.68-0.76 $\mathring{A}^{-1}$; 0.39 $\mathring{A}^{-1}$ and 0.45 $\mathring{A}^{-1}$; 0.33 $\mathring{A}^{-1}$ and 0.88 $\mathring{A}^{-1}$; and 0.38-0.33 $\mathring{A}^{-1}$ and 0.77-0.78 $\mathring{A}^{-1}$.

6. The composition of matter of claim 5, wherein interatomic lattice spacings for the crystal structures display a carbon-oxygen vibrational at peak between about 1,200 $cm^{-1}$ and 1,400 $cm^{-1}$ in infrared spectroscopy.

7. The composition of matter of embodiment 3, wherein the composition of matter displays a $^{13}C$ solid-state NMR chemical shift at about 116 ppm.

8. The composition of matter of embodiment 3, having a Brunauer-Emmett-Teller (BET) surface area equal to or less than about 100 $m^2/g$.

9. The composition of matter of embodiment 3, having a Brunauer-Emmett-Teller (BET) surface area between about 100 $m^2/g$ and about 600 $m^2/g$.

10. The composition of matter of embodiment 3, further comprising at least one atomic layer of graphene, which may be randomly stacked or locally ordered as AB or AA stacks when forming multilayers.

11. The composition of matter of embodiment 10, wherein:
the graphene monoxide is crystalline or amorphous,
at least a portion of the graphene is crystalline, and
the transition metal oxide is amorphous and distributed substantially homogeneously throughout the composition, or is present in the composition as nanocrystals that are detectable by electron diffraction and x-ray diffraction.

12. The composition of matter of embodiment 1, further comprising lithium ions or lithium atoms intercalated into or adsorbed onto the atomic layer of graphene monoxide.

13. The composition of matter of embodiment 12, wherein the lithium ions or lithium atoms are present in a ratio with respect to carbon and oxygen atoms in the graphene monoxide of from $Li_2C_6O_6$ to $LiC_{50}O_{50}$.

14. The composition of matter of embodiment 12, wherein the lithium ions or lithium atoms are present in a ratio with respect to carbon and oxygen atoms in the graphene monoxide selected from $Li_2C_2O_2$, $Li_2C_6O_6$, $Li_2C_8O_8$, $LiC_6O_6$, $LiC_8O_8$, $Li_2C_{18}O_{18}$, $Li_2C_{32}O_{32}$, $LiC_{18}O_{18}$, $LiC_{32}O_{32}$, and $LiC_{50}O_{50}$.

15. The composition of matter of embodiment 12, wherein at least a portion of the lithium ions or lithium atoms occupy H-sites with respect to the graphene monoxide.

16. The composition of matter of embodiment 12, wherein at least a portion of the lithium ions or lithium atoms occupy S-sites with respect to the graphene monoxide.

17. The composition of matter of embodiment 12, wherein $\Delta E_{Li}$, of the lithium ions or lithium atoms in the composition of matter ranges from about −0.04 eV to about −0.59 eV.

18. A composition of matter made in a series of steps comprising:
(a) mixing a first solution, suspension, or powder comprising a carbon and oxygen source material with a second solution, suspension, or powder comprising at least one transition metal compound to yield a mixture;
(b) thermally processing the mixture of step (a) in an environment, for a time, at a temperature, and at a pressure to yield a composition of matter comprising graphene monoxide, wherein at least a portion of oxygen molecules present in the graphene monoxide are incorporated into chemical moieties, wherein the chemical moieties are selected from the group consisting of 1,3 dioxetane rings, 1,5-dioxa-cyclooctane rings, 1,4,7-trioxa-cyclononane rings, (3,5,8,10)-tetraoxa-(1,6)-cyclodecadiene rings, and polycarbonyl chains.

19. The composition of matter of embodiment 18, wherein the carbon source material has an atomic oxygen to carbon ratio of about 20% or greater and is selected from the group consisting of graphene oxide, polysaccharides, and phenolic polymers.

20. The composition of matter of embodiment 18, wherein the transition metal oxide comprises a transition metal selected from the group consisting of Ti, V, Cr, Zr, Nb, Mo, Fe, Co, Ni, Hf, Ta, and W.

21. The composition of matter of embodiment 18, having an atomic ratio "x" of metal atoms to carbon atoms in step (a), wherein $0.05 \le "x" \le 0.3$.

22. The composition of matter of embodiment 18, wherein step (a) further comprises mixing with the first and second solutions, suspensions, or powders a third solution, suspension, or powder comprising an oxidizing agent.

23. The composition of matter of embodiment 18, wherein step (a) is conducted at a temperature below about 100° C.

24. The composition of matter of embodiment 18, wherein step (b) comprises heating the mixture of step (a) at a temperature below about 100° C.

25. The composition of matter of embodiment 18, wherein step (b) comprises heating the mixture of step (a) to a temperature of between about 20° C. to about 350° C.

26. The composition of matter of embodiment 18, wherein step (b) comprises heating the mixture of step (a) to a temperature of between about 20° C. to about 800° C.

27. The composition of matter of embodiment 18, wherein step (b) comprises heating the mixture of step (a) to a temperature of between about 20° C. to about 1,000° C.

28. The composition of matter of embodiment 18, further comprising size reducing the composition of matter.

29. The composition of matter of embodiment 18, wherein in step (b) the mixture exhibits an exotherm when heated to 350° C. that is lower than about 300 J/g.

30. The composition of matter of embodiment 18, wherein step (b) comprises heating the mixture at a temperature range of from about 21° C. to about 800° C. at a constant or variable heating rate.

31. The composition of matter of embodiment 30, wherein in step (b) the mixture exhibits an exotherm when heated to 800° C. that is lower than 300 J/g.

32. The composition of matter of embodiment 18, wherein interatomic lattice spacings for structures within the composition of matter display a selected area electron diffraction signature selected from the group consisting of 0.39-0.42 Å$^{-1}$ and 0.68-0.76 Å$^{-1}$; 0.39 Å$^{-1}$ and 0.45 Å$^{-1}$; 0.33 Å$^{-1}$ and 0.88 Å$^{-1}$; and 0.38-0.33 Å$^{-1}$ and 0.77-0.78 Å$^{-1}$.

33. The composition of matter of embodiment 18, wherein interatomic lattice spacings for structures within the composition of matter display a carbon-oxygen vibrational at peak between about 1,200 cm$^{-1}$ and 1,400 cm$^{-1}$ in infrared spectroscopy.

34. The composition of matter of embodiment 18, wherein the composition of matter displays a $^{13}$C solid-state NMR chemical shift at about 116 ppm.

35. The composition of matter of embodiment 18, having a Brunauer-Emmett-Teller (BET) surface area equal to or less than about 100 m$^2$/g.

36. The composition of matter of embodiment 18, having a Brunauer-Emmett-Teller (BET) surface area between about 100 m$^2$/g and about 600 m$^2$/g.

37. The composition of matter of embodiment 18, wherein step (b) comprises thermally processing the composition of matter at a pressure less than atmospheric.

38. The composition of matter of embodiment 37, wherein step (b) comprises thermally processing the composition of matter at a pressure equal to or less than about 2×10' torr.

39. The composition of matter of embodiment 18, wherein step (b) comprises thermally processing the composition of matter under an inert atmosphere.

40. An electrode comprising a composition of matter as recited in embodiment 1.

41. An electrode comprising a composition of matter as recited in embodiment 3.

42. An electrode comprising a composition of matter as recited in embodiment 18.

43. A charge-storage device comprising an electrode as recited in embodiment 40, wherein the charge-storage device has a faster charge rate at 1C or greater than a corresponding charge-storage device comprising a graphite-only anode.

44. A charge-storage device comprising an electrode as recited in embodiment 41, wherein the charge-storage device has a faster charge rate at 1C or greater than a corresponding charge-storage device comprising a graphite-only anode.

45. A charge-storage device comprising an electrode as recited in embodiment 42, wherein the charge-storage device has a faster charge rate at 1C or greater than a corresponding charge-storage device comprising a graphite-only anode.

46. A charge-storage device comprising an electrode as recited in embodiment 40, wherein the charge-storage device has a faster charge rate and an increased charge capacity at temperatures from about 0° C. to about −20° C. than a corresponding charge-storage device comprising a graphite-only anode charged at temperatures from about 0° C. to about −20° C.

47. A charge-storage device comprising an electrode as recited in embodiment 41, wherein the charge-storage device has a faster charge rate and an increased charge capacity at temperatures from about 0° C. to about −20° C. than a corresponding charge-storage device comprising a graphite-only anode charged at temperatures from about 0° C. to about −20° C.

48. A charge-storage device comprising an electrode as recited in embodiment 42, wherein the charge-storage device has a faster charge rate and an increased charge capacity at temperatures from about 0° C. to about −20° C. than a corresponding charge-storage device comprising a graphite-only anode charged at temperatures from about 0° C. to about −20° C.

49. A charge-storage device comprising an electrode as recited in embodiment 40, wherein the energy storage cell exhibits a monotonically decreasing potential versus specific capacity curve.

50. A charge-storage device comprising an electrode as recited in embodiment 41, wherein the energy storage cell exhibits a monotonically decreasing potential versus specific capacity curve.

51. A charge-storage device comprising an electrode as recited in embodiment 42, wherein the energy storage cell exhibits a monotonically decreasing potential versus specific capacity curve.

52. A method of improving lithium-ion battery performance, the method comprising replacing a pre-existing electrode in a lithium-ion battery with an electrode as recited in embodiment 40.

53. A method of improving lithium-ion battery performance, the method comprising replacing a pre-existing electrode in a lithium-ion battery with an electrode as recited in embodiment 41.

54. A method of improving lithium-ion battery performance, the method comprising replacing a pre-existing electrode in a lithium-ion battery with an electrode as recited in embodiment 42.

GmGT Composition of Materials by Process

There are many methods to produce rGO from GO, and fewer methods to produce prGO [Claudia Backes et al "Production and processing of graphene and related materials" 2020 2D Mater. 7 022001]. The majority are based on chemical reduction processes in liquid solutions creating products that are suspensions of solid (p)rGO layers in aqueous solutions. Heating liquid suspensions of GO and (p)rGO is considered safe. However, heating unreduced dried powders of GO is associated with an exothermic reaction that can produce a runaway explosion if the parameters of the powder and heating are not constrained with sufficient controls [Y. Qiu, et al. "Explosive thermal reduction of graphene oxide-based materials: Mechanism and safety implications", CARBON 72 (2014) 215-223].

In the present disclosures, when GO is used as a starting source of carbon, the unique end processing goals are to obtain as high an oxygen content as possible and to produce the oxygen and carbon moieties in distinctive functional groups of GmO in a safe material. Additional goal is to create compositions of GmGT matter with crystalline GmO phases (hereafter, "GmGT-X") and their disordered (amorphous) variants (hereafter, "GmGT-A"), and with precipitated TMO nanocrystals (hereafter, "GmGT-NC"). Safe processing methods are developed to create passivated precursor materials (hereafter "pre-GmGT") that eliminate or minimize exothermic reactions and allow production of GmO-based materials at a practical scale. The final product materials are safe for use in applications that may expose them to elevated temperatures. Other embodiments of GmO-based materials are also presented that do not use GO as carbon source material.

In some embodiments, GmGT materials can be produced starting with a commercially available suspension of GO in water mixed with bases, acids, or oxidizers and one or more TM-containing sources at room temperature. Depending on the TM-containing source, and to tune the number of GmO moieties, mixing time can range from 5 min to several days at temperatures from about 20° C. to about 80° C. The atomic ratio of TM to C, "x", can be used to fine tune the final GmGT material, as discussed below.

In some embodiments, the resulting material is dried at a temperature from about 20° C. up to below 100° C. to produce sheets of dried material. If desired, these can be used as films, flakes, or ground into dried powder. Suitable methods include tray drying, spray drying, freeze drying or drum drying. These methods can be practiced in batch, semi-batch or continuous modes. In some embodiments, the material recovered at this stage results in the pre-GmGT materials. In other embodiments, thermal treatment under high or low vacuum, or under ambient or inert atmosphere up to about 300° C. will result in pre-GmGT materials.

Additional, controlled thermal treatment, either as a continued process or a separate step, under vacuum or inert atmospheres to higher temperatures produces the two main classes of final product materials: GmGT(I) and GmGT(II) differentiated by the heating rates in critical temperature regions. The first class has three distinct compositions that evolve with increasing temperature: a) GmGT(I)-A comprising regions of amorphous GmO that creates crystalline α-GmO with further annealing, with crystalline G and molecular TMO; b) GmGT(I)-X comprising regions of crystalline α-GmO with crystalline G and molecular TMO; and c) GmGT(I)-NC comprising crystalline GmO, G and precipitated nanocrystals of TMO. The second class evolves only two distinct compositions with increasing temperature, GmGT(II)-A and GmGT(II)-NC with same description for the crystallinity of the components.

In one embodiment, the atomic ratio of TM to C, "x", when x<about 0.05, the characterization signatures for GmO are not observed at the completion of the process of record defined above. For the intermediate range of x, between about 0.05 and about 0.3, the process method results in formation of GmO and avoids precipitation of TMO nanocrystallites ("NC"), producing GmGT-A or GmGT-X materials. For x greater than about 0.3, nucleation and growth of TMO NCs occur, with sizes greater than about 10 nm, resulting in the final GmGT-NC compositions by process.

Compositions of Matter by Predictive Modeling

Disclosed herein are oxygenated graphenic materials comprising carbon-bound oxygenates wherein the chemical moieties are selected from the group of oxygen heterocyclic rings consisting of 1,3 dioxetane rings, 1,5-dioxa-cyclooctane rings, 1,4,7-trioxa-cyclononane rings, (3,5,8,10)-tetraoxa-(1,6)-cyclodecadiene rings, or polycarbonyl chains (see FIGS. 1 and 2 below). These moieties can be connected in two dimensional layers, called graphene monoxide, that may be ordered in crystalline domains or disordered in amorphous domains. These atomic structures and arrangements of them in amorphous or ordered GmO layers do not exist in GO, prGO, or rGO or G layers.

The innovation behind GmO materials and GmO-based composites is that the 2D layer nature provides stability of the solid phases. These GmO layers represent unique configurations of carbon and oxygen atoms such that a solid form of carbon monoxide (CO) is formed that is stable under ambient as well as higher temperature conditions, either as GmO monolayers or as GmO multilayers that can build nano-, micro- and macro-scale three dimensional solids. In addition, GmO is stable at elevated temperatures and at lowered pressures. Unlike the solid nature of GmO, CO is a gas under ambient conditions and can become a 3D solid at very low temperatures (freezing point of −205° C. at atmospheric pressure) or at highly elevated pressures. Similar to the multitude of solid 3D crystal phases of CO, GmO can also form multiple 2D crystal phases, comprising α, β, γ, and δ-GmO crystal structures and their molecular building blocks that are described here. Compositions comprising of α-GmO, with 1,3 dioxetane rings as $C_2O_2$ building blocks, are formed most frequently in the synthesis processes described in this disclosure.

Characterization of Source Materials and Product Composition Signatures

Characterization of select starting carbon sources includes measurement of pH for solutions and suspensions, evaluation by infrared spectroscopy of dried materials and powders for characteristic vibrational absorption spectral lines, with optical and transmission electron microscopy for morphology, with electron diffraction for crystallinity, with energy dispersive spectroscopy for elemental composition, and by thermal gravimetry and differential scanning calorimetry or thermal differential analysis to determine the mass loss and enthalpy profile of dried powder when heated up to temperatures used in the processing described herein.

Characterization of select TM solutions includes measurement of pH, UV-VIS spectroscopy for optical evaluations of color, and inductively coupled plasma mass spectroscopy to verify the calculated concentration of the transition metal in the solution. Dried solutions and other powders are evaluated by infrared spectroscopy for characteristic vibrational absorption spectral lines, with optical and transmission electron microscopy for morphology, with electron diffraction for crystallinity, and by thermal gravimetry and differential scanning calorimetry to determine the mass loss and enthalpy profile of the powder when heated up to temperatures used in the processing described herein.

The compositions of matter by process are uniquely described by a range of characterization techniques to demonstrate their physical and chemical properties. The prophetic computations of all compositions of matter covered here predict signature fingerprints for the techniques used systematically that are based on atomic structure of crystalline matter (electron and x-ray diffraction) and molecular vibrations of crystalline and amorphous matter (infrared spectroscopy). A range of additional techniques was deployed to identify fingerprints distinct to these classes of materials, with special attention to precursor (pre-GmGT) and final (GmGT) materials.

For example, GmGT samples that comprise oxygen heterocyclic rings or polycarbonyl chains as new chemical moieties in oxygenated graphene may have characteristic vibrations. The molecular vibrations of the 1,3 dioxetane ring moieties, on their own or within 1,5-dioxacyclooctane repeat units of α-GmO crystals, are present in most compositions of matter studied systematically by diffuse reflectance Fourier transform infrared spectroscopy (DR-FTIR), attenuated total reflectance-FTIR (ATR-FTIR), and transmission-FTIR (T-FTIR) (hereafter "IR"). These IR techniques are also sensitive to the G regions of composite materials synthesized at practical scale and to certain TMO vibrations.

The crystallinity of GmO and G in the GmGT composite materials is important for the composition of matter and the associated properties and functions. The ordered crystalline areas of GmO and G layers are confirmed systematically using their unique 2D diffraction peaks detected by diffraction, including SAED (Selected Area Electron Diffraction) in a TEM (Transmission Electron Microscope). The interatomic spacings are determined from the SAED measurements of diffraction rings and/or spots and compared against calculated spacings predicted by DFT. In the GmGT-NC materials SAED detects unique diffraction rings or spots from the TMO nanocrystals and can identify their structure and stoichiometry. The c-axis spacing of GmGT multilayers is also measured by TEM SAED and by lab-based and synchrotron X-ray diffraction and is, on average, larger than for graphite. Disordered GmO and G molecular moieties and crystal defects, along with molecular or amorphous TMO that is substantially homogeneously distributed throughout the bulk material, contribute to the background of SAED. Absence of GmO-specific diffraction peaks in TEM SAED patterns are definitive sign that GmO has not formed a crystalline phase with specific processing.

The surface morphology of the material, by itself and as part of electrodes, is characterized by scanning electron microscopy (SEM) with secondary and backscattered electrons. Elemental analysis maps from energy dispersive x-ray spectroscopy (EDS) shows homogeneous distribution of metal in the GmGT composites.

In some versions of the materials disclosed herein the TM columns of the periodic table can form individual or combination of TMOs. In some embodiments, these preferred metal oxides include one or more of Ti, V, Cr, Zr, Nb, Mo, with Ni, Fe, Co, Hf, Ta, and W as other possible members. Extended X-ray absorption fine structure spectroscopy (EXAFS) show lack of chemical bonding between a specific example of TM atoms and the carbon atoms. In these versions of the GmGT materials the metal atom is not bound to carbon; no metal carbonates, metal carbides or other metal-carbon species are formed. It is believed that presence of TM in intimate contact with GO layers, for this example, facilitates chemical transformation of C and O atoms and formation of oxygen heterocyclic rings consisting of 1,3 dioxetane rings, 1,5-dioxa-cyclooctane rings, 1,4,7-trioxa-cyclononane rings, (3,5,8,10)-tetraoxa-(1,6)-cyclodecadiene rings, or polycarbonyl chains. The chemical transformation could include catalytic action of TM compounds or their direct chemical reaction with the carbon source atoms.

Characterization of the intermediate GmO-containing material form (pre-GmGT) and final GmO-containing product (GmGT) materials includes evaluation by thermal gravimetry (TGA) and differential scanning (DSC) calorimetry or thermal differential analysis (TDA) to determine the mass loss and enthalpy profile of the materials and evaluate improved safety through additives and processing parameters. Brunauer-Emmett-Teller (BET) surface area measurements are used to characterize the specific surface area and evaluate pore sizes. Magic angle spinning $^{13}$C solid state nuclear magnetic resonance (NMR) is used to detect the local chemical environment around the carbon atoms. Proton NMR measurements determine that hydrogen, which is present in some of the oxygen functional groups in GO, is substantially removed by the processing steps used to generate GmGT materials when the starting carbon source material is derived from GO.

Electrochemical Cells Made with GmGT Materials: Reduction to Practice and Performance Properties of Cells The above GmO-based materials and composites, when produced at practical scale, can be utilized in enhancing fast-charge and low-temperature performance of batteries for use in commercial, leisure, military, and space industries, including (for example) power tools and motor vehicle transportation at high power density and consumer electronics at high energy density.

In general, these materials would enable better performing fuel cells, supercapacitors, solid state electrolyte batteries, sodium-ion batteries, lithium-sulfur batteries, lithium air batteries, where this material since the spacing between the layers is larger than graphite materials and will facilitate larger.

The materials disclosed herein can be used as full replacement or additive for lithium and sodium ion battery anodes that may optionally include additional specific capacity and/or rate capability boosting particles (such as silicon nanoparticles).

In embodiments of lithium-ion batteries (LIB) with anodes comprising GmGT composite materials, on their own or further composited with graphite microcrystals (Gr) and silicon nanoparticles (Si), GmGT improves multiple performance properties of LIBs. In addition to faster charging (in the range of 1C to 10C) and low temperature operation (down to −20° C.), there is also improvement in the gravimetric specific capacity of GmO over Gr (e.g., α-GmO has 2.6 times better theoretical capacity of 957 mAh/g compared to 372 mAh/g for Gr) and markedly lower Li metal dendrite growth that improves cyclability and safety.

Lithium Interaction with GmGT with SAED of Autopsied Cells and DFT Predictions for New Compositions of Matter LGm Also disclosed herein are compositions of matter comprising GmO-based materials including at least areas of one atomic layer of GmO in combination with lithium atoms and methods of synthesizing these new lithium and GmO-based compositions of matter (hereafter, "LGm" and "LGmGT"). Their crystalline diffraction signatures are detectable by TEM-SAED; and lithium ions and/or lithium atoms are intercalated into or adsorbed onto the atomic layer of GmO.

Density functional theory predictive computations for lithium atom interaction with a GmO monolayer indicate that a monolayer of GmO can hold lithium atoms, which is not the case for a monolayer of G, and predicts the maximum theoretical capacity of this new anode material for Li-ion batteries is 957 mAh/g for $Li_2C_2O_2$ composition.

The lithium ions and/or lithium atoms may be present in the LGm composition of matter in a ratio with respect to carbon and oxygen atoms in the graphene monoxide of from $Li_2C_2O_2$ to $LiC_{50}O_{50}$ For example, the lithium ions and/or lithium atoms may be present in a ratio selected from $Li_2C_2O_2$, $LiC_2O_2$, $Li_2C_6O_6$, $LiC_4O_4$, $Li_2C_8O_8$, $LiC_6O_6$, $LiC_8O_8$, $Li_2C_{18}O_{18}$, $Li_2C_{32}O_{32}$, $LiC_{18}O_{18}$, $LiC_{32}O_{32}$, and $LiC_{50}O_{50}$. The intent of the current invention is to recognize all these forms as novel compositions of matter that are enabled by current invention.

In a preferred version of the composition of matter, at least a portion of the lithium ions and/or lithium atoms occupy H-sites with respect to the graphene monoxide carbon sublattice. In another version of the composition of matter, at least a portion of the lithium ions and/or lithium atoms occupy S-sites with respect to the graphene monoxide oxygen sublattice. In yet other versions of the composition of matter, at least a portion of the lithium ions and/or lithium atoms occupy H-sites and S-sites with respect to the graphene monoxide. Transport of Li occurs easily parallel to the GmO layer supporting the fast-charging properties of batteries made with GmGT materials.

The composition of matter may consist solely of, or consist essentially of, carbon atoms, oxygen atoms, and lithium atoms, atomically arranged such that the composition is electrically conductive.

Diffraction peak positions (k), lattice spacings (d) and intensities (I) measured from (A); (C) SAED pattern showing diffraction rings of G and absence of α-GmO rings (scale bar=10 1/nm). Note that with additional heating the GmGT (I)-A material can be transformed into GmGT(I)-X and display diffraction signatures of crystalline α-GmO; (D) Bright-field TEM image (scale bar=1 μm); (F) SEM image showing dense sheet morphology present in the powdered material which is different than the wispy rGO morphology described in literature (scale bar=20 μm).

Figure 5:
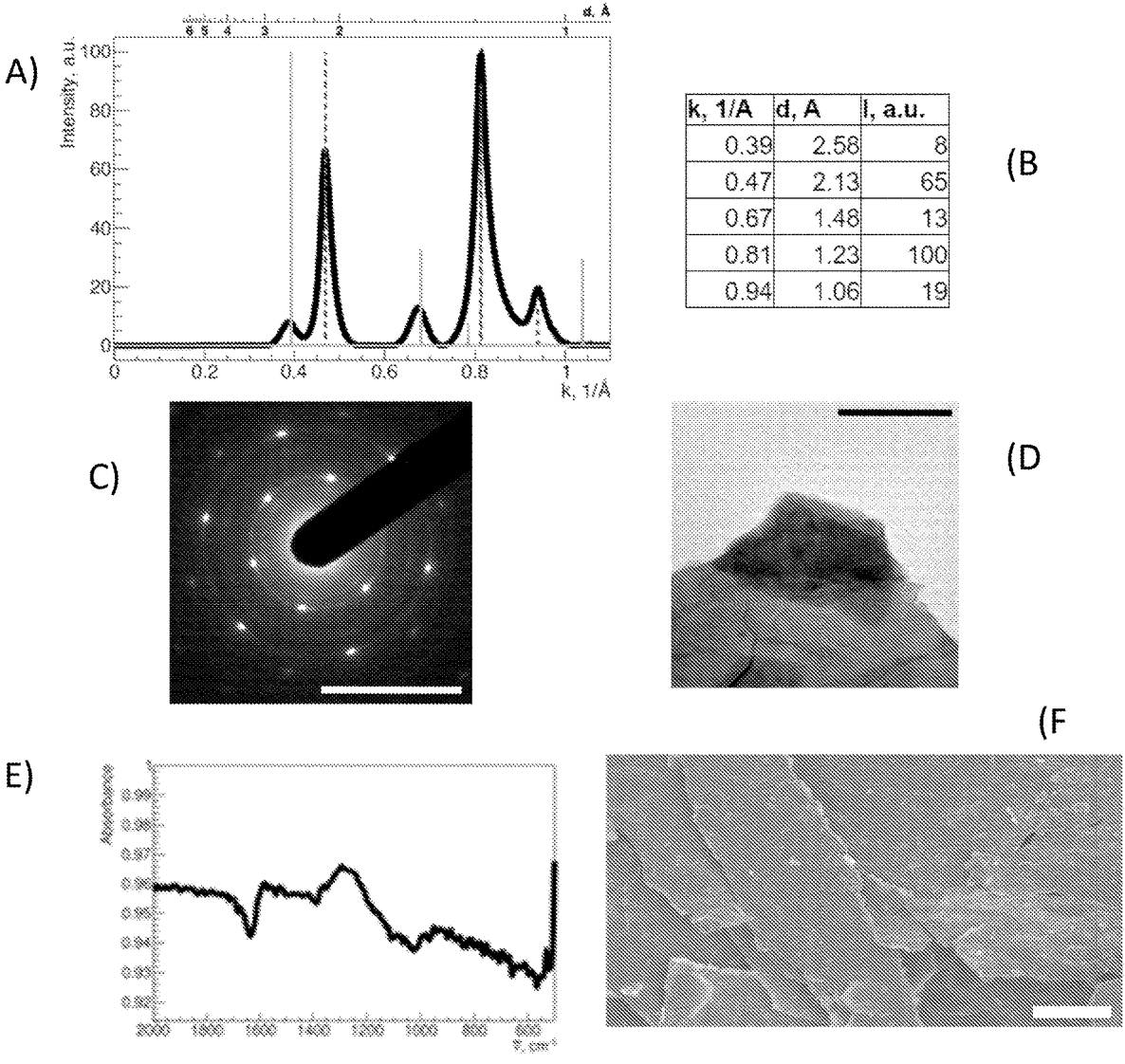

FIG. 5: Characterization signatures of GmGT(I)-X product material: (A) SAED intensity profile (solid bold black) and peak positions for α-GmO (solid bright gray) and graphene (dashed dark gray); (B) Diffraction peak positions (k), lattice spacings (d) and intensities (I) measured from (A); (C) SAED pattern showing diffraction rings of α-GmO and G (scale bar=10 1/nm); (D) Bright-field TEM image (scale bar=1 μm); (E) IR absorbance spectrum; (F) SEM image showing dense sheet morphology present in the powdered material which is different than the wispy rGO morphology described in literature (scale bar=100 μm).

Figure 6:
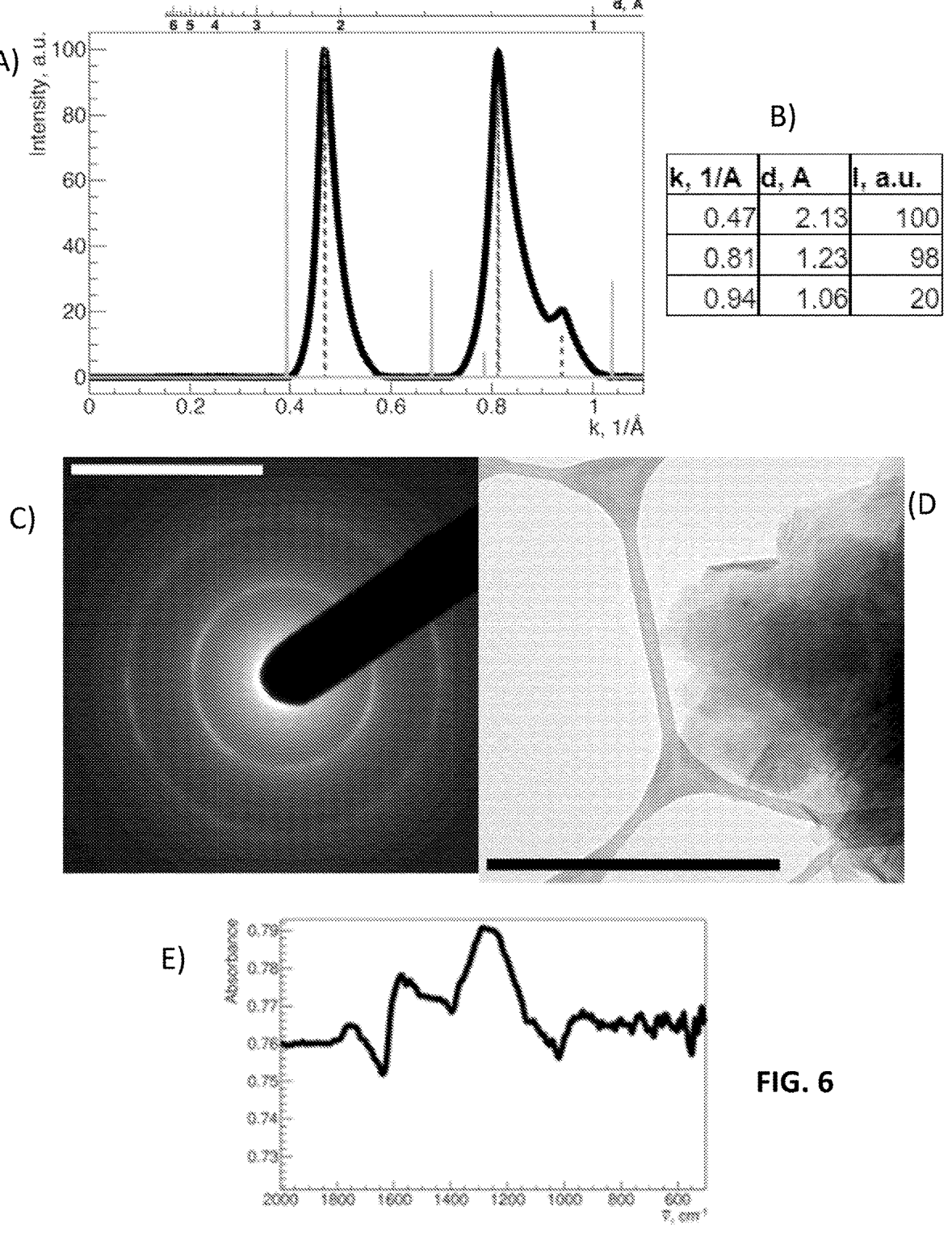

FIG. 6: Characterization signatures of GmGT(II)-A product material: (A) SAED intensity profile (solid bold black) and graphene (dashed dark gray). Note absence of α-GmO (solid bright gray) peaks; (B) Diffraction peak positions (k), lattice spacings (d) and intensities (I) measured from (A); (C) SAED pattern showing diffraction rings of G and absence of α-GmO rings (scale bar=10 1/nm). Note that additional heating does not produce diffraction signatures of crystalline α-GmO; (D) Bright-field TEM image (scale bar=1 μm); (E) IR absorbance spectrum.

Figure 7:
Figure 7:
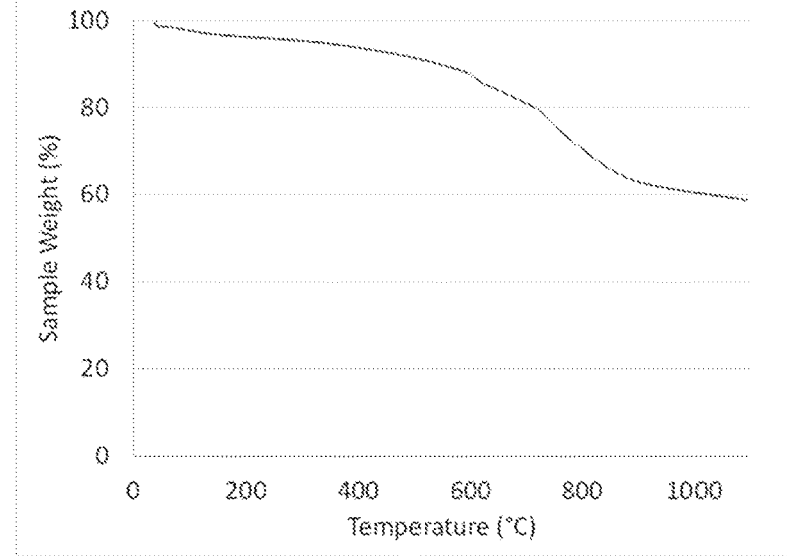
Figure 7:
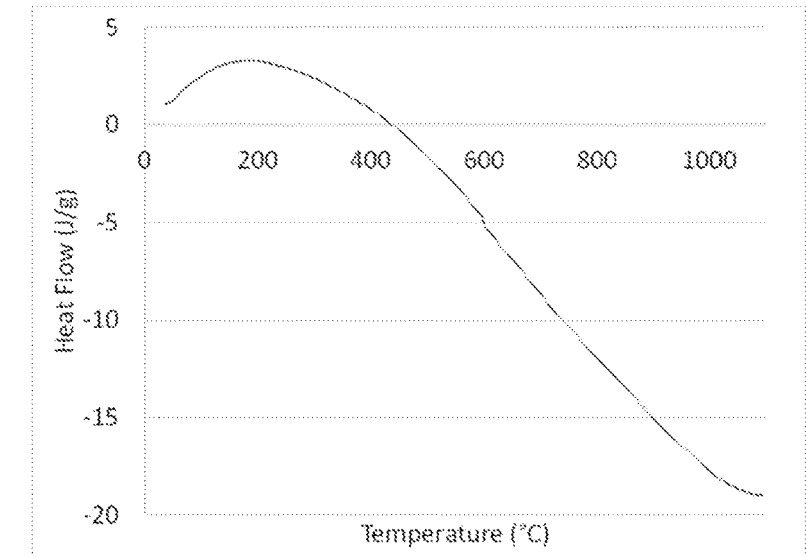
Figure 7:
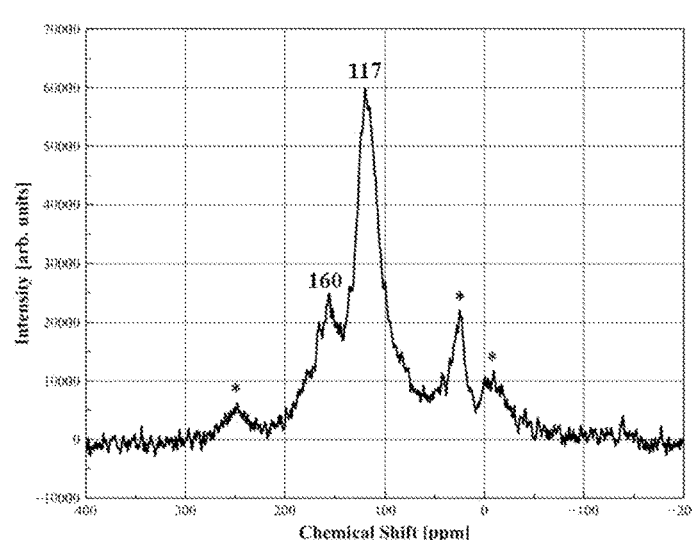

FIG. 7: Thermal characterization of blend of GmGT(I)-X and GmGT(II)-A product materials heated at a rate of 10° C./min from room temperature to 600° C., then continued heating at a rate of 3° C./min from 600° C. to 1100° C.: (A) TGA curve showing sample weight loss as function of temperature, with fastest loss occurring between 727-750° C., and with 58.7% weight retention at the highest temperature. (B) DSC curve showing heat flow with absence of major exothermic peak that is typically seen for GO (C) $^{13}$C solid NMR spectrum shows chemical shifts around the carbon atoms for the starting blend material.

Figure 8:
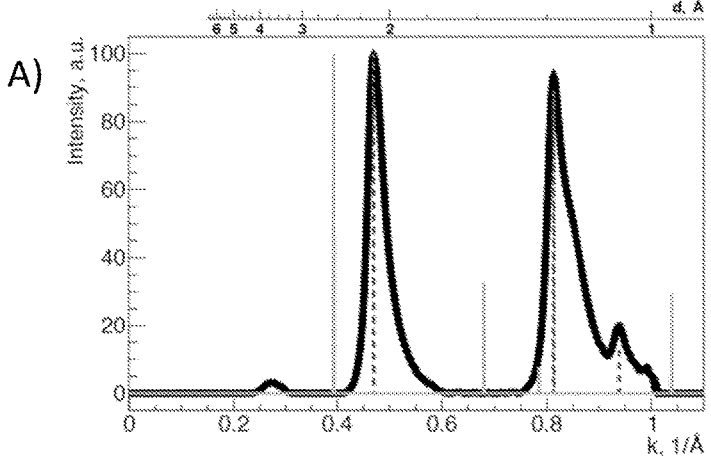
Figure 8:
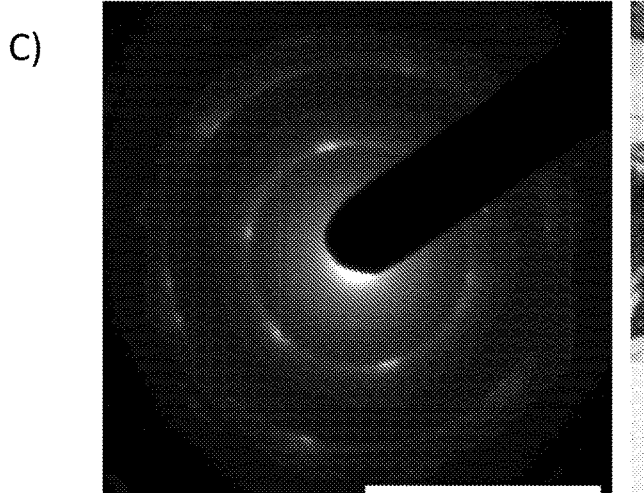
Figure 8:
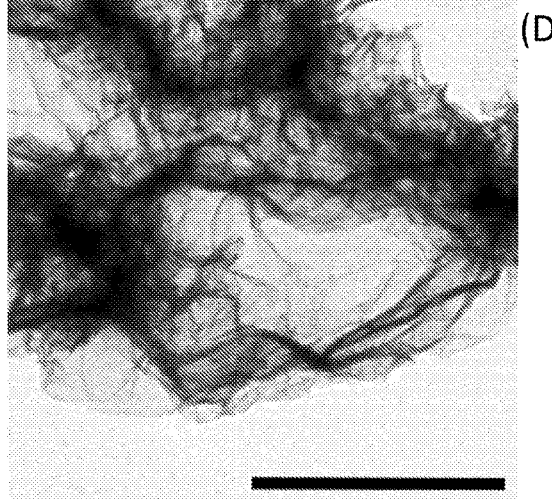
Figure 8:
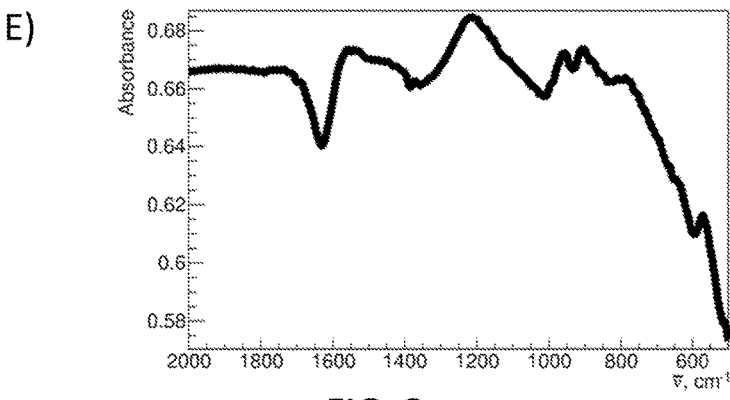

FIG. 8: Characterization signatures of partially reduced graphene oxide (prGO) (perturbation Sample 6.6) used as control material for GmO-containing samples): (A) SAED intensity profile (solid bold black) and graphene (dashed dark gray). Note absence of α-GmO (solid bright gray) peaks; (B) Diffraction peak positions (k), lattice spacings (d) and intensities (I) measured from (A); (C) SAED pattern showing diffraction rings of G and absence of α-GmO rings (scale bar=10 1/nm); (D) Bright-field TEM image (scale bar=1 μm); (E) IR absorbance spectrum.

Figure 9:
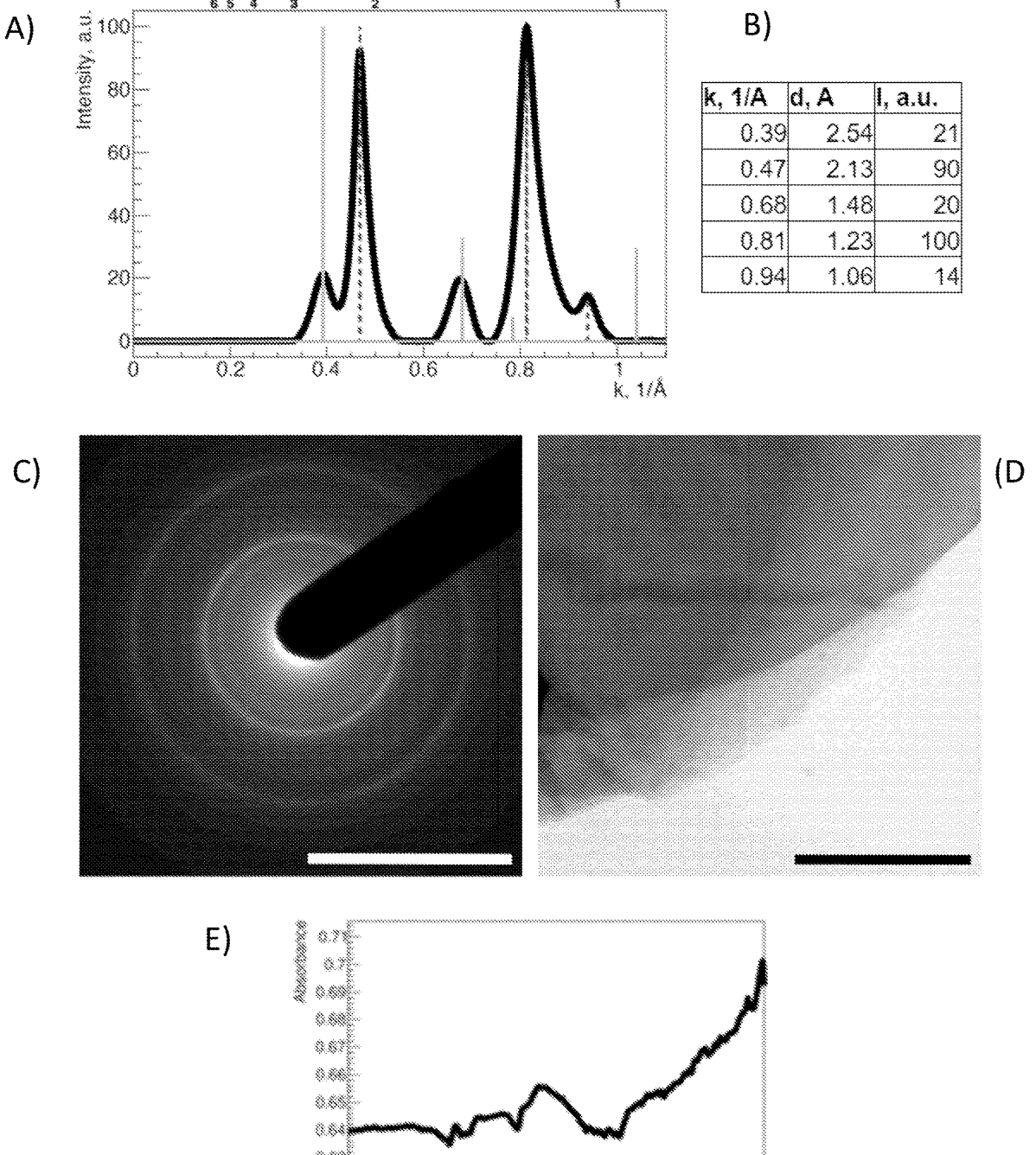

FIG. 9: Characterization signatures of GmGT(I)-X (perturbation in Sample 6.2): (A) SAED intensity profile (solid bold black) and peak positions for α-GmO (solid bright gray) and graphene (dashed dark gray); (B) Diffraction peak positions (k), lattice spacings (d) and intensities (I) measured from (A); (C) SAED pattern showing diffraction rings of α-GmO and G (scale bar=10 1/nm) (D) Bright-field TEM image (scale bar=1 μm); (E) IR absorbance spectrum.

Figure 10:
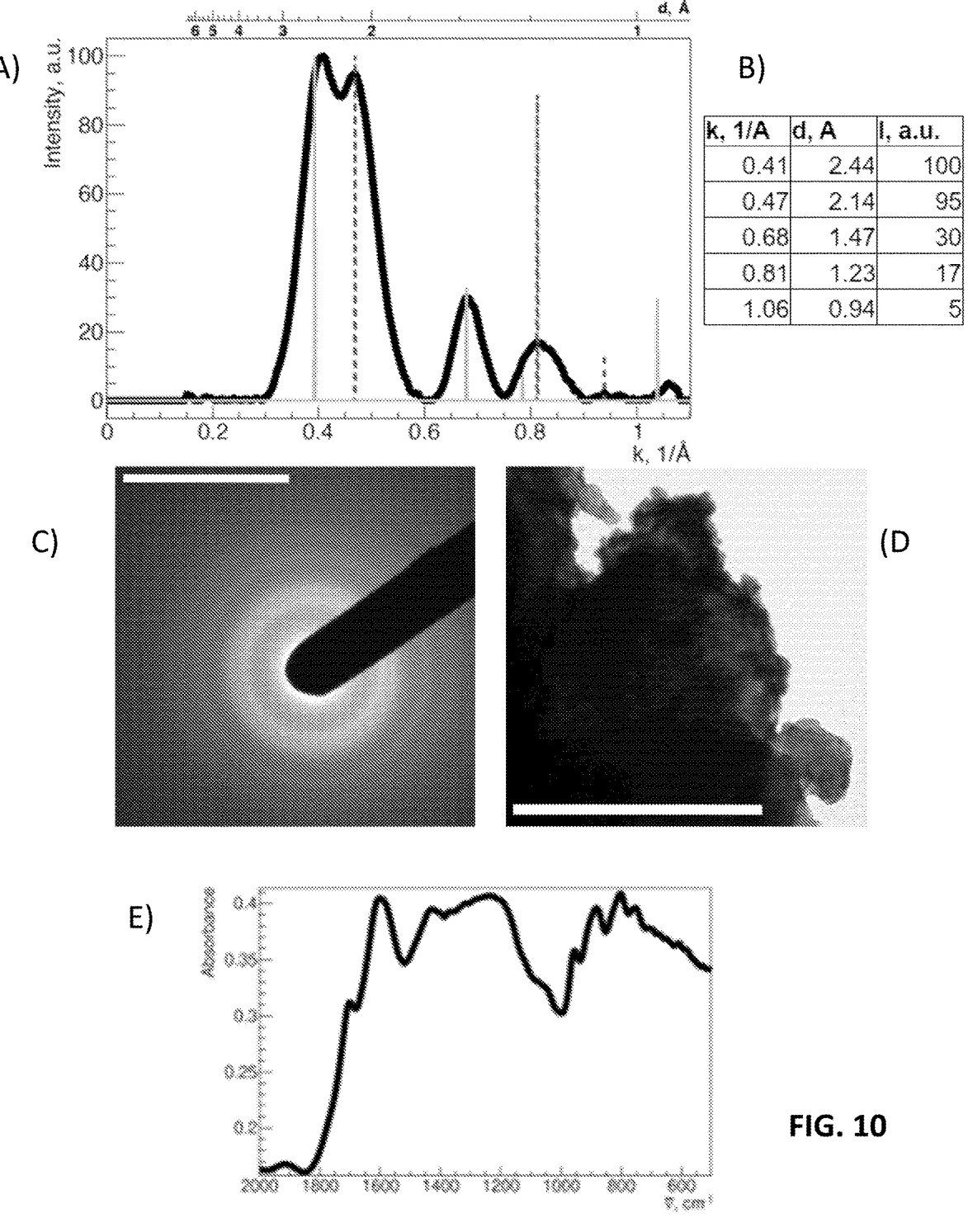

FIG. 10: Characterization signatures of GmGT(I)-X produced from a starting carbon source of lignin (perturbation Sample 6.3): (A) SAED intensity profile (solid bold black) and peak positions for α-GmO (solid bright gray) and graphene (dashed dark gray); (B) Diffraction peak positions (k), lattice spacings (d) and intensities (I) measured from (A); (C) SAED pattern showing diffraction rings of α-GmO and G (scale bar=10 1/nm) (D) Bright-field TEM image (scale bar=1 μm); (E) IR absorbance spectrum.

Figure 11:
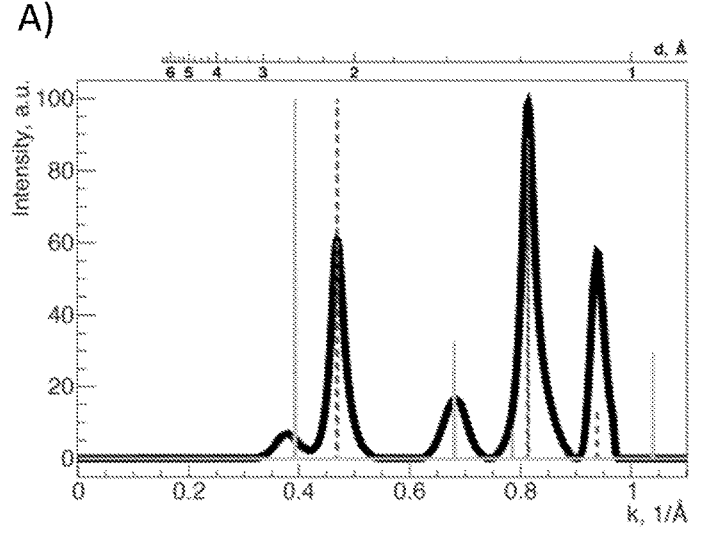
Figure 11:
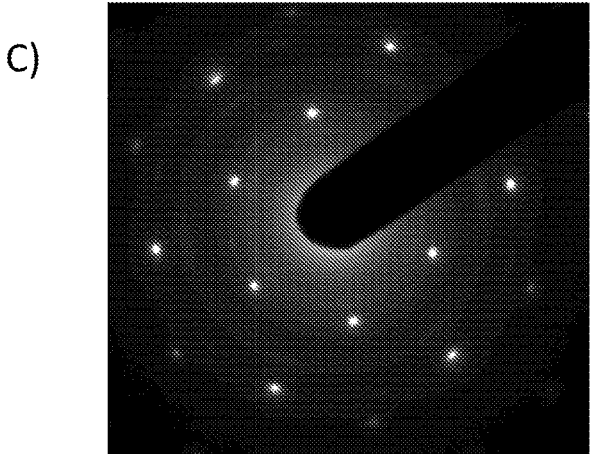
Figure 11:
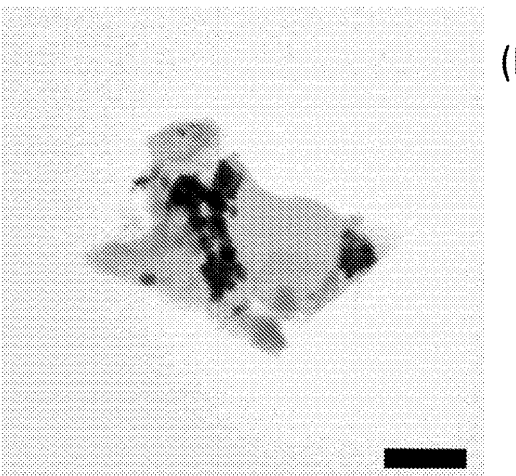
Figure 11:
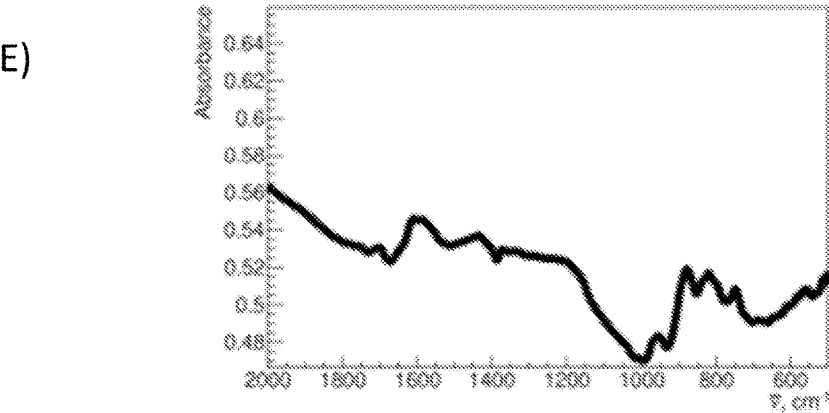

FIG. 11: Characterization signatures of GmGT(I)-X from the hydrothermally produced GO from a bio-renewable source (perturbation Sample 6.7): (A) SAED intensity profile (solid bold black) and peak positions for α-GmO (solid bright gray) and graphene (dashed dark gray); (B) Diffraction peak positions (k), lattice spacings (d) and intensities (I) measured from (A); (C) SAED pattern showing diffraction rings of α-GmO and G (scale bar=10 1/nm) (D) Bright-field TEM image (scale bar=1 μm); (E) IR absorbance spectrum.

Figure 12:
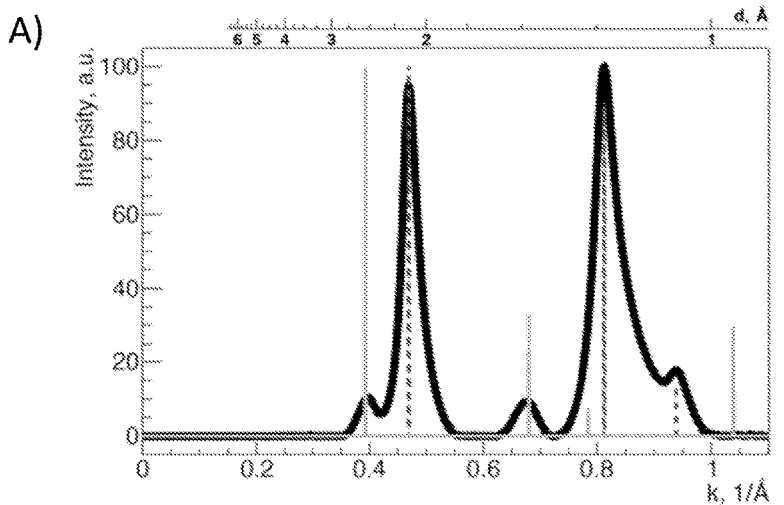
Figure 12:
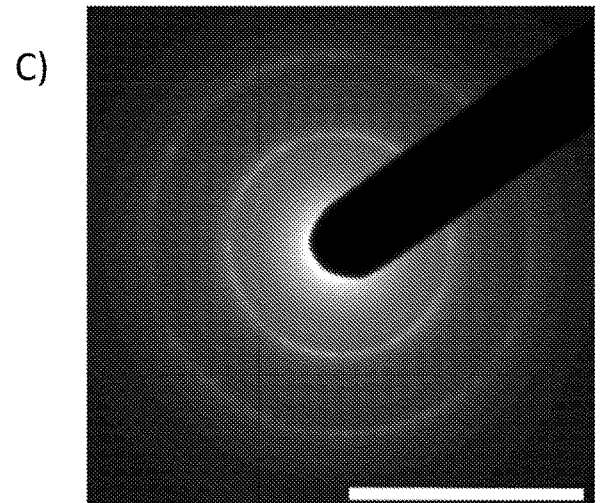
Figure 12:
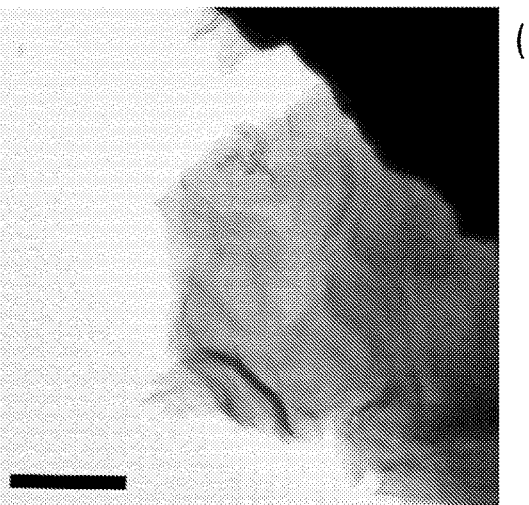
Figure 12:
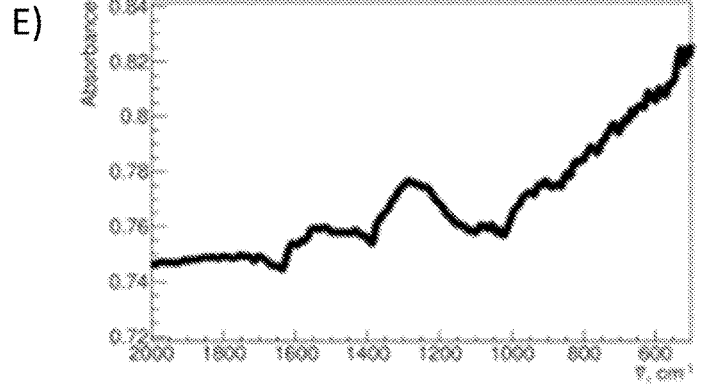

FIG. 12: Characterization signatures of GmGT(I)-X produced using an organometallic TM source (perturbation Sample 6.12): (A) SAED intensity profile (solid bold black) and peak positions for α-GmO (solid bright gray) and graphene (dashed dark gray); (B) Diffraction peak positions (k), lattice spacings (d) and intensities (I) measured from (A); (C) SAED pattern showing diffraction rings of α-GmO and G (scale bar=10 1/nm) (D) Bright-field TEM image (scale bar=1 μm); (E) IR absorbance spectrum.

Figure 13:
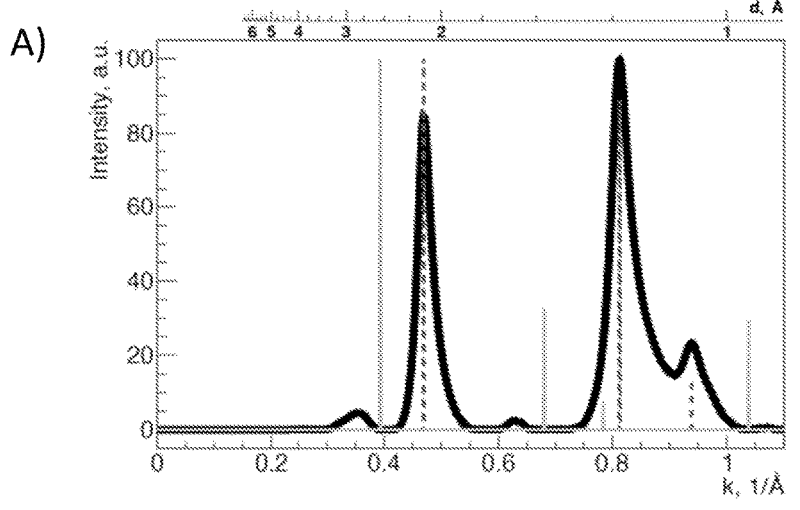
Figure 13:
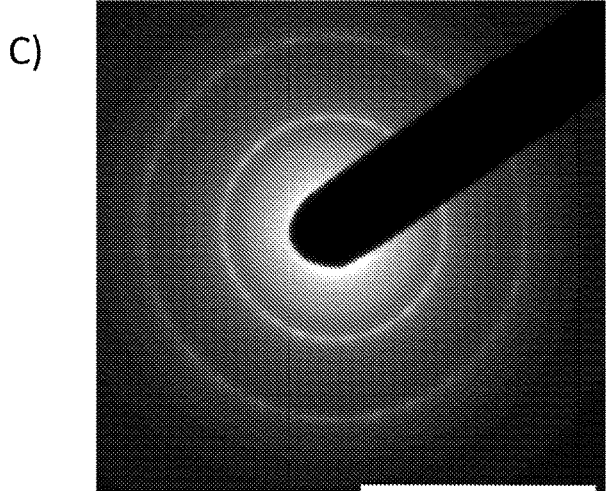
Figure 13:
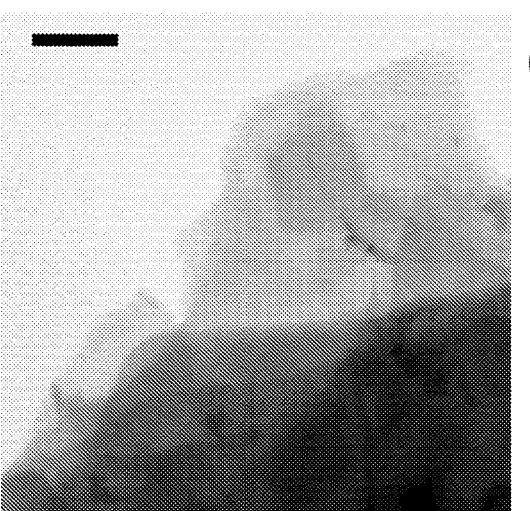
Figure 13:
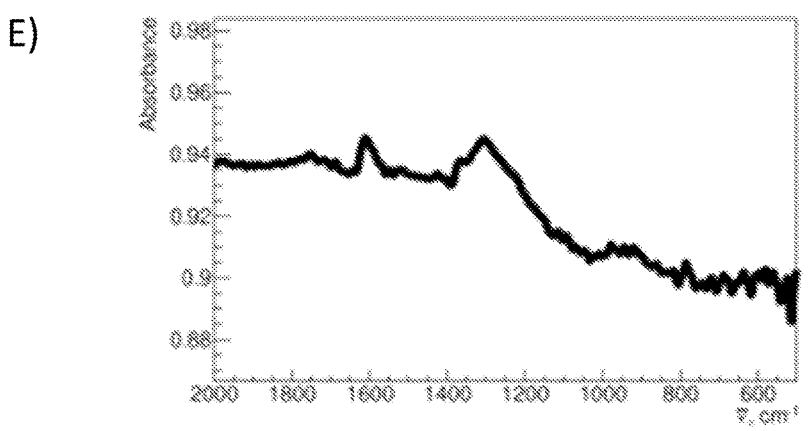

FIG. 13: Characterization signatures of GmGT(I)-X produced using a peroxide additive (perturbation Sample 6.13): (A) SAED intensity profile (solid bold black) and peak positions for α-GmO (solid bright gray) and graphene (dashed dark gray); (B) Diffraction peak positions (k), lattice spacings (d) and intensities (I) measured from (A); (C) SAED pattern showing diffraction rings of α-GmO and G (scale bar=10 1/nm) (D) Bright-field TEM image (scale bar=1 μm); (E) IR absorbance spectrum.

Figure 14:
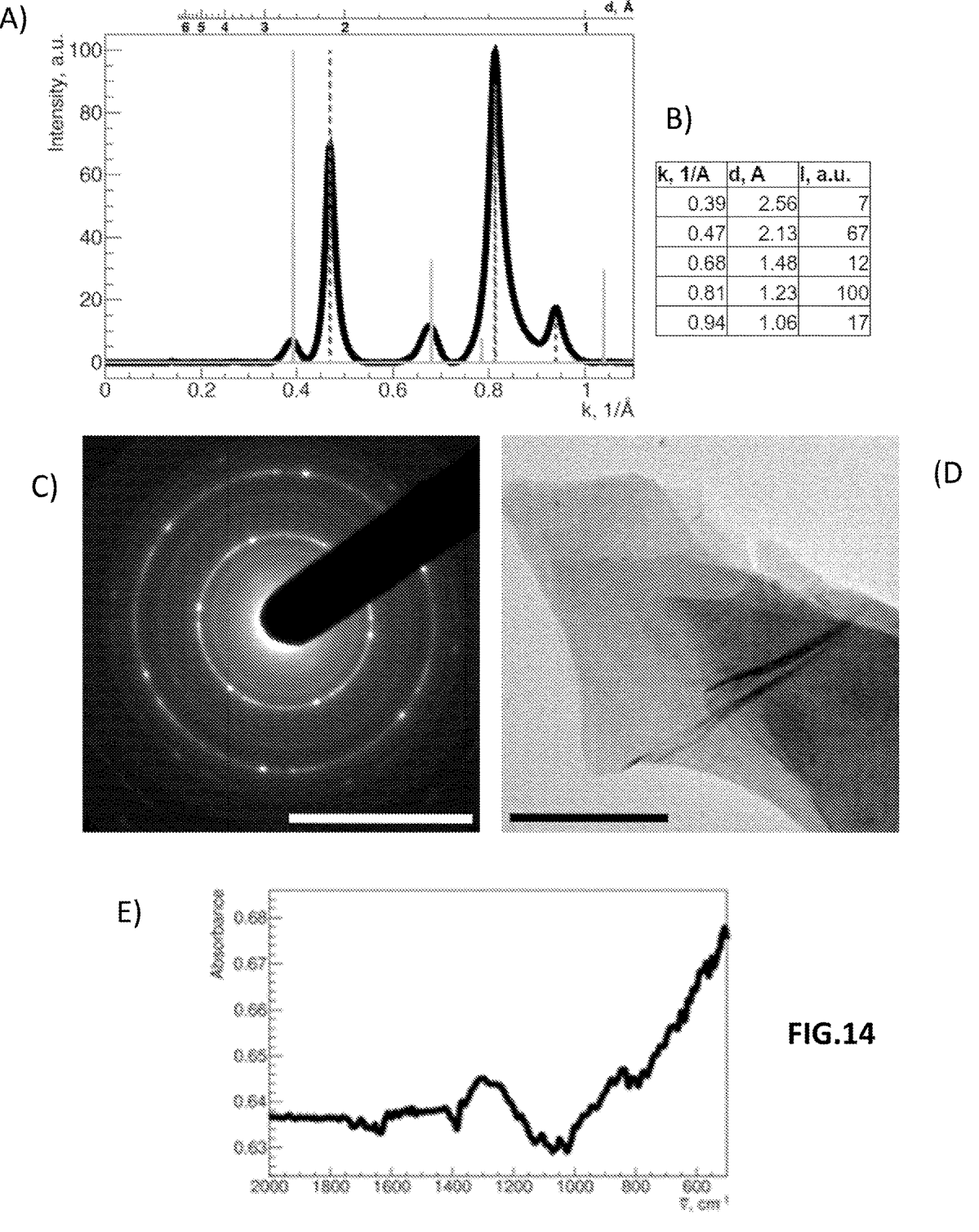

FIG. 14: Characterization signatures of GmGT(I)-X produced using an acidic additive (perturbation Sample 6.14): (A) SAED intensity profile (solid bold black) and peak positions for α-GmO (solid bright gray) and graphene (dashed dark gray); (B) Diffraction peak positions (k), lattice spacings (d) and intensities (I) measured from (A); (C) SAED pattern showing diffraction rings of α-GmO and G (scale bar=10 1/nm) (D) Bright-field TEM image (scale bar=1 μm); (E) IR absorbance spectrum.

Figure 15:
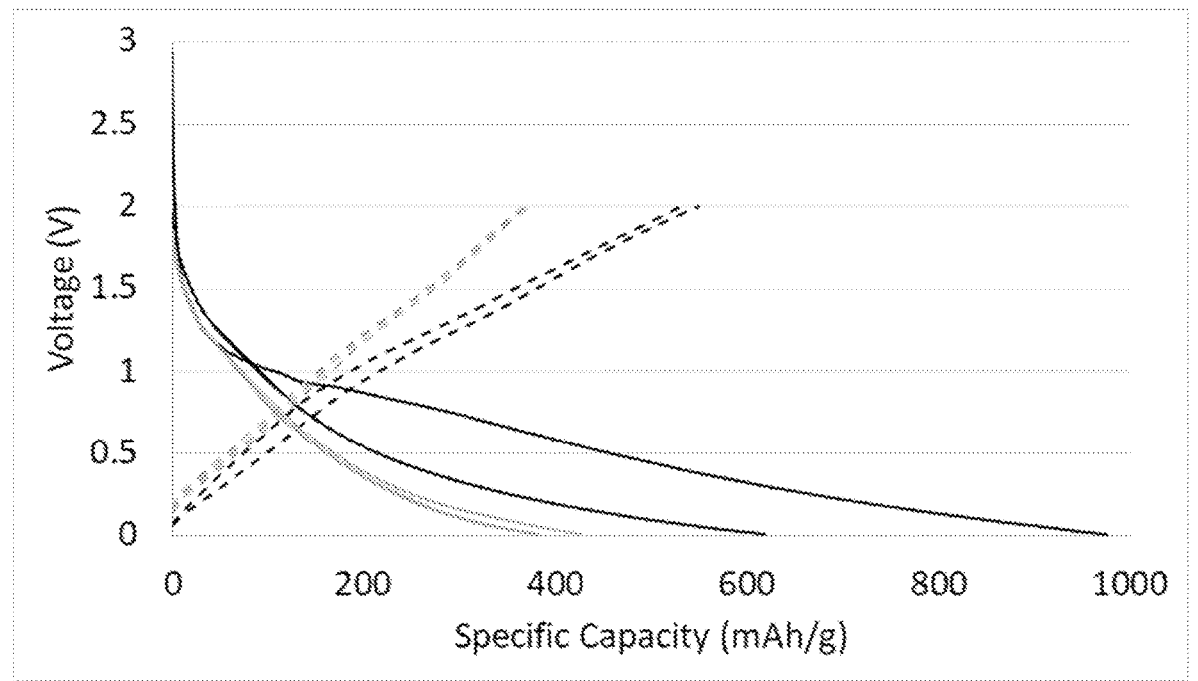

FIG. 15: Charge/discharge curve for an anode half-cell, wherein the anode active material was 100% GrSiGmGT (II)-A. Through half-cell testing, the specific capacity of this batch of GrSiGmGT(II)-A was determined to be 540 mAh/g. Black lines represent two formation cycles at a C/20 rate. Gray lines represent cycles following formation at a C/3 rate. Solid lines represent lithiation, and dashed lines represent delithiation.

Figure 16:
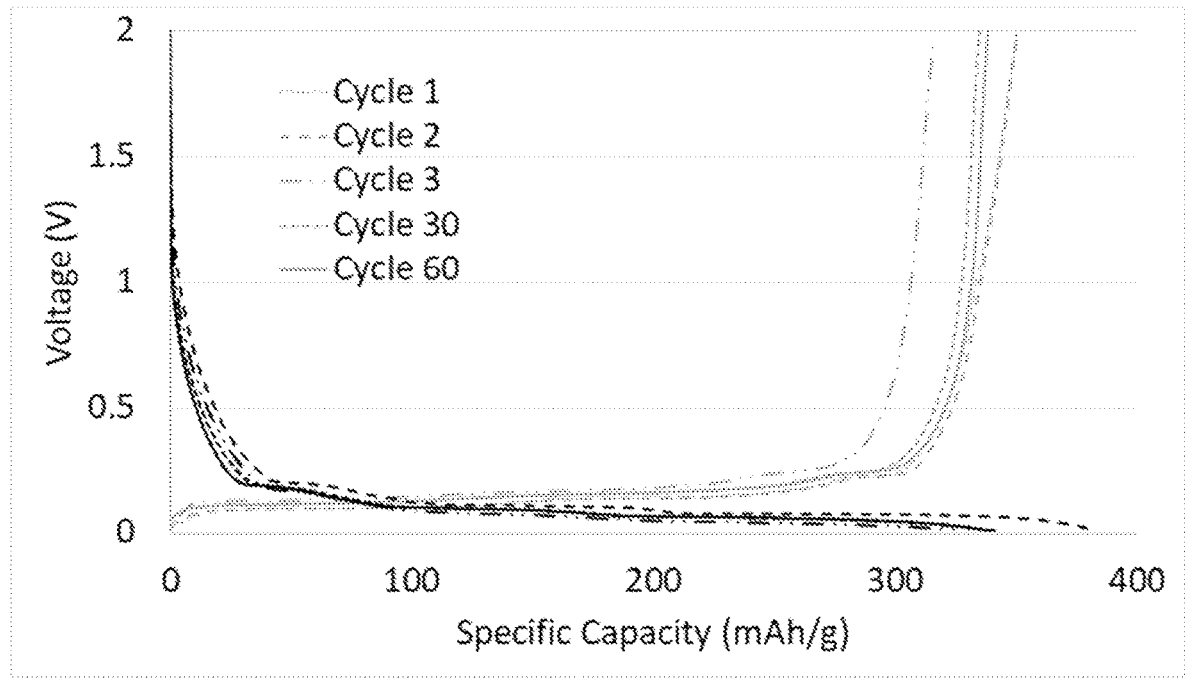

FIG. 16: Charge/discharge curve for a graphite anode half-cell. Ibis cell had a specific capacity of 351 mAh/g at a current during approximately C/20. This graph depicts two formation cycles at C/20, followed by cycling data at C/3. The graphite half-cell shows a characteristic voltage plateau around 0.2 V. Black lines represent lithiation, and gray lines represent delithiation, with cycle number indicated by the legend in the Figure.

Figure 17:
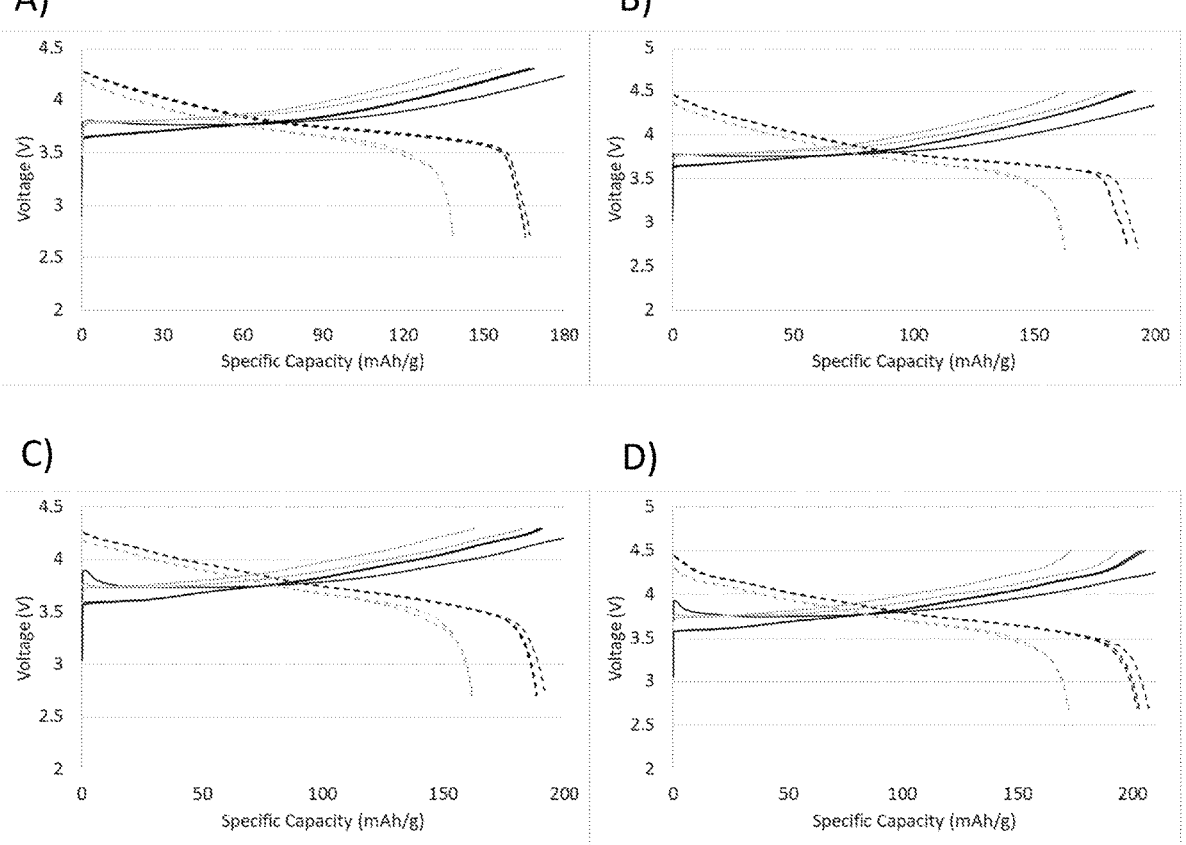

FIG. 17: Charge/discharge curves for Nickel Manganese Cobalt Oxide (NMC622) and for Nickel Cobalt Aluminum Oxide (NCA) cathodes paired with GmGT anode materials in pouch full cell Li-ion batteries: (A) NMC cycled with upper voltage cutoff at 4.3 V gives C/10 specific capacity of 165 mAh/g, and initial Coulombic efficiency of 87%; (B) NMC cycled with upper voltage cutoff at 4.5 V gives C/10 specific capacity of 187 mAh/g, and initial Coulombic efficiency of 85%; (C) NCA cycled with upper voltage cutoff at 4.3 V gives The C/10 specific capacity of 194 mAh/g, and initial Coulombic efficiency of 90.4%; and (D) NCA cycled with an upper voltage cutoff at 4.3 V gives C/10 specific capacity of 194 mAh/g, and initial Coulombic efficiency of 90.4%. Black lines represent formation at a C/10 Rate. Gray lines represent cycling following formation at a1C Rate. Solid lines represent delithiation, and dashed lines represent lithiation.

FIG. 18: (A) Graph showing rate capability of pouch cells with graphite (Gr) or GrSiGmGT(II)-A composite anodes (1C=200 mAh) Gray sold squares represent the graphite control charge. Gray open diamond represent the graphite control discharge. Black solid circles represent the 87% graphite/3% silicon/10% GmGT(II)-A charge. Black plus signs represent the 87% graphite/3% silicon/10% GmGT (II)-A discharge. (B) Graph showing the rate capability as depicted in FIG. 18A 6 normalized based on the capacity at C/10 to compare the actual rate performance directly. Gray sold squares represent the graphite control charge. Gray open diamonds represent the graphite control discharge. Black solid circles represent the 87% graphite/3% silicon/ 10% GmGT(II)-A charge. Black plus signs represent the 87% graphite/3% silicon/10% GmGT(II)-A discharge; (C) Charge/discharge curves for the pouch cells with Gr versus 87% graphite/3% silicon/10% GmGT(II)-A anodes. Dark solid lines represent the graphite control charge and discharge. Light dotted lines represent the 87% graphite/3% silicon/10% GmGT(II)-A charge and discharge.

Figure 19:
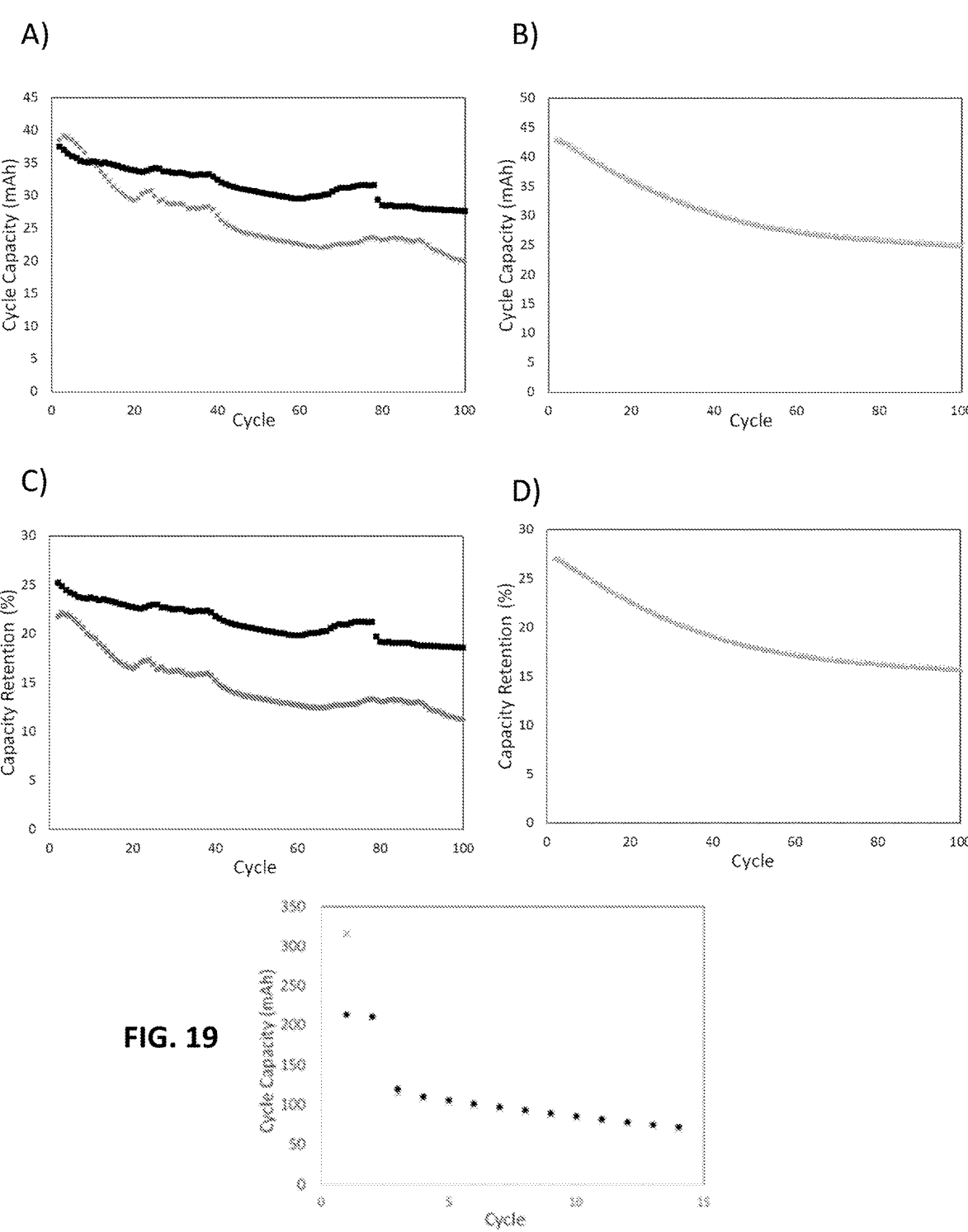

FIG. 19: (A) Graph depicting cycling performance from Test 3(a) (see the text) after formation at C/10 for one cycle, followed by cycling at 5° C. Gray sold square represents the graphite control charge. Gray open diamonds represent the graphite control discharge. Black solid circles represent the 87% graphite/3% silicon/10% GmGT(II)-A charge. Black plus signs represent the 87% graphite/3% silicon/10% GmGT(II)-A discharge. (B) Graph depicting cycling behavior from Test 3(a), normalized based on the reversible capacity. Gray solid triangles represent the 87% graphite/3% silicon/10% GmGT(II)-A charge. Gray X symbols represent the 87% graphite/3% silicon/10% GmGT(II)-A discharge. (C) Graph showing the capacity for Test 3(b). Gray sold squares represent the graphite control charge. Gray open diamonds represent the graphite control discharge. Black solid circles represent the 87% graphite/3% silicon/10% GmGT(II)-A, charge. Black plus signs represent the 87% graphite/3% silicon/10% GmGT(II)-A discharge; and (D) is a graph showing the normalized capacity for Test 3(b). Gray solid triangles represent the 87% graphite/3% silicon/10% GmGT(II)-A charge. Gray X symbols represent the 87% graphite/3% silicon/10% GmGT(II)-A discharge. (E) is a graph showing the charge capacity and discharge capacity for an anode half-cell with 97% graphite/3% silicon as the active material, but at a lower cycle count. Black circles represent charge, and gray X symbols represent discharge.

Figure 20:
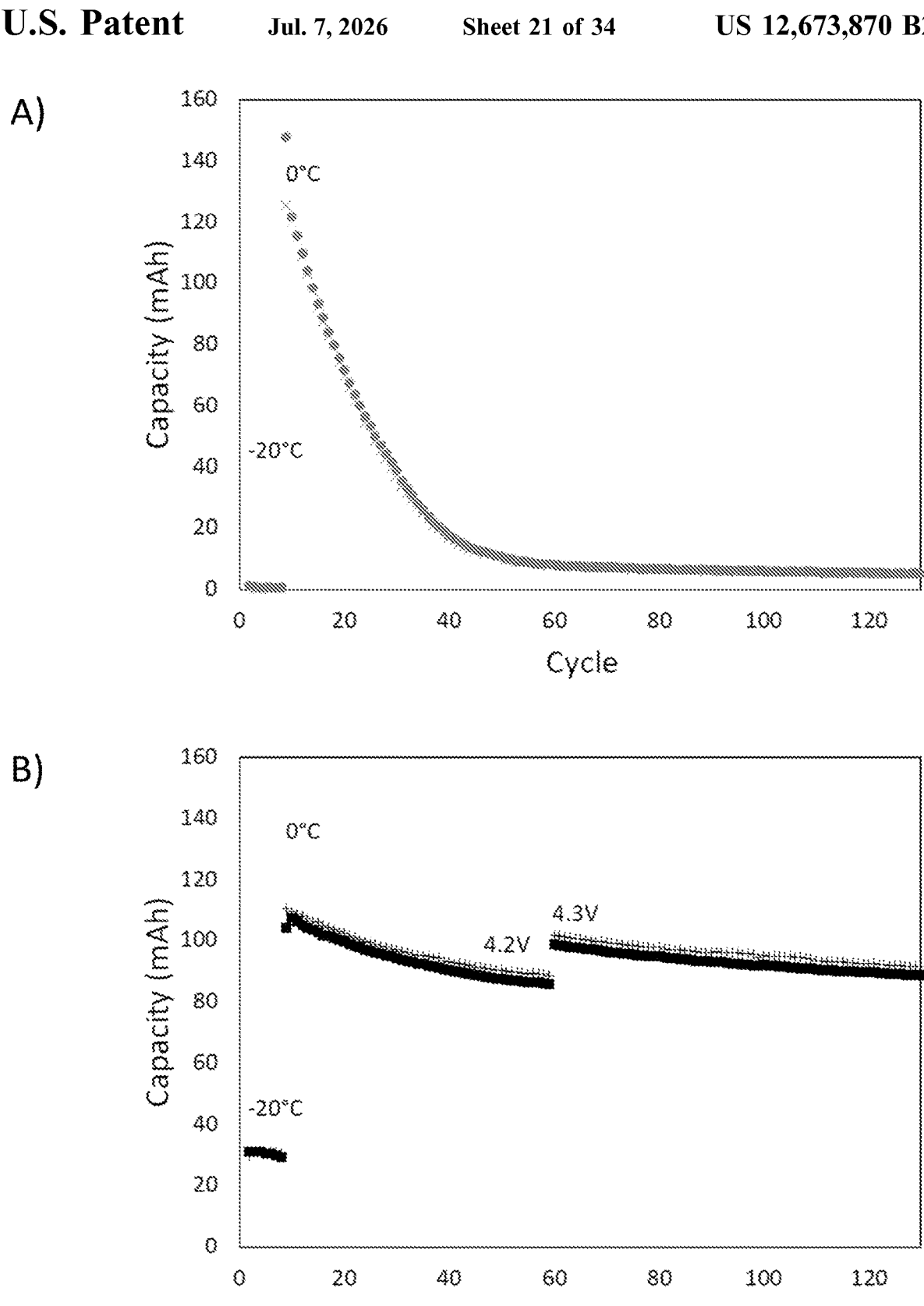

FIG. 20: Graphs showing capacity in milliamp-hours versus cycle number for cells made using the subject GmGT (II)-A as an additive, in which the cell was charged at a rate of C/2 and discharged at a rate of C/3 at −20° C. for 10 cycles, followed by 100 charge/discharge cycles at 0° C.: (A) Cell using a graphite anode. Gray sold circles represent the graphite control charge. Gray X symbols represent the graphite control discharge; (B) Cell using GmGT(II)-A anode. Black solid squares represent the 87% graphite/3% silicon/10% GmGT(II)-A charge. Black plus sign: 87% graphite/3% silicon/10% GmGT(II)-A material discharge.

Figure 21:
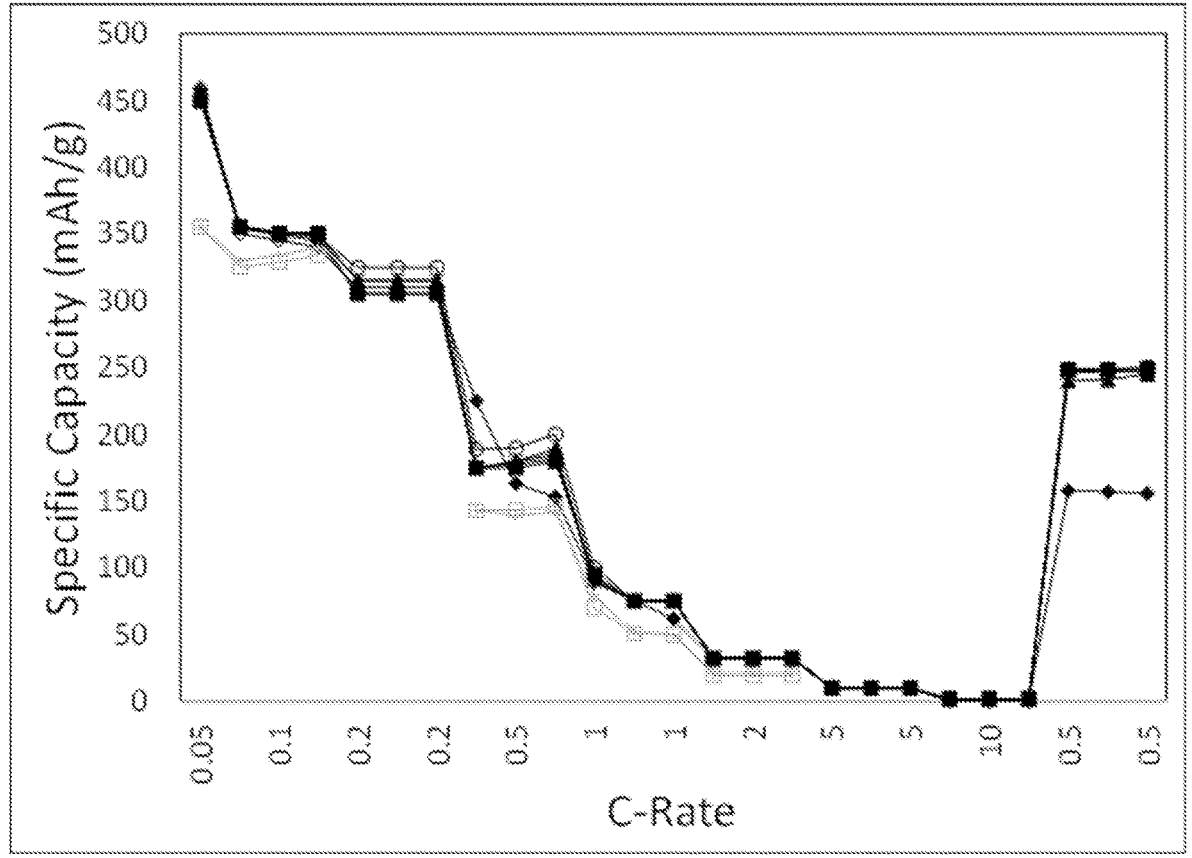

FIG. 21: Graph depicting capacity per gram of active material as a function of charge rate for a series of Li-GmO and Li-Gr composite cells. Each black line represents a half-cell containing a 10% blend of pre-GmGT(II) and GmGT(II)-A/90% graphite anode, and each gray line represents a control cell containing a Gr anode.

Figure 22:
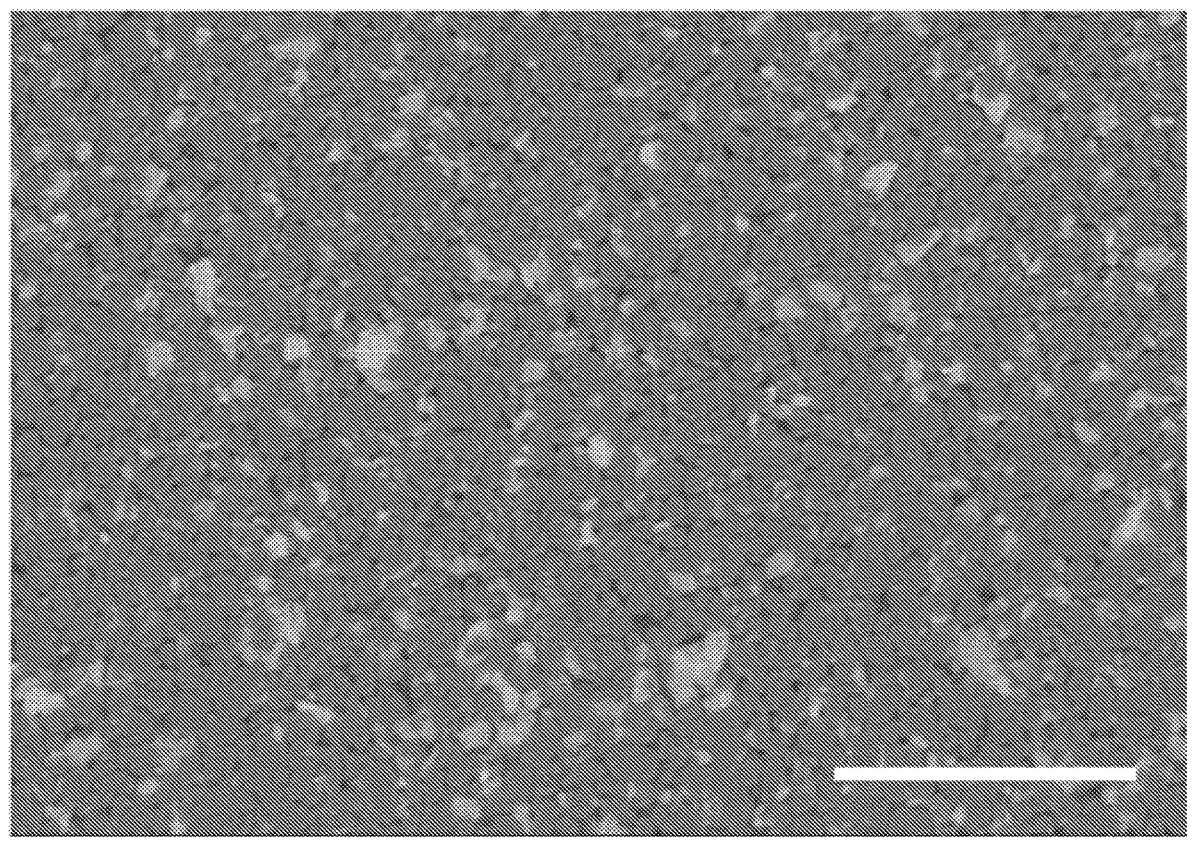

FIG. 22: Lower magnification backscattered electrons SEM image which shows homogeneous distribution of the GmGT(II)-A particles (bright features) within the graphite matrix. Relative concentration of these GmO-based particles is consistent with the 10/90 GmGT/Gr active anode composition (scale bar=100 μm).

Figure 23:
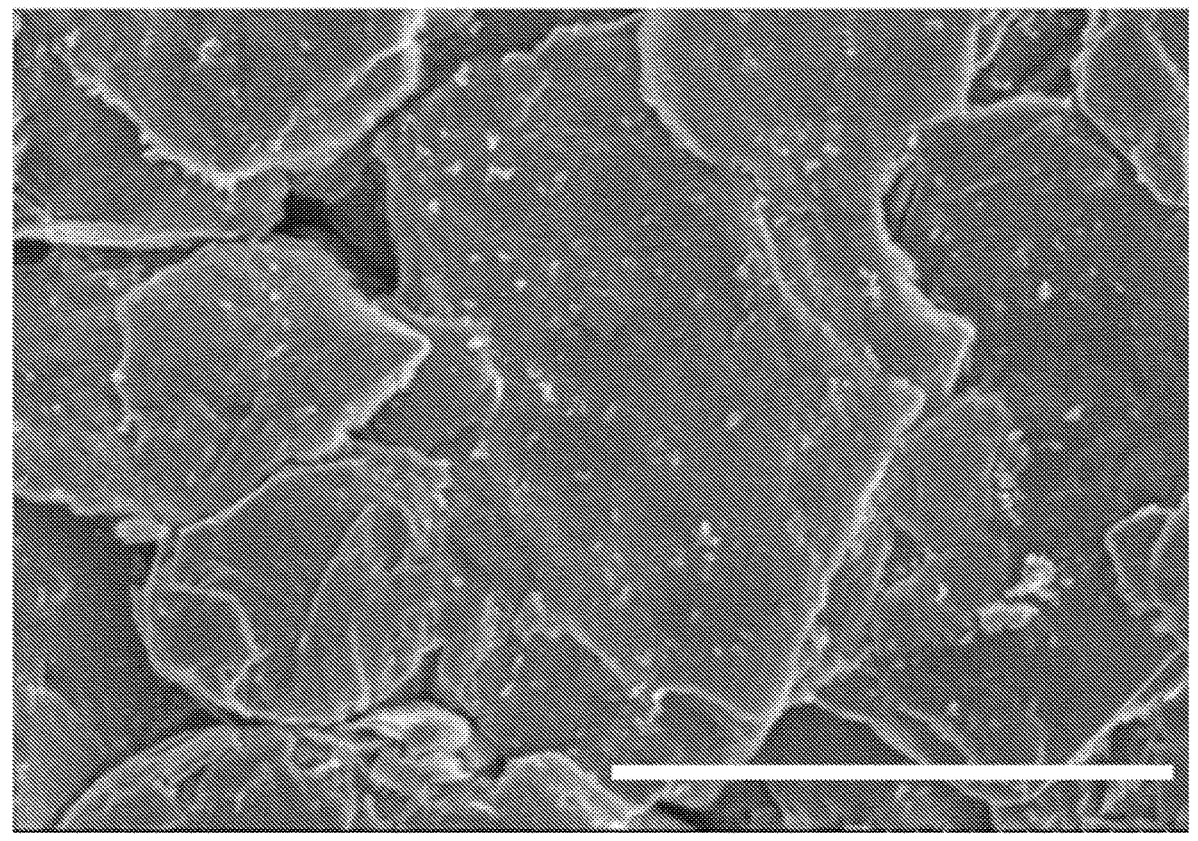

FIG. 23: Higher magnification secondary electron SEM image of a GmGT(II)-A particle (large central particle) showing evidence of two-dimensional flake-like morphology. Neighboring particles (mainly graphite) are well-connected to the GmGT(II)-A particle (scale bar=5 μm).

Figure 24:
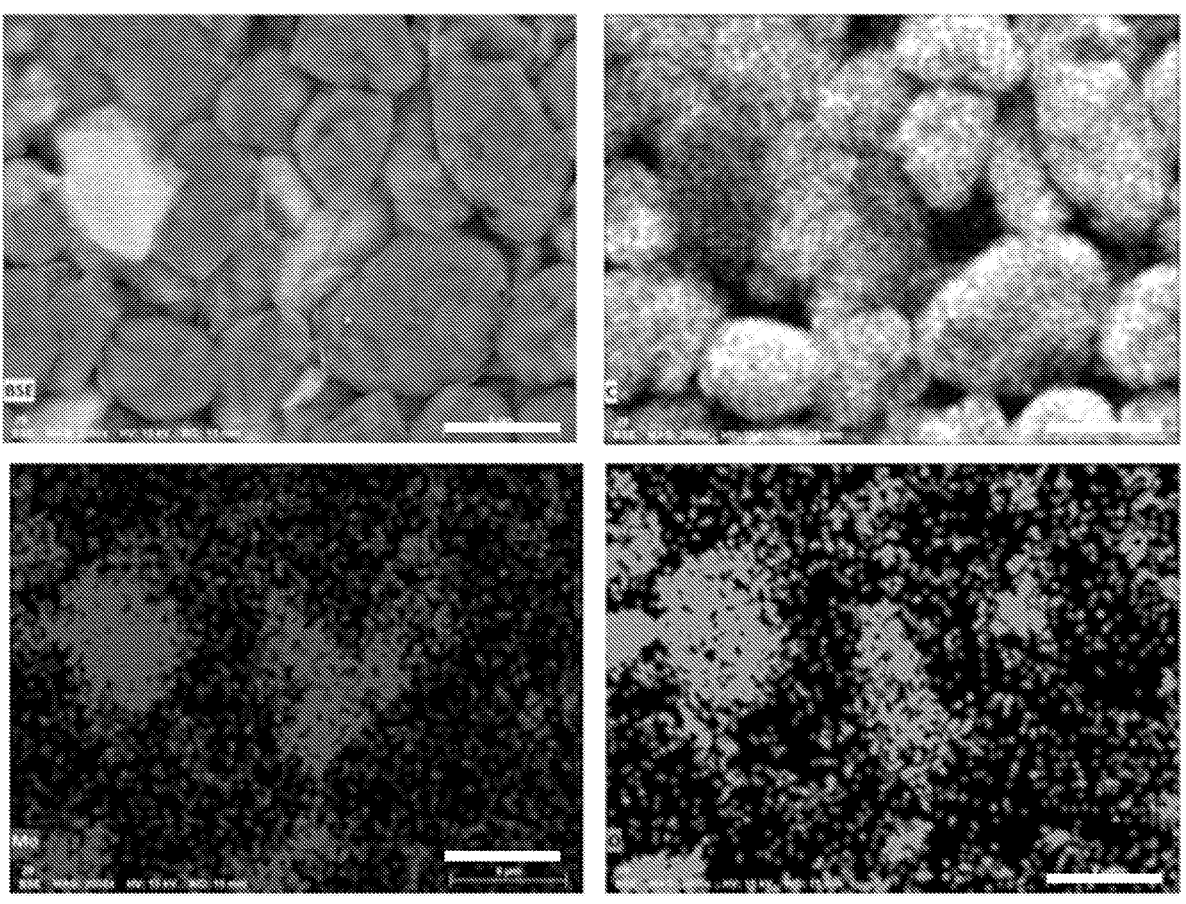

FIG. 24: Series of elemental maps (intensity scale between maps is not quantitative) of carbon distribution (brighter regions in the upper right panel), molybdenum distribution (bright regions in the lower left panel), and oxygen distribution (bright regions in the lower right panel) with a corresponding BSE image (upper left panel). Particles appearing bright in the BSE image (high Z) correspond to Mo- and O-rich regions in the corresponding elemental maps. Ibis is clear evidence that the GmGT(II)-A particles incorporate into the electrode preparation without chemical or mechanical decomposition (scale bar=9 μm).

Figure 25:
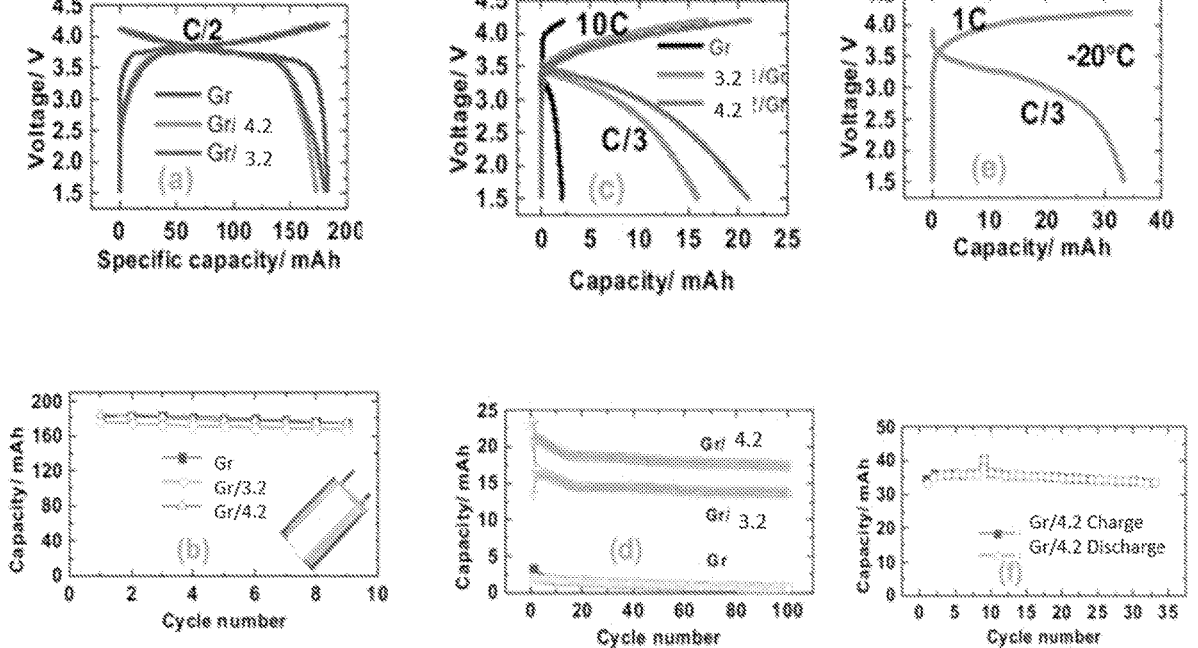

FIG. 25: Series of graphs depicting cycling performance of a 200 mAh pouch battery made using a LCO cathode and cathode comprising 10% of the inventive material disclosed herein (pre-GmGT(II) and GmGT(II)-A) and 90% graphite (Gr): (A) Charge/discharge curves of pouch cells with Gr, Gr/pre-GmGT(II), and Gr/GmGT(II)-A anodes at C/2 and RT demonstrating achieving of 200 mAh milestone; (B) Cyclic performance of these same batteries. The pouch cells were formatted at C/10, and then conditioned at C/2 for nine (9) cycles, followed by charging to 50% state of charge for impedance analysis; (C) Comparison of the charge/discharge curves of pouch cells with pure graphite (Gr), Gr with pre-GmGT(II), and Gr with GmGT(II)-A anodes, in which the cells were charged at 10C and discharged at C/3 to mimic the potential super-fast charging and normal driving EV conditions; (D) Corresponding cyclic performance of conditions used in A through C; (E) Charge/discharge profiles at −20° C.; the cell was charged at 1C and discharged at C/3, showing a capacity of 33 mAh, which is ~20% of the capacity at room temperature; and (F) corresponding cyclic performance of the batteries in E.

Figure 26:
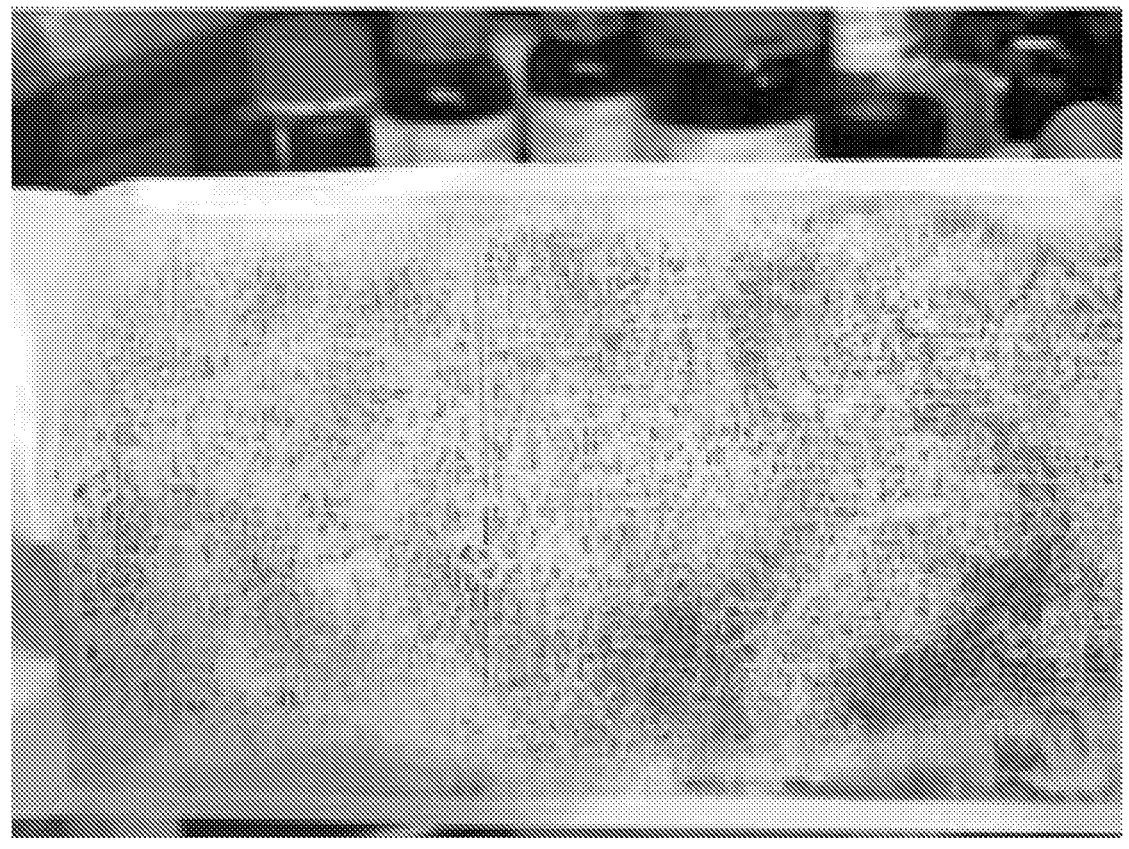

FIG. 26: Photograph showing a separator retrieved from a cycled 200 mAh graphite-only active-anode pouch cell. The photo clearly shows lithium powder deposition (brown regions).

Figure 27:
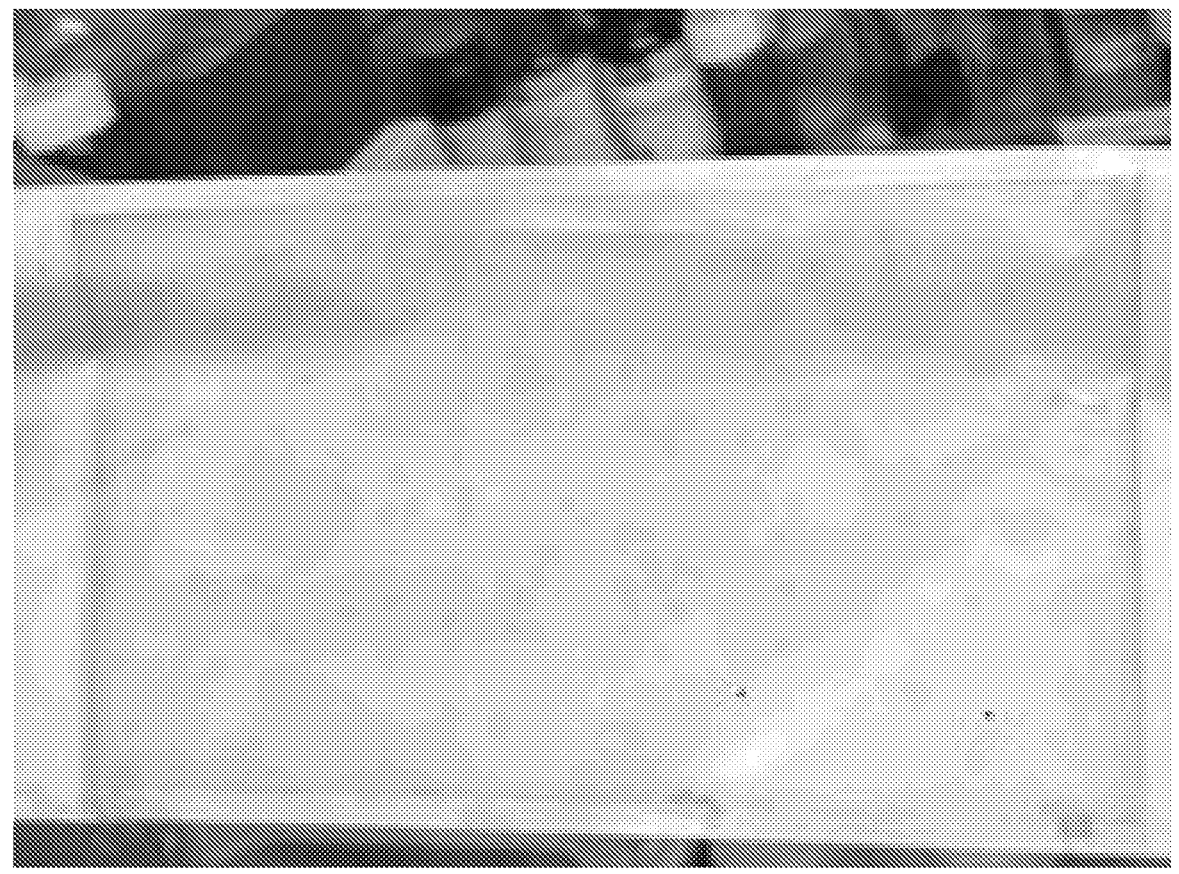

FIG. 27: Photograph of a separator retrieved from a cycled 200 mAh Gr/Si/GmGT(II)-A active-anode pouch cell. Here, the photo shows significantly less lithium powder deposition as compared to FIG. 26.

Figure 28:

FIG. 28: Photographic comparison of lithium deposition on anode surfaces for the same pouch cells of Gr/Si/GmGT (II)-A (left) and pure Gr (right) as shown in FIGS. 26 and 27. The golden/tan color of the Gr anode (right) indicates significant Li-plating. The darker brown color of the anode containing the inventive material indicates healthy battery performance.

Figure 29:
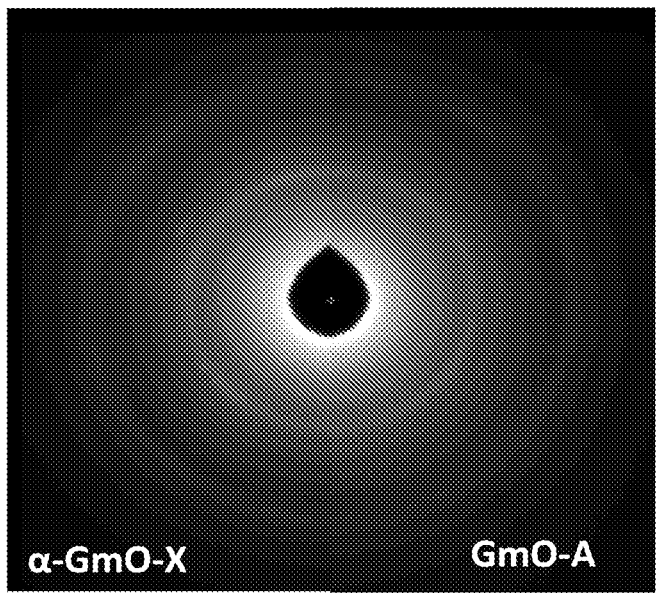
Figure 29:
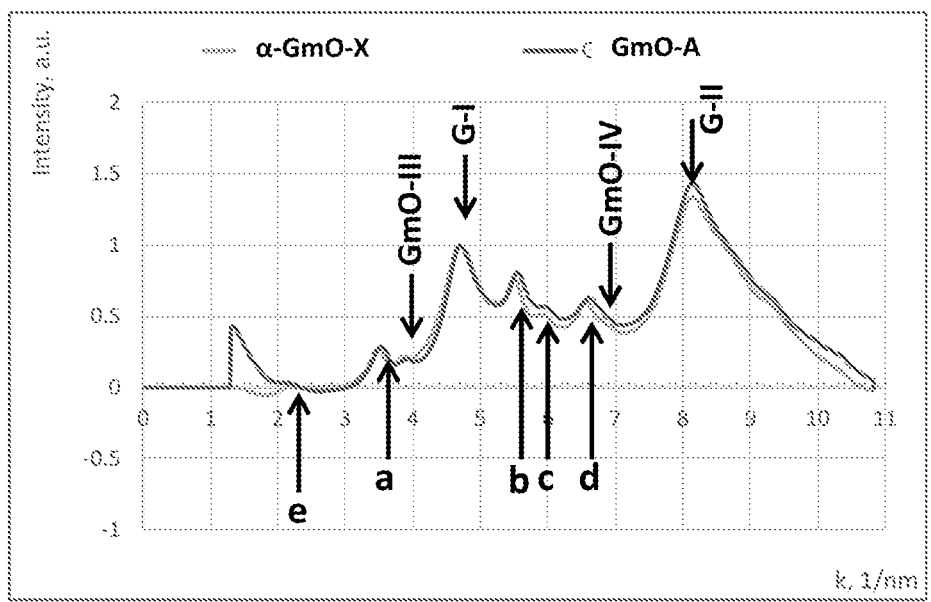

FIG. 29: Electron diffraction after first cycle of lithiation for GmGT(I)-X and GmGT(II)-A materials in anodes of LIB half-cells. (A) SAED patterns from autopsied materials shows that α-GmO and G rings are preserved and that there are five additional rings present in anode composite material after lithiation in a working cell. (B) SAED intensity profiles showing position and intensity of four major GmO and G diffraction peaks (labeled I-IV) and five new diffraction peaks due to lithiation (labeled a-d). Light gray intensity profiles are from GmGT(I)-X anodes, and dark gray are from GmGT(II)-A anodes.

Figure 30:
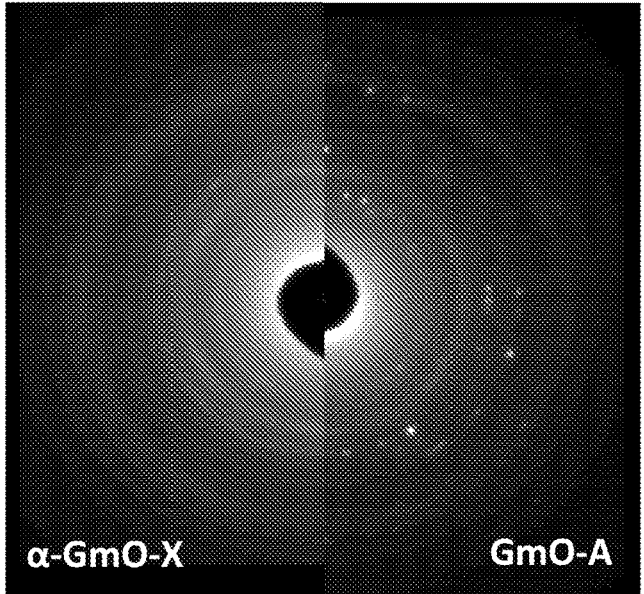
Figure 30:
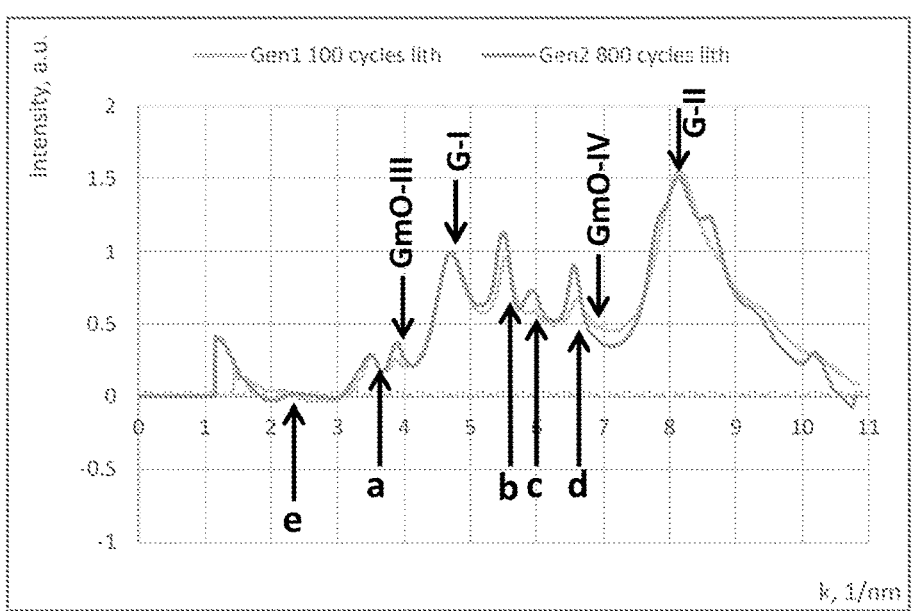

FIG. 30: Electron diffraction data after moderate (100) and larger (800) number of lithiation cycles in anodes of LIB half-cells for GmGT(I)-X and GmGT(II)-A materials respectively: (A) SAED patterns from autopsied materials shows that the unique diffraction rings seen after the first lithiation cycle remain present; (B) SAED intensity profiles showing position and intensity of four major α-GmO and G diffraction peaks (labeled I-IV) and five new diffraction peaks due to the lithiation process (labeled a-d). The graphene peaks (I and II) remain at the same position, the α-GmO (III and IV) peaks shift to slightly smaller scattering angles, and the five additional diffraction rings become stronger in intensity. Light gray intensity profiles are from GmGT(I)-X anodes, and dark gray are from GmGT(II)-A anodes.

Figure 31:
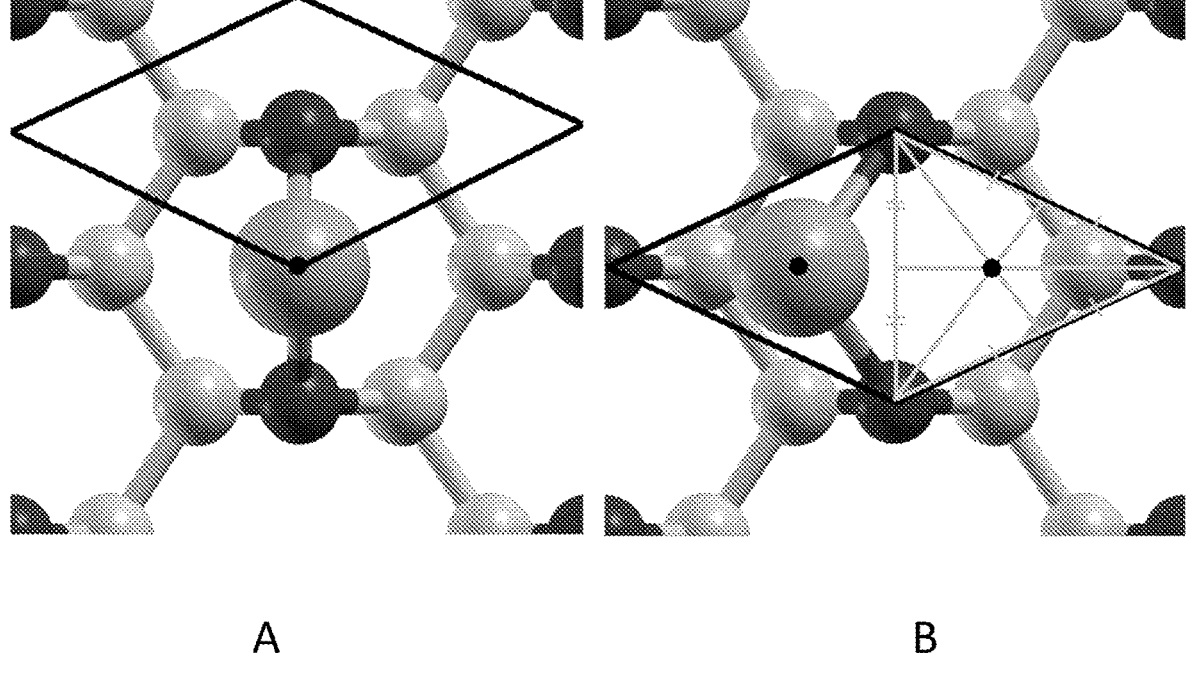

FIG. 31: Calculated favorable lattice sites for adsorption of single Li atom on GmO monolayer; (A) lowest energy site is the hollow H-site; (B) second lowest energy site is the S-site, a centroid of the triangle formed by three neighboring O-atoms. Equivalent a-GmO unit cells are shown in black. Top view. C-atoms are light gray, O-atoms are black Li-atoms are dark gray.

Figure 32:
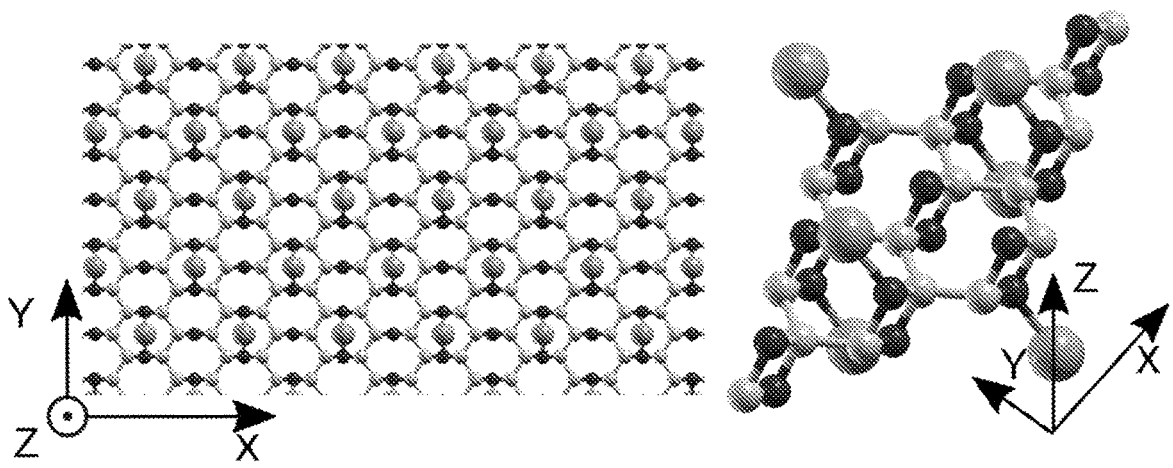
Figure 32:
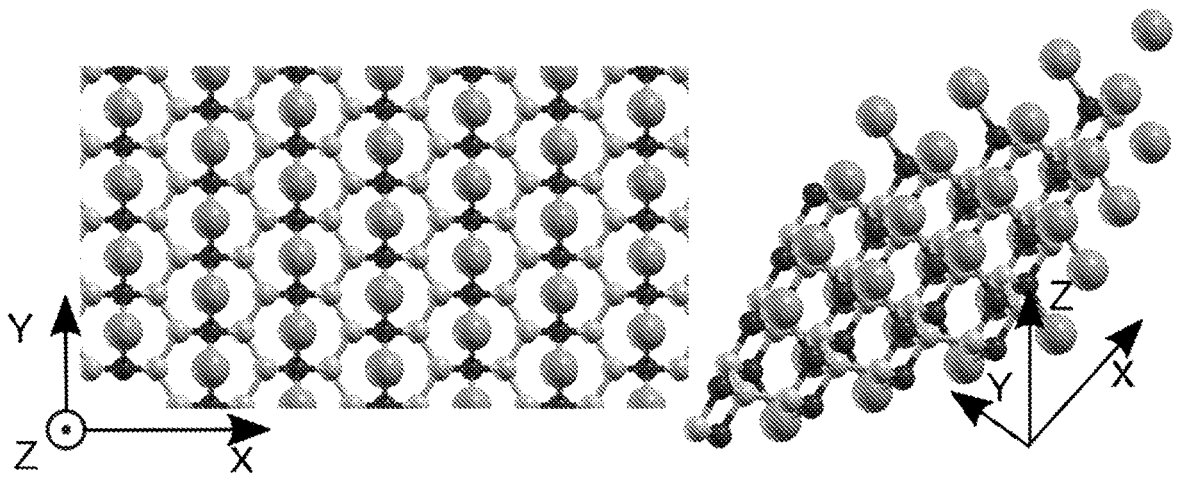

FIG. 32: Calculated structures of new compositions of matter formed by Li and a-GmO: (A) new $Li_2C_6O_6$ structure that is equivalent to hexal structure of maximally lithiated graphite with highest theoretical capacity of 372 mAh/g. (B) new GmO-based maximally lithiated $Li_2C_2O_2$ structure with highest theoretical specific capacity of 957 mAh/g, 2.6 times higher than graphite. Top view (Left) and Perspective view (Right). C-atoms are light gray, O-atoms are black Li-atoms are dark gray.

Figure 33:
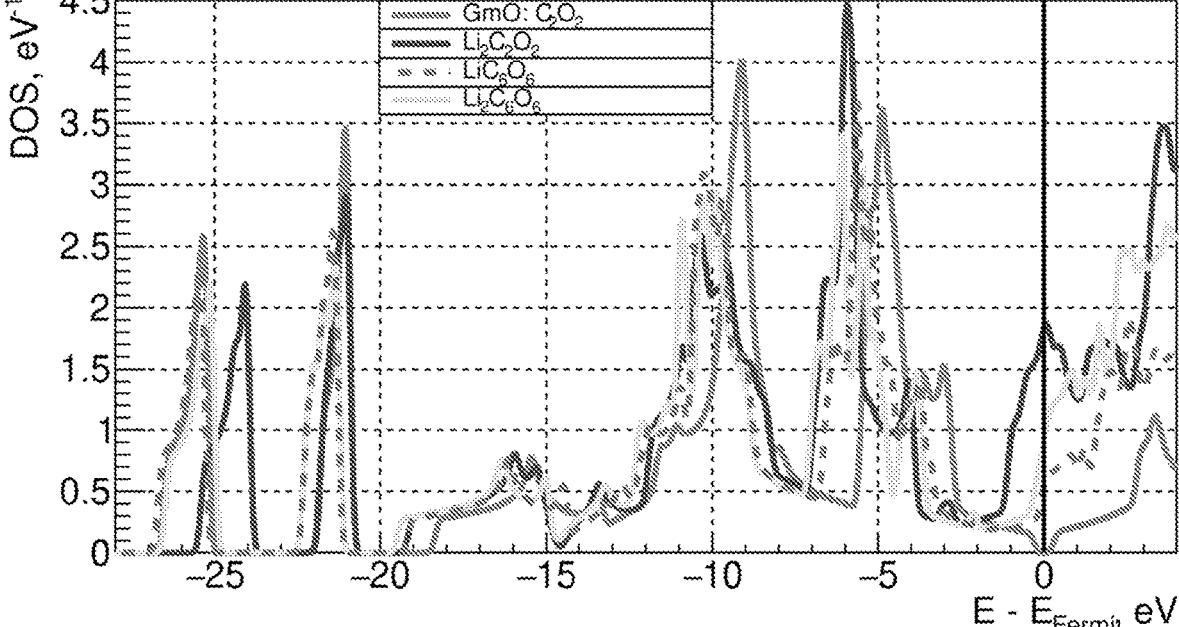

FIG. 33: Density of states (per GmO formula unit) for the fully relaxed α-GmO monolayer, which is semiconducting, and three representative $LiC_6O_6$, $Li_2C_6O_6$, and $Li_2C_2O_2$ structures that are predicted to be conductive because they have states at the Fermi energy, labeled at 0 eV. (The pure α-GmO monolayer does not have states at the Fermi energy but it has a small band gap.)

DETAILED DESCRIPTION

Abbreviations and Definitions:

As used herein and in the appended claims, singular articles such as "a" and "an" and "the" and similar referents in the context of describing the elements (especially in the context of the claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

Generally, reference to a certain element such as hydrogen or carbon includes all isotopes of that element, natural and artificial. For example, if an R group is defined to include hydrogen, it also includes deuterium ($^2$H) and tritium ($^3$H). Compounds comprising radioisotopes such as tritium, $^{14}$C, $^{32}$P and $^{35}$S are thus within the scope of the present technology. Procedures for inserting such labels into the compounds of the present technology will be readily apparent to those skilled in the art based on the disclosure herein.

2D=two dimensional. 3D=three dimensional. ATR-FTIR=attenuated total reflectance Fourier transform infrared spectroscopy. BCC=body-centered cubic. BSE-SEM=back-scattered electron scanning electron microscopy. DFT=density functional theory. DR-FTIR=diffuse reflectance Fourier transform infrared spectroscopy. EDS=energy dispersive X-ray spectroscopy. EXAFS=extended X-ray absorption fine structure spectroscopy. GmO=composition comprising graphene monoxide, a solid 2D form of CO. α-, β-, γ- δ-GmO=four crystal phases of GmO. GmGT(I)-X=composition of matter comprising regions of crystalline graphene monoxide (a-GmO dominant) with crystalline graphene (G) and molecular transition metal oxide (TMO). GmGT(I)-A=composition of matter comprising regions of amorphous GmO that creates crystalline α-GmO with further annealing, with crystalline G and molecular TMO. GmGT(I)-NC=composition of matter comprising regions of crystalline GmO (α-GmO dominant), with crystalline G and nanocrystalline TMO. GmGT(II)-A=composition of matter comprising regions of amorphous GmO, with crystalline graphene and molecular TMO. GmGT(II)-NC=composition of matter comprising regions of amorphous GmO, with crystalline graphene and crystalline TMO. GO=graphene oxide. GrSiGmGT=composition of matter comprising graphite/silicon/GmGT composite. HDPE=High density polyethylene. LGm=composition of matter comprising lithium graphene monoxide ($Li_xC_2O_2$). LCO=lithium cobalt oxide ($LiCoO_2$). NCA=lithium nickel cobalt aluminum oxide. NMC=nickel manganese cobalt oxide. NMR=nuclear magnetic resonance. RGA=residual gas analyzer. rGO=reduced graphene oxide. prGO=partially reduced graphene oxide. PTFE=polytetrafluoroethylene. SEM=scanning electron microscopy. TDA=thermal differential analysis. TEM=transmission electron microscopy. TEM-SAED=transmission electron microscopy—selected area electron diffraction. TGA=thermal gravimetric analysis. T-FTIR=transmission Fourier transform infrared spectroscopy. TM=transition metal. TMO=transition metal oxide.

As used herein, "graphene monoxide" or "GmO" refers to a two-dimensional crystal or amorphous graphene-based nanomaterial containing carbon and oxygen atoms in about a 1:1 stoichiometry and in specific structural building blocks. The alpha phase of crystalline GmO (α-GmO) has a centered rectangular crystal structure, with each unit cell containing four oxygen (O) and four carbon (C) atoms. The same lattice can also be described with a quasi-hexagonal primitive cell with two oxygen and two carbon atoms. The bonding of each $C_2O_2$ unit is such that the atoms in a single unit cell form a 1,3 dioxetane ring. Each oxygen atom bridges two carbon atoms, forming a single bond with each of the two carbon atoms. In this fashion, the carbon atoms in α-GmO form a single plane, and the oxygen atoms sit above and below the carbon plane.

In addition to α-GmO other crystalline forms of GmO are also described herein, named β-GmO, γ-GmO and δ-GmO, and their unique structural building blocks and crystal lattice unit cells are defined. All phases of crystalline and amorphous GmO can be understood as solid forms of carbon monoxide that are stable at a wide range of temperatures and pressures, including ambient temperature and pressure conditions. GmO also exists at high temperatures and/or low pressures, while all known phases of solid 3-dimensional CO crystals exist only at very low temperatures and/or very high pressures.

α-GmO=crystal phase of GmO with Cmmm symmetry and lattice constant of 0.313 nm (0.295 nm) and angle of 130° (120°) for relaxed rhombic (constrained hexagonal) conditions.

β-GmO=crystal phase of GmO with P6/mmm symmetry and hexagonal lattice constant of 0.507 nm and angle of 120°.

γ-GmO=crystal phase of GmO with C222 symmetry with lattice constant of 0.313 nm (0.295 nm) and angle of 130° (120°) for relaxed rhombic (constrained hexagonal) conditions. This structure can form a superlattice (2×2 and 4×4).

δ-GmO=crystal phase of GmO with Cmma symmetry, rhombic lattice constant of 0.333 nm and angle of 135°.

"Graphene" refers to single layers of graphite (i.e.. graphene monolayer), or randomly stacked graphene layers (i.e., few-layer or multilayer graphene), or locally ordered as AB- or AA-stacked graphene layers (i.e., graphite or graphite-like) (hereafter, "G").

"Transition metal" refers to the elements in Groups 3 to 12 of the periodic table, plus the elements of the lanthanide series (lanthanum through lutetium) and actinide series (actinium through lawrencium) of the periodic table.

Compositions of Matter:

General Description of GmGT-Based Material Synthesis:

The common processing elements of GmGT materials synthesis has two stages: I) preparing and mixing the ingredients; and II) thermal treatment of said mixture under specified conditions of atmosphere, pressure, temperature, and heating rate. Each of the stages can be carried into multiple steps to achieve desired results. Preferred synthesis examples of GmGT-based materials consists of three broad steps outlined as: 1) preparation and combination of feed materials; 2) lower-temperature thermal treatment with controlled variable heating rate up to temperature $T_1$; and 3) higher-temperature thermal treatment with controlled variable heating rate in an oxygen-controlled environment up to final temperature $T_f$. The thermal treatment step in this case is separated into two distinct thermal treatment steps with their own temperature profiles and environmental conditions.

Step 1 in the preferred route encompasses mixing an oxygenated carbon material, a transition metal material, and/or an additive material. The carbon source needs to contain atomic oxygen that is bound to carbon as part of the structure and distributed throughout the carbon source material. The relative atomic ratio of oxygen to carbon needs to be greater than about 0.15:1, and preferably greater than about 0.3:1, when heating is done in substantially oxygen free environment. The preferred method of synthesis at laboratory scales entails that the carbon material is an aqueous suspension of graphene oxide while the TM material is a solute or powder of TM-oxide compound that can be substantially uniformly distributed through the carbon source phase. This distribution can be achieved through mixing steps employing any suitable method of known states of art including mechanical agitation, stirring, sonication, planetary mixing, or milling. (Backes, Claudia, et al. "Production and Processing of Graphene and Related Materials." 2D Materials, vol. 7, no. 2, 2020, p. 022001., doi: 10.1088/2053-1583/able0a.) The efficacy of the transition metal source material could be due to the availability of multiple oxidation states that could support formation of GmO-based materials. In some embodiments, additives are incorporated to modify properties of the carbon source, the TM source, and/or the mixture of the carbon/TM source. Additives are acids, bases, peroxides, and/or other oxidizing and/or reducing agents used individually, in combination, or in sequence.

Step 2 in the preferred route encompasses lower-temperature (equal to, or below, Ti) thermal processing of the mixture produced in Step 1. This can include an explicit drying step to substantially remove water content from the mixture prior to thermal treatment above room temperature, or omitted as an explicit step when the mixture produced in Step 1 is of sufficient consistency that allows pelletization or granulation strategies to be employed, or when the mixture of Step 1 consists entirely of powders. As an explicit step, drying can be done by any suitable conventional method including tray drying, spray drying, infrared drying, freeze drying, or drum drying. The preferred method for laboratory synthesis is drying the produced mixture in borosilicate glass trays at temperatures ranging from about 20° C. up to below 100° C. for times ranging from hours to days depending on quantity of material and surface area of the trays to produce thin films of material on the order of 10's of microns in thickness.

Step 2 can also include an explicit sizing step to control morphology, size, and characteristic dimensions of material products, or to facilitate safe thermal processing above room temperature. Sizing can be done by any suitable conventional method, such as including mechanical chopping, cutting, grinding, milling, granulation, or extrusion/pelletization depending on the moisture content and/or morphology and characteristic dimensions of the material desired for subsequent processing steps. The preferred method for laboratory synthesis is mechanical chopping and/or coarse grinding to produce flake-like materials with lateral dimensions on the scale of millimeters.

The lower-temperature thermal processing of Step 2 can be done in any furnace/oven type and configuration known to the state of art suitable for controlled heating to temperature $T_1$. The active heating can be convective, conductive, or radiative in nature, including microwave or infrared heating. The environment of the material during this thermal treatment step can be static or flowing air, inert gas, or mixtures thereof, or low- or high-vacuum environments. The heating rate necessary to produce GmGT-based materials depends on the rate of gases evolved during the thermal processing, and the rate that those evolved gases can move away from the vicinity of the material-in-process. The heating rate therefore depends on the furnace/oven configuration, amount and containment of material being processed, the form factor and characteristic dimensions of the material, and the feed sources used in preparation of the material. The preferred method for laboratory synthesis is a low-vacuum box-type oven equipped with a PID temperature control unit, or a high-vacuum chamber equipped with electrical feedthroughs to facilitate resistive heating with a remote-programmed external power source.

Step 3 encompasses higher-temperature (above Ti) thermal processing of the material produced in Step 2, and can be done in any furnace/oven type and configuration known to the state of art suitable for controlled heating under an oxygen-free environment to final temperature Tr. The active heating can convective, conductive, or radiative in nature, including microwave or infrared heating. The environment of the material during this thermal treatment step can be static or flowing inert or unreactive gas, or high-vacuum environments. The heating rate necessary to produce GmGT-based materials depends on the rate of gases evolved during the thermal processing, and the rate that those evolved gases can move away from the vicinity of the material-in-process. The heating rate therefore depends on the furnace/oven configuration, amount and containment of material being processed, the form factor and characteristic dimensions of the material, and the feed sources used in preparation of the material. The preferred method for laboratory synthesis is a furnace configured for flow of nitrogen or argon gas, and equipped with a PID temperature control unit, or a high-vacuum chamber equipped with electrical feedthroughs to facilitate resistive heating with a remote-programmed external power source.

Step 3 can, as desired, include an explicit sizing step (as described above for Step 2) prior to thermal treatment to control morphology, size, and characteristic dimensions of material products, or to facilitate the higher-temperature processing efficiently or effectively. If a sizing step is not desired in Step 3, the higher-temperature processing can be carried out as an explicit continuation of the lower-temperature thermal processing of Step 2 with proper choice of furnace having capability to heat in an oxygen-controlled environment to required final temperature $T_f$. For example, one preferred method at laboratory scales is to use a high-vacuum chamber equipped with electrical feedthroughs to accommodate thermal processing as a single-stage step in the synthesis process. Some versions of GmGT materials could exploit other single-stage heating strategies, for example, utilizing rapid thermal processing approaches. Spray injection of suspensions produced from Step 1 utilizing atomizing or ultrasonic nebulization techniques can also be implemented as a single-step thermal treatment where the so-produced droplets are injected by an inert carrier gas like nitrogen into a multizone tube-like furnace configuration. The small droplet size in this approach facilitates safe heating, while the multizone heating facilitates final product synthesis.

The description below provides additional information and details to synthesize GmGT-based materials.

Carbon-Containing Suspensions Derived from Graphene Oxide Sources:

Table 1 summarizes specific exemplary versions of preparing carbon-based material derived from commercially available GO sources suitable for synthesis of GmGT-based materials. The composition of carbon-containing suspensions (referred to as Suspensions 1 through 8 in Table 1) are derived from multiple commercial GO sources comprising aqueous suspensions of monolayer, bilayer and few-layer GO with a range of solid-content GO concentrations. GO suspensions with low viscosity are measured with a graduated cylinder and those with high viscosity are weighed on a scale. The commercially available GO suspensions are agitated by hand or stirred with a glass rod for a few minutes prior to preparation of final suspensions. Distilled deionized water, measured with a graduated cylinder, is used to dilute commercial GO suspensions in some embodiments. Additives are incorporated in some embodiments in liquid or powder forms and their amounts are quantified for each embodiment using a graduated cylinder to measure liquids and a scale to measure powders. Additives can be acids, bases, peroxides, and other oxidizing and/or reducing agents used individually, in combination, or in sequence to control the oxygen functional groups present on the starting GO and to affect specifics of the composite end-product material. Certain additives, for example, the use of amino acids could, in addition to their ability to modify oxygen functional groups on carbon source materials, confer additional advantage due to their endothermic properties in certain temperature windows enabling safe synthesis of GmO containing materials. Specific additives in the examples of Table 1 include ascorbic and acetic acids and hydrogen peroxide. Suspensions including an additive component are covered with paraffin plastic film and mixed with a PTFE-coated magnetic stirrer while maintained at a specified temperature for a specified time. For temperatures above 21° C. the mixture is maintained in a water bath at the desired temperature. A pH meter is used to measure pH values of selected suspensions.

In one version, prior to specific suspension preparation, 100 g commercial aqueous 42 wt % GO suspension (The Sixth Element (Changzhou) Materials Technology Co., Ltd., Changzhou, China) was diluted to 10 wt % GO concentration by addition of 138 ml deionized distilled water and mixed to a smooth consistency with a glass stirring rod for about 10 minutes. The diluted GO solution was stored in a tightly closed HDPE bottle. To produce Suspension 1.2, the 10 wt % GO was stirred prior to weighing out 500 mg of material into a borosilicate glass beaker, which corresponds to 50 mg solid GO and 0.450 ml water. In a second borosilicate glass beaker, 15 mL deionized distilled water was added as measured with a graduated cylinder, to which 500 mg ascorbic acid powder was added and stirred with a glass rod until dissolved. The ascorbic acid solution was added to the first beaker, a PTFE-coated magnetic stirring rod was added to the mixture, and the beaker was covered with paraffin plastic film. The beaker was placed on a magnetic stirring plate for 96 hours at room temperature. Table 1 gives examples of multiple versions that start with GO. Other carbon-containing solutions and powders are included in a perturbation section below (see Table 5).

tion of a TM-containing solution includes a solvent, which is measured by graduated cylinder, and a precursor, often powder that is weighed on a scale. The solvent and the precursor are mixed with a magnetic stirrer, periodically agitated by hand, or stirred with a glass rod while maintained at a specified temperature for a specified time to equilibrate, and in some cases decanted from remaining solids using funnel and filter paper. In some versions, a second precursor is weighed by mass or measured by volume, added to the first solution, and stirred while maintained at a specified temperature for a specified time to equilibrate. In some embodiments, the second solution is also decanted from any remaining solids using funnel and filter paper. The final solutions contain a range of transition metal concentrations described as mol-TM/L. In some embodiments the final solution is dried on a shallow glass tray in a dehydrator at a specified temperature and converted to power form. In other embodiments specified compositions of TM-containing powders are procured commercially from materials and chemical suppliers.

The examples described in Table 2 are based on molybdenum and chromium. Similar embodiments of TM solutions and powders could be made based on vanadium and niobium, or other related metals. Any combination of these TM-containing solutions and/or powders could also enable formation of GmGT-based materials.

In one embodiment to produce Solution 2.1 (see Table 2), the following recipe was followed: 1 L of deionized distilled water (solvent) was mixed with about 3 g of $MoO_3$ powder (precursor 1) and stirred with a magnetic stirrer for 1 min per day for six (6) days while covered and maintained at 21° C. The solution was decanted into a second flask through a funnel and filter paper to remove any precipitates. To the second flask, about 3 g of Mo metal powder (precursor 2) was added and stirred daily for 6 days while covered and maintained at 21° C. The second solution was decanted into

TABLE 1

| | Carbon-containing suspensions derived from commercial graphene oxide sources. | | | | | | | |
| --- | --- | --- | --- | --- | --- | --- | --- | --- |
| | Susp. 1.1 | Susp. 1.2 | Susp. 1.3 | Susp. 1.4 | Susp. 1.5 | Susp. 1.6 | Susp. 1.7 | Susp. 1.8 |
| Solid content of GO | 400 mg | 50 mg | 750 mg | 750 mg | 750 mg | 100 g | 1 g | 320 mg |
| Additive | N/A | ascorbic acid powder | ascorbic acid powder | 5% acetic acid solution | 5% acetic acid solution | N/A | N/A | 3% hydrogen peroxide |
| Amount of additive | | 500 mg | 750 mg | 28 mL | 28 mL | | | 256 mL |
| Amount of water | 1 L | 15.45 mL | 150 mL | 122 mL | 122 mL | 1 L | 1 L | 80 mL |
| Mixing | agitate | stir | stir | stir | stir | stir | agitate | stir |
| Time | 30 sec | 72-96 hr | 120 min | 72 hr | 48 hr | 10 min | 30 sec | 2 min |
| Temp. | 21° C. | 21° C. | 55° C. | 21° C. | 65° C. | 21° C. | 21° C. | 21° C. |
| pH | 2.2 | N/A | N/A | N/A | N/A | 2.2 | N/A | N/A |

Methods for Synthesizing TM-Containing Solution and Powder:

Table 2 summarizes specific experimental versions of preparing TM-based materials derived from commercially available TM-containing sources suitable for synthesis of GmGT-based materials. Referencing Table 2, the composia final flask through a funnel and filter paper, removing precipitates that might be suspended in solution, and stored at room temperature covered. The solution so produced was a deep blue color and had a measured pH value of 3.0. In another version, Solution 2.1 was poured into a borosilicate glass beaker and heated at 52° C. in a dehydrator to generate Powder 2.2.

TABLE 2

| | Solution 2.1 | Solution 2.2 | Solution 2.3 | Solution 2.4 | Solution 2.5 |
|---|---|---|---|---|---|
| | | | Transition-metal containing solutions and powders. | | |
| Solvent | water | water | water | water | water |
| Amount of solvent | 1 L | 1 L | 1 mL | 1 L | 1 L |
| Precursor 1 | $MoO_3$ | $(NH_4)_6Mo_7O_{23} \cdot 4H_2O$ | $CrO_3$ | $MoO_3$ | $MoO_3$ |
| Amount of precursor 1 | ~3 g | 1.27 g | 10 mg | ~3 g | ~30 g |
| Mixing | stir 1 min/day | stir 2 min | stir 2 min | stir 1 min/day | N/A |
| Temperature | 21° C. | 21° C. | 21° C. | 21° C. | N/A |
| Time to equilibrate | 6 days | 2 min | 2 min | 6 days | N/A |
| Decant liquid | yes | no | no | yes | no |
| Precursor 2 | Mo | N/A | N/A | N/A | Mo |
| Amount of precursor 2 | ~3 g | | | | ~30 g |
| Mixing | stir 1 min/day | | | | stir 90 min |
| Temperature | 21° C. | | | | 65° C. |
| Time to equilibrate | 6 days at RT | | | | 2 days at RT |
| Decant liquid | yes | | | | Yes |
| pH | 3.0 | N/A | N/A | 3.6 | N/A |
| Thermal process | | | N/A | | |
| Transition metal concentration | $7.2 \times 10^{-3}$ mol-Mo/L | $7.2 \times 10^{-3}$ mol-Mo/L | 0.1 mol-Cr/L | $6.9 \times 10^{-3}$ mol-Mo/L | $\sim 7 \times 10^{-3}$ mol-Mo/L |

| | Powder 2.1 | Powder 2.2 | Powder 2.3 | Powder 2.4 | Powder 2.5 | Powder 2.6 |
|---|---|---|---|---|---|---|
| Solvent | N/A | water | N/A | N/A | N/A | N/A |
| Amount of solvent | | 1 L | | | | |
| Precursor 1 | $(NH_4)_6Mo_7O_{23} \cdot 4H_2O$ | $MoO_3$ | $MoO_2$ | $MoO_3$ | Mo | $C_{10}H_{14}MoO_6$ |
| Amount of precursor 1 | N/A | ~3 g | N/A | N/A | N/A | N/A |
| Mixing | | stir 1 min/day | | | | |
| Temperature | | 21° C. | | | | |
| Time to equilibrate | | 6 days | | | | |
| Decant liquid | | yes | | | | |
| Precursor 2 | | Mo | | | | |
| Amount of precursor 2 | | ~3 g | | | | |
| Mixing | | stir 1 min/day | | | | |
| Temperature | | 21° C. | | | | |
| Time to equilibrate | | 6 days at RT | | | | |
| Decant liquid | | yes | | | | |
| pH | | 3.0 | | | | |
| Thermal process | | 52° C. until dry | | | | |
| Transition metal concentration | $5.7 \times 10^{-3}$ mol-Mo/g | $7.2 \times 10^{-3}$ mol-Mo/g | $7.8 \times 10^{-3}$ mol-Mo/g | $6.9 \times 10^{-3}$ mol-Mo/g | $1.0 \times 10^{-2}$ mol-Mo/g | $3.1 \times 10^{-3}$ mol-Mo/g |

Methods to Synthesize Pre-GmGT(I) and Pre-GmGT(II) Materials:

Mixing: Combine the carbon source with the TM source in specified amounts; the mixing can be achieved by any known state of art suitable for mixing materials to a uniform and homogeneous state. For the specific examples shown in Table 3, the carbon source is agitated by hand for a few minutes prior to measuring into a beaker by weight or by volume. The TM source is measured by weight or by volume and added to the beaker containing the carbon source to derive the desired C/TM atomic ratio. In some versions, the concentration of the TM source is adjusted by omitting water from the source preparation described in Table 2. In other versions, quantities of deionized distilled water as measured with a graduated cylinder are added to the C/TM mixture. The combined mixture is stirred with a magnetic stirring rod or sonicated for a specified length of time at room temperature.

Drying and Recovery: The material suspension from the mixing beaker is carefully poured into borosilicate glass trays that are positioned inside a dehydrator that is open to air. The volume of the liquid suspension and the total area of the trays are controlled to obtain a desired thickness of the dried material, as the liquid suspension covers the entire tray area. The dehydrator is set to a specified temperature and the material is dried overnight.

In some versions, the material is not explicitly recovered from the drying trays; rather, the tray of dried material is fed directly to subsequent low-temperature processing steps. This method allows for faster processing because the materials do not require an explicit recovery step, for example by scraping up and collecting the material. This tends to yield a compact material having a layered morphology with lateral dimensions the same size of the drying tray. Material produced this way can be advantageously processed in this larger film-like format or used for further controlled sizing with cutting or grinding. This processing route could be advantageous for some applications, reducing the labor to produce materials that are fixed thickness (several to tens of microns or more) and large macroscopic lateral dimensions, including controlled lateral shapes by cutting for example.

In other versions, the dried material is scraped from the glass trays with the edge of a razor blade, collecting loosened material into a pile on the tray, chopped into course flakes and stored for further processing. The carbon-containing layers dry parallel to each other and the thickness of the flakes is quite uniform. Tray drying could also be accomplished by any variant of the known state of art including use of alternative types of inert tray material, alternative drying temperatures and times, or implementing a controlled environment for the drying process. Likewise, recovery of the dried material from the trays could be done by known states of the art suitable to such process including use of alternative scraping tools or mechanics. This drying method produces a very compact final material that is suitable for application in anodes in batteries. The method is scalable and suitable for industrial scale automated batch processing.

Alternatively, the material suspension is spray dried (for example at 1 kg/hour rate at 70° C. as measured in the drying chamber), then collected in powder form from the outlet of the dryer's collection cyclone. The characteristic diameter of the dried particles is controlled by the parameters of the spraying and drying processes producing individual carbon-containing layers that are folded. Spray drying is scalable, and provides control over the size, shape and internal morphology of the starting material that allows tuning to specific application objectives. For some application instances, this method does not require further sizing of the material. In addition to producing dried material for batch processing, this method is also suitable as a first step in a continuous spray reactor where the droplets are carried by an inert gas through different temperature regions, producing the dried particles of pre-GmGT and final GmGT materials in sequence and allowing the collection of the final material at the exit of the continuous reactor.

Alternatively, the material suspension can be freeze-dried (for example 20 L/hour evaporation rate at 50° C.), and then mechanically recovered from the tray by conventional methods. This method of drying and recovery of material allows speedier drying of starting solutions containing larger amounts of water as compared to conventional tray drying methods. Variants to the known state of art for freeze drying (for example by controlling the shelf temperature) can provide a less dense morphology of the dried material or allow tuning of the morphology/porosity of the dried material.

Alternatively, the material suspension is dried by milling or rotary methods using conventional equipment. In one example, the C/TM mixture is milled mechanically by mortar and pestle for 1 hour while heated at 50-70° C. This milling-assisted thermal drying method results in a powder that is collected from the mortar. This method is scalable, faster than tray drying, and provides further control over morphology and sizing of the material.

Sizing: In some embodiments, control of the characteristic lateral size of the material is required to load material into suitable containment vessels for further processing, to promote homogeneous processing, to control particle morphology and size, or to facilitate control of exothermic processes during low-temperature thermal processing steps. Conventional machinery for sizing dry material is used, including grinding methods with mortar and pestle, mechanical milling, chopping, and the like. In some working examples, dried material was chopped with a razor blade to flakes with about 5-10 mm characteristic lateral dimension. In other embodiments, material recovered from the drying step was transferred to an automated mortar and pestle (Netzsch RM 200 ceramic mortar and pestle) for sizing. In this case, no grinding medium was added. Gentle contact pressure between mortar and pestle is made (setting 0 on downward force and 6 of 10 possible turns of lateral pressure). Material was processed for 5 minutes to produce flakes of dried material to about 1-10 mm characteristic lateral flake size. Material was continuously fed manually to the grinding path by use of a homemade spatula consisting of a small square of celluloid film attached to a bamboo stick. In some embodiments, material was further processed in stages of increasing pressure between mortar and pestle and sieved to produce 25 μm powder. In some embodiments, no active sizing was done at this stage of synthesis.

Some versions of synthesis can result in a thick paste- or clay-like consistency of the carbon material/TM material mixture where a granulation or extrusion/pelletization sizing step can be implemented prior to drying, or fed directly to the lower-temperature thermal processing step. This approach can take advantage of low water-content synthesis routes, which can lead to significantly more cost- and time-effective production at large scales. Practical implementation of this strategy beyond the laboratory, in cases where GO materials form part of the starting feed stock, generally necessitates inclusion of additives during preparation of the carbon-material feed to chemically passivate the large exothermic nature of GO that occurs during thermal processing above 100° C. One version of this chemical passivation is expressed in Table 1 via Solutions 1.2 and 1.3 where ascorbic acid treatments are used to demonstrably reduce the subsequent exothermic nature of the mixed C/TM materials compared to equivalent mixtures without ascorbic acid treatment.

Lower-temperature Thermal Processing: The dried and sized material composition from the steps above is assessed for macroscopic homogeneity before use in thermal processing. It is weighed and inserted in a non-reactive material containment vessel that is either opened or covered with a lid. The loading is determined as average material mass/area and the form factor of the loaded material is noted as flakes, particles, or film depending on the characteristic lateral dimensions of the material. Different furnace types known in the state of art can be used to heat the material from room temperature up to about 300° C. or lower final temperature, including low-vacuum box, high-vacuum chamber, inert gas tube, or muffle air. The temperature for maximum rate of mass loss, $T_m$, is determined by thermal gravimetry (TGA) for inert gas and low vacuum conditions, and by residual gas analysis (RGA) in high vacuum. The heating rates must be controlled on approaching $T_m$ and on leaving $T_m$, while rates in the other temperature intervals are less important. The final temperature is selected based on the combination of carbon and TM sources used and the desired composite end-product material. The materials are evaluated throughout the process, at both the macroscopic and microscopic scales. If the materials appear to be heterogeneous at the macroscopic scale at any stage up to the low-temperature thermal processing step, the processing steps or material feed is considered sub-optimal and is not preferred. The nanoscale crystallinity of TM is also monitored by electron diffraction and the processing steps or material feed is considered sub-optimal and is not preferred if it results in significant crystallinity of the TM component. The ultimate goal of this processing step is to avoid a runaway thermal reaction (if it exists) and produce safe pre-GmGT materials (Table 3) that can then be heated in large quantities to higher temperatures to produce final GmGT materials (Table 4). Two types of product materials are considered desirable outcomes, pre-GmGT(I) or pre-GmGT(II), that form the basis for the creation of the desirable product materials in Table 4. The heating rates required to safely process materials to temperatures above possible exothermic behavior depends on the heating environment (for example high vacuum, low vacuum, inert gas, air), the total mass and mass loading of material, the characteristic dimension including thickness and form factor of the material, whether the containing vessel is covered or open, and the component starting materials (for example GO).

Sample 3.0 in Table 3 provides a representative working example, with additional working examples in Table 3 showing ranges of processing variables that can produce pre-GmGT(I) material. This intermediate product material is important as a safe precursor for creating crystalline GmGT-based materials. The process (exemplified by Sample 3.0 in Table 3) starts by mixing 175 mL of carbon-containing source (Suspension 1.1, Table 1) with 140 mL of TM-containing source (Solution 2.1, Table 2), without adding or omitting water from the prescribed recipes. Suspension 1.1 is agitated by hand for a few minutes and measured into a beaker. Solution 2.1 is measured into the same beaker as Suspension 1.1 and the mixture is stirred with a magnetic stirring rod. The stirring speed is adjusted so that a shallow vortex is formed in the liquid contents and it is mixed for 3-4 min at room temperature (21° C.).

The material suspension from the mixing beaker is carefully poured into a clean borosilicate glass tray that is positioned inside a dehydrator. The trays have a measured surface area about 722 cm², and the liquid suspension covers the entire tray area meaning the mixture will dry to produce roughly 25 μm uniform thickness film. The dehydrator is set to a drying temperature of 52° C., and the material is died overnight (24 hours). The dried material is scraped from the tray with the edge of a razor blade, collecting loosened material into a pile on the tray. The pile of material is scooped with the razor blade and chopped into course flakes about 5-10 mm characteristic lateral dimension with thickness of about 25 μm, which was controlled during the drying step by selection of total solid content and tray dimension. The collected material is placed in alumina-coated tantalum boat fitted with a tantalum cover, then heated resistively in high vacuum to about 300° C. The temperature of the resistively heated tantalum boat as a function of applied current is calibrated in separate calibration runs where the cited temperature comprises the average temperature read from a pyrometer directed at the center and edges of the boat cover for every approximately 5° C. increment above 500° C. and interpolated to room temperature by smooth polynomials of degree 2-6. The cited uncertainty in temperature reflects the spread of interpolated polynomial fits and variation in measured temperature across the containing vessel extrapolated to the cited temperature. The temperature at maximum loss of mass is 230±45° C. in this embodiment and this critical temperature was approached and left with a symmetrical slow ramp of 0.1° C./min. The TM species were found to be non-crystalline in this example. The outcome of this processing example is pre-GmGT(I).

To generate pre-GmGT(II) material using the same starting sources as for pre-GmGT(I) material and the same drying, recovery and sizing processes, the key difference is in the heating rates. Sample 3.1 in Table 3 shows that the temperature at maximum loss of mass, $T_m$, is again 230±45° C. but in this case, $T_m$ is approached five times faster, at 0.5° C./min, and left at the same slower rate of 0.1° C./min with an asymmetrical ramp profile. This intermediate product, pre-GmGT(II), is important as a safe precursor for creation of amorphous GmGT-based materials.

Samples 3.8, 3.9 and 3.10 (Table 3) demonstrate that adding specific TM sources in powder form can lead to inhomogeneities of the dried samples and subsequent failure of the established processes to create the desired final compositions of matter. Samples 3.3 and 3.4 show the contrary positive examples, that other specific TM powders can result in success. Sample 3.11 is another negative example where the omission of a TM source results in failure to produce either pre-GmGT(I) or pre-GmGT(II) material.

Figure 3:
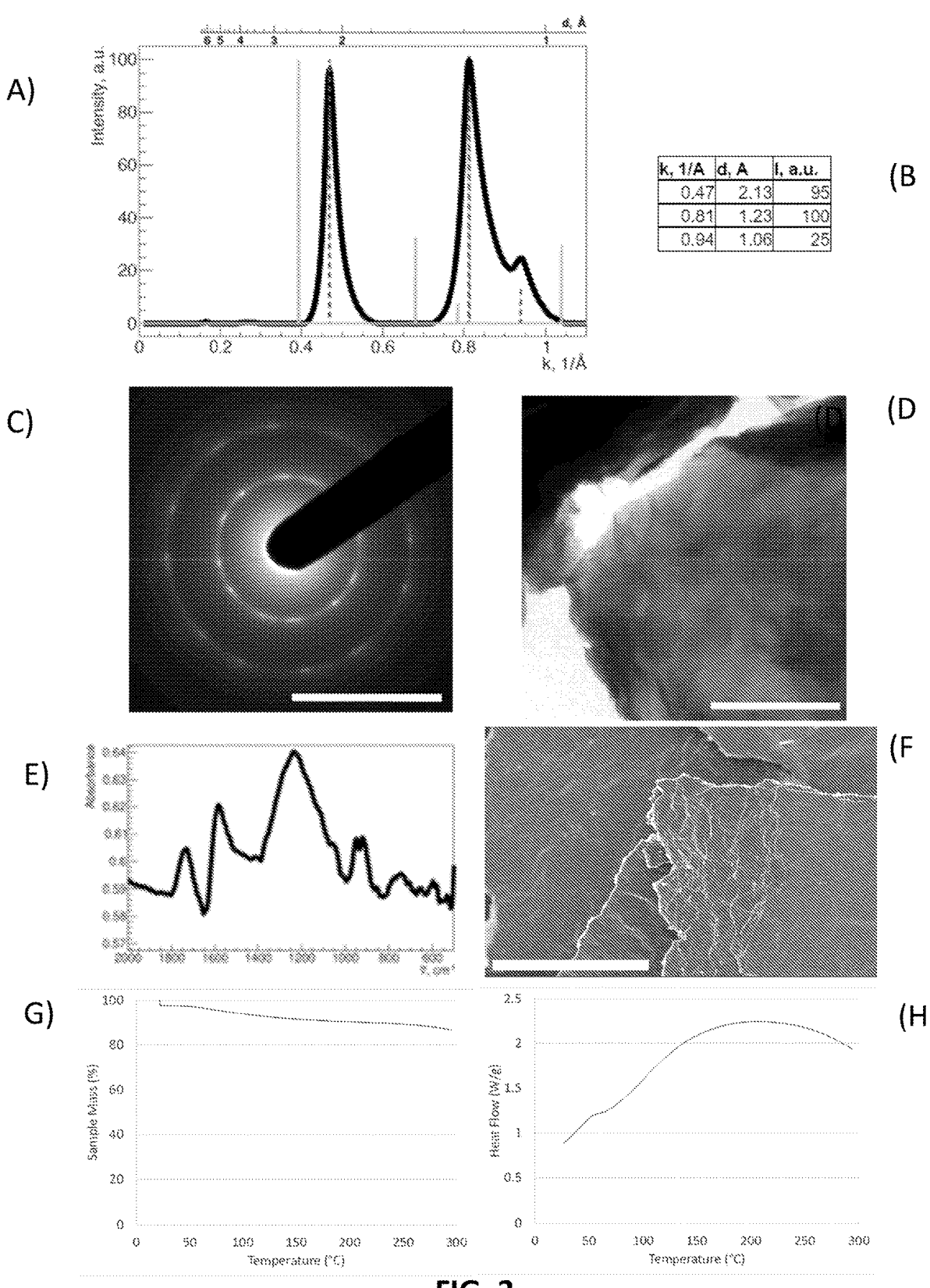
FIG. 3: Characterization signatures of pre-GmGT(I) precursor material: (A) SAED intensity profile (solid bold black) and peak positions for graphene (dashed dark gray). Note absence of crystalline α-GmO (solid bright gray) peaks; (B) Diffraction peak positions (k), lattice spacings (d) and intensities (I) measured from (A); (C) SAED pattern showing diffraction rings of randomly stacked multilayers of crystalline G (scale bar=10 1/nm); (D) Bright-field TEM image (scale bar=1 μm); (E) IR absorbance spectrum; (F) SEM image showing sections of large flakes (scale bar=40 μm). Sheet-like denser morphology is different than the wispy rGO morphology described in literature; (G) TGA curve of mass loss when materials is heated up to 300° C. under flow of argon gas. (H) DSC curve of associated heat flow with peak at 187.5° C. but with absence of strong exothermic reaction and with substantially lower enthalpy below 300° C. than is typically seen for GO.

FIG. 3 shows characterization for a representative pre-GmGT(I) material from Table 3 and is described in detail in the examples section below under Example 1

TABLE 3

Positive and negative examples to synthesize pre-GmGT(I) and pre-GmGT(II) materials.

| | Sample 3.0 | Sample 3.1 | Sample 3.2 | Sample 3.3 |
|---|---|---|---|---|
| Carbon source | Suspension 1.1 | Suspension 1.1 | Suspension 1.1 | Suspension 1.1 |
| Amount of carbon source | 175 mL | 175 mL | 175 mL | 175 mL |
| TM source | Solution 2.1 | Solution 2.1 | Solution 2.2* | Powder 2.2 |
| Amount of TM source | 140 mL | 140 mL | 272 mL | ~140 mg |
| Added/omitted water | N/A | N/A | −132 mL* | N/A |
| Mixing | stir | stir | stir | stir |
| Mixing time | 3-4 min | 3-4 min | 3-4 min | 30 min |
| Mixing temperature | 21° C. | 21° C. | 21° C. | 21° C. |
| Drying | tray | tray | tray | tray |
| Drying time | 24 hr | 24 hr | 24 hr | 24 hr |
| Drying temperature | 52° C. | 52° C. | 52° C. | 52° C. |
| Macroscopic homogeneity | homogeneous | homogeneous | homogeneous | homogeneous |
| Recovery of dried material | scrape | scrape | scrape | scrape |

US 12,673,870 B2

29 30

TABLE 3-continued

Positive and negative examples to synthesize pre-GmGT(I) and pre-GmGT(II) materials.

| | | | | |
|---|---|---|---|---|
| Sizing | chop,<br>5-10 mm | chop,<br>5-10 mm | chop,<br>5-10 mm | grind,<br>25 μm |
| Furnace type | high vacuum | high vacuum | high vacuum | high vacuum |
| Material containment | covered | covered | covered | covered |
| Material loading | 33 mg/cm$^2$ | 33 mg/cm$^2$ | 33 mg/cm$^2$ | 33 mg/cm$^2$ |
| Material form factor | flakes | flakes | flakes | powder |
| Temperature at maximum rate of mass loss, T$_m$ | 230 ± 45° C. | 230 ± 45° C. | 230 ± 45° C. | 230 ± 45° C. |
| Heating rate approaching T$_m$ | 0.1° C./min | 0.5° C./min | 0.1° C./min | 0.1° C./min |
| Heating rate leaving T$_m$ | 0.1° C./min | 0.1° C./min | 0.1° C./min | 0.1° C./min |
| Final temperature | 300° C. | 300° C. | 300° C. | 300° C. |
| Nanoscale crystallinity of TM species | non-crystalline | non-crystalline | non-crystalline | non-crystalline |
| Outcome | pre-GmGT(I) | pre-GmGT(II) | pre-GmGT(I) | pre-GmGT(I) |

| | Sample 3.4 | Sample 3.5 | Sample 3.6 | Sample 3.7 |
|---|---|---|---|---|
| Carbon source | Suspension<br>1.1 | Suspension<br>1.4 | Suspension<br>1.1 | Suspension<br>1.1 |
| Amount of carbon source | 175 mL | 50 mL | 175 mL | 175 mL |
| TM source | Powder 2.1 | Solution 2.1 | Solution 2.4 | Solution 2.5 |
| Amount of TM source | 133 mg | 10 mL | 133 mL | 133 mL |
| Added/omitted water | N/A | N/A | N/A | N/A |
| Mixing | stir | stir | stir | stir |
| Mixing time | 30 min | 3-4 min | 3-4 min | 3-4 min |
| Mixing temperature | 21° C. | 21° C. | 21° C. | 21° C. |
| Drying | tray | tray | tray | tray |
| Drying time | 24 hr | 24 hr | 24 hr | 24 hr |
| Drying temperature | 52° C. | 30° C. | 52° C. | 52° C. |
| Macroscopic homogeneity | homogeneous | homogeneous | homogeneous | homogeneous |
| Recovery of dried material | scrape | scrape | scrape | scrape |
| Sizing | chop,<br>5-10 mm | chop,<br>5-10 mm | chop,<br>5-10 mm | chop,<br>5-10 mm |
| Furnace type | high vacuum | tube | high vacuum | high vacuum |
| Material containment | covered | open | covered | covered |
| Material loading | 33 mg/cm$^2$ | 5 mg/cm$^2$ | 10 mg/cm$^2$ | 23 mg/cm$^2$ |
| Material form factor | flakes | flakes | flakes | flakes |
| Temperature at maximum rate of mass loss, T$_m$ | 230 ± 45° C. | 200° C. | 230 ± 45° C. | 230 ± 45° C. |
| Heating rate approaching T$_m$ | 0.1° C./min | 4.5° C./min | 0.1° C./min | 0.1° C./min |
| Heating rate leaving T$_m$ | 0.1° C./min | soak 20 min | 0.1° C./min | 0.1° C./min |
| Final temperature | 300° C. | 300° C. | 300° C. | 300° C. |
| Nanoscale crystallinity of TM species | non-crystalline | non-crystalline | non-crystalline | non-crystalline |
| Outcome | pre-GmGT(I) | pre-GmGT(I) | not pre-GmGT(I) | pre-GmGT(I) |

| | Sample 3.8 | Sample 3.9 | Sample 3.10 | Sample 3.11 |
|---|---|---|---|---|
| Carbon source | Suspension<br>1.1 | Suspension<br>1.1 | Suspension<br>1.1 | Suspension<br>1.1 |
| Amount of carbon source | 175 mL | 175 mL | 175 mL | 175 mL |
| TM source | Powder 2.3 | Powder 2.4 | Powder 2.5 | N/A |
| Amount of TM source | 133 mg | 150 mg | 100 mg | |
| Added/omitted water | N/A | N/A | N/A | |

TABLE 3-continued

Positive and negative examples to synthesize pre-GmGT(I) and pre-GmGT(II) materials.

| | | | | |
|---|---|---|---|---|
| Mixing | stir | stir | stir | |
| Mixing time | 4 days | 4 days | 4 days | |
| Mixing temperature | 21 deg C. | 21 deg C. | 21 deg C. | |
| Drying | tray | tray | tray | tray |
| Drying time | 24 hr | 24 hr | 24 hr | 24 hr |
| Drying temperature | 52° C. | 52° C. | 52° C. | 52° C. |
| Macroscopic homogeneity | heterogeneous | heterogeneous | heterogeneous | homogeneous |
| Recovery of dried material | N/A | N/A | N/A | scrape |
| Sizing | | | | chop, 5-10 mm |
| Furnace type | | | | high vacuum |
| Material containment | | | | covered |
| Material loading | | | | 33 mg/cm$^2$ |
| Material form factor | | | | flakes |
| Temperature at maximum rate of mass loss, $T_m$ | | | | 230 ± 45° C. |
| Heating rate approaching $T_m$ | | | | 0.1° C./min |
| Heating rate leaving $T_m$ | | | | 0.1° C./min |
| Final temperature | | | | 300° C. |
| Nanoscale crystallinity of TM species | | | | non-crystalline |
| Outcome | | | | negative (TRGO) |

| | Sample 3.12 | Sample 3.13 | Sample 3.14 | Sample 3.15 | Sample 3.16 |
|---|---|---|---|---|---|
| Carbon source | Suspension 1.1 | Suspension 1.1 | Suspension 1.6 | Suspension 1.1 | Suspension 1.6 |
| Amount of carbon source | 5.56 L | 43 mL | 6.85 mL | 25 mL | 7 mL |
| TM source | Solution 2.1 | Solution 2.1 | Solution 2.1 | Solution 2.1 | Solution 2.1 |
| Amount of TM source | 4.44 L | 34 mL | 137 mL | 50 mL | 140 mL |
| Added/omitted water | N/A | N/A | N/A | +325 mL | N/A |
| Mixing | stir | stir | stir | stir | stir |
| Mixing time | ~2 hr | 3-4 min | 3-4 min | 3-4 min | 3-4 min |
| Mixing temperature | 21° C. | 21° C. | 21° C. | 21° C. | 21° C. |
| Drying | spray dried | tray | tray | tray | tray |
| Drying time | 1 hr/L | 24 hr | 24 hr | 24 hr | 24 hr |
| Drying temperature | 70° C. | 52° C. | 52° C. | 52° C. | 52° C. |
| Macroscopic homogeneity | homogeneous | homogeneous | homogeneous | homogeneous | homogeneous |
| Recovery of dried material | collect powder | N/A | N/A | scrape | scrape |
| Sizing | N/A | | | chop, 5-10 mm | chop, 5-10 mm |
| Furnace type | tube | low vacuum | low vacuum | tube | high vacuum |
| Material containment | open | open | open | open | covered |
| Material loading | 12 mg/cm$^2$ | 1.2 mg/cm$^2$ | 4.6 mg/cm$^2$ | 8 mg/cm$^2$ | 33 mg/cm$^2$ |
| Material form factor | powder | film | film | flakes | flakes |
| Temperature at maximum rate of mass loss, $T_m$ | 200° C. | ~200° C. | ~200° C. | 200° C. | 230 ± 45° C. |
| Heating rate approaching $T_m$ | 4.5° C./min | 7° C./min | 0.5° C./min | 4.5° C./min | 0.1° C./min |
| Heating rate leaving $T_m$ | soak 20 min | 7° C./min | soak 30 min | soak 20 min | 0.1° C./min |

TABLE 3-continued

| Positive and negative examples to synthesize pre-GmGT(I) and pre-GmGT(II) materials. | | | | |
|---|---|---|---|---|
| Final temperature | 300° C. | 245° C. | 245° C. | 300° C. | 300° C. |
| Nanoscale crystallinity of TM species | non-crystalline | non-crystalline | non-crystalline | non-crystalline | non-crystalline |
| Outcome | pre-GmGT(I) | pre-GmGT(I) | pre-GmGT(I) | pre-GmGT(I) | pre-GmGT(I) |

| | Sample 3.17 | Sample 3.18 | Sample 3.19 | Sample 3.20 |
|---|---|---|---|---|
| Carbon source | Suspension 1.1 | Suspension 1.1 | Suspension 1.1 | Suspension 1.6 |
| Amount of carbon source | 175 mL | 175 mL | 5.56 L | 6.85 mL |
| TM source | Solution 2.1 | Solution 2.1 | Solution 2.1 | Solution 2.2 |
| Amount of TM source | 140 mL | 140 mL | 4.44 L | 171 mL |
| Added/omitted water | N/A | N/A | N/A | +5 mL |
| Mixing | stir | stir | stir | sonicate |
| Mixing time | 3-4 min | 3-4 min | ~2 hr | 30 min |
| Mixing temperature | 21° C. | 21° C. | 21° C. | 21° C. |
| Drying | tray | tray | spray dried | tray |
| Drying time | 24 hr | 24 hr | 1 hr/L | 24 hr |
| Drying temperature | 52° C. | 52° C. | 70° C. | 52° C. |
| Macroscopic homogeneity | homogeneous | homogeneous | homogeneous | homogeneous |
| Recovery of dried material | scrape | scrape | collect powder | N/A |
| Sizing | grind, 25 μm | grind, 25 μm | N/A | |
| Furnace type | low vacuum | low vacuum | high vacuum | low vacuum |
| Material containment | open | open | covered | open |
| Material loading | 3.2 mg/cm$^2$ | 3.2 mg/cm$^2$ | 33 mg/cm$^2$ | 4.6 mg/cm$^2$ |
| Material form factor | powder | powder | powder | film |
| Temperature at maximum rate of mass loss, $T_m$ | ~200° C. | ~200° C. | 230 ± 45° C. | ~200° C. |
| Heating rate approaching $T_m$ | 1.0° C./min | 7° C./min | 0.1° C./min | 0.5° C./min |
| Heating rate leaving $T_m$ | soak 10 min | 7° C./min | 0.1° C./min | soak 30 min |
| Final temperature | 245° C. | 245° C. | 300° C. | 245° C. |
| Nanoscale crystallinity of TM species | non-crystalline | non-crystalline | non-crystalline | non-crystalline |
| Outcome | pre-GmGT(I) | pre-GmGT(I) | pre-GmGT(I) | pre-GmGT(I) |

Methods to Synthesize GmGT(I) and GmGT(II) Materials:

To generate GmGT(I) or GmGT(II) materials, start with the respective pre-GmGT(I) or pre-GmGT(II) material, retained in its as-created form, or reduced to a smaller characteristic size, and expose it to further heating treatments. Any furnace type in the known state of art that can be used to heat material in a substantially oxygen-free atmosphere to about 600-1,000° C. or higher final temperature, including rotary furnaces, high temperature spray/nebulizing tube-like furnaces, high-vacuum chamber-like furnaces, or inert gas/vacuum tube-like furnaces, for example, can be used for this processing step. The material is placed in a nonreactive containment vessel, of open or covered type, and the average mass per area is determined by dividing the weighed mass of the loaded material by the base area of the vessel. The material form factor is noted as either films, flakes or powders. The filled vessel is loaded in a furnace, heated to the final temperature and kept there for a given time; specific examples provided in Table 4 are given primarily for embodiments of high vacuum chamber furnaces and for inert gas tube furnaces. The heating time reflects the average heating rate from the temperature of the maximum rate of mass loss ($T_m$) to the final temperature ($T_f$). The heating rate that is used in each embodiment is based on how much material is being heated, as determined by mass per area, whether the material is being contained in an open or covered vessel, and how fast evolving gasses are removed from the furnace to maintain desired pressures and mass transfer away from the vicinity of the sample. The vacuum furnace has a base pressure of $2 \times 10^{-6}$ torr. The gas fittings of the tube furnace accommodate switching between nitrogen and argon, including saturating the supply gas with water vapor to reactively control formation products, and allows for control of the gas flow rate. Supply gases including carbon dioxide or carbon monoxide could also be utilized as gases effectively inert to the material systems synthesized by these processes. Upon cooling to room temperature and removal from the furnace the material can be further sized to fit specification for electrode materials or other applications. The final product material is characterized with a multitude of methods described below.

Two broad classes of materials, GmGT(I) and GmGT(II), are obtained based on the heating rates used for their precursor materials, pre-GmGT(I) or pre-GmGT(II), respectively. In each class there are sub-classes that develop in sequence. The first series of materials starts with cases when slow thermal ramping rates are used to create pre-GmGT(I) material. The product material GmGT(I) series has three members: Either GmGT(I)-A: at temperatures lower than about 675° C.*, and defined as amorphous GmO. These compositions of matter can include areas of graphene and molecular TMO; or GmGT(I)-X: with further annealing between about 675-800° C.*, a crystalline form of GmO is formed. These compositions of matter can include areas of graphene and molecular TMO; or GmGT(I)-NC: when higher concentrations of TM are used, or the temperature is increased further, the GmGT(I)-based materials become decorated with TMO nanocrystals.

*The temperature ranges quoted here are specific to the source materials and process parameters used in Table 4.

The second series of materials is obtained in cases when fast thermal ramping rates are used to create specific pre-GmGT(II) materials. The product materials GmGT(II) series has two members:

GmGT(II)-A: Is produced either at temperatures lower than 600° C.*, or with further annealing between 600-800° C.*. These compositions of matter can include areas of graphene and molecular TMO.

GmGT(II)-NC: When higher concentrations of TM are used, or the temperature is increased further, the amorphous GmGT(II)-based materials become decorated with TMO nanocrystals.

*The temperature ranges quoted here are specific to the source materials and process parameters used in Table 4.

It is important to note that the final product GmGT materials, which are described in Table 4 as results of a sequential two-step heating process (e.g., pre-GmGT(I) created in one heating system and transferred to a different heating system to create GmGT(I)), can also be created in a one-step process in the same oven/furnace that is designed to allow conditions needed for continuous thermal treatment through synthesis of pre-GmGT(I) to synthesis of end-product GmGT(I) in and uninterrupted thermal process.

Sample 4.1 in Table 4 is an illustrative example that enables formation of GmGT(I) material. It starts with pre-GmGT(I) material, exemplified by Sample 3.0 in Table 3, exposing it to further heating treatment in a high vacuum chamber. The material is placed in a nonreactive alumina-lined tantalum boat with a tantalum cover, with material loading of 33 mg/cm$^2$ and material form factor being flakes. The filled tantalum boat is loaded between the electrodes of the vacuum furnace designed for resistive heating, the base pressure is established at $2 \times 10^{-6}$ torr, the sample heated to the final temperature ($T_f$) of 730±20° C., as measured by a pyrometer, and kept at $T_f$ for 10 minutes. Variable heating rates to maintain an approximately constant total pressure of the system are used for a total time of 15 hr 17 min to reach $T_f$ from the temperature of the maximum rate of mass loss ($T_m$) and reflects the average heating rate over this temperature range. Specifics of the heating profile in this temperature range (from $T_m$ to $T_f$) are chosen to maintain an approximately uniform and continuous mass loss as determined by residual gas analysis calibration experiments. Upon cooling to room temperature and removal from the vacuum furnace the material is further sized to fit specification for electrode materials. The final product is characterized with multitude of methods described below.

Sample 4.2 in Table 4 is an illustrative example how to generate GmGT(II) material. It starts with pre-GmGT(II) material, exemplified by Sample 3.1 in Table 3, exposing it to further heating treatment in a high vacuum chamber. The material is placed in a nonreactive alumina-lined tantalum boat with a tantalum cover with material loading of 33 mg/cm$^2$ and material form factor of flakes. The filled tantalum boat is loaded between the electrodes of the vacuum furnace designed for resistive heating, the base pressure is established at $2 \times 10^{-6}$ torr, the sample heated to the final temperature ($T_f$) of 730±20° C., as measured by a pyrometer, and kept at $T_f$ for 10 min. Variable heating rates to maintain an approximately constant total pressure of the system are used for a total time of 20 hr 47 min to reach $T_f$ from the temperature of the maximum rate of mass loss ($T_m$) and reflects the average heating rate over this temperature range. Specifics of the heating profile in this temperature range (from $T_m$ to $T_f$) are chosen to maintain an approximately uniform and continuous mass loss as determined by residual gas analysis calibration experiments. Upon cooling to room temperature and removal from the vacuum furnace the material is further sized to fit specification for electrode materials. The final product is characterized with multitude of methods.

FIGS. 4-7 shows characterization for representative GmGT product materials from Table 4. These figures are described in detail in the examples section below under Example 2, while Examples 4 and 5 give more specific detail without figures.

TABLE 4

Positive and negative examples to synthesize GmGT(I) and GmGT(II) materials.

| | Sample 4.1 | Sample 4.2 | Sample 4.3 | Sample 4.4 |
|---|---|---|---|---|
| Starting sample | Sample 3.0 | Sample 3.1 | Sample 3.2 | Sample 3.17 |
| Furnace type | high vacuum | high vacuum | high vacuum | tube furnace |
| Material containment | covered | covered | covered | open |
| Material loading | 33 mg/cm$^2$ | 33 mg/cm$^2$ | 33 mg/cm$^2$ | 16 mg/cm$^2$ |
| Material form factor | flakes | flakes | flakes | powder |
| Base pressure | $2 \times 10^{-6}$ torr | $2 \times 10^{-6}$ torr | $2 \times 10^{-6}$ torr | N/A |
| Gas | N/A | N/A | N/A | Nitrogen |
| Gas flow rate | N/A | N/A | N/A | 3.1 L/min |
| Final temperature, $T_f$ | 730 ± 20° C. | 730 ± 20° C. | 780 ± 20° C. | 725° C. |

TABLE 4-continued

Positive and negative examples to synthesize GmGT(I) and GmGT(II) materials.

| | | | | |
|---|---|---|---|---|
| Soak at $T_f$ | 10 min | 10 min | 4 hr | 10 min |
| Time to heat from $T_m$ to $T_f$ | 15 hr 17 min | 20 hr 47 min | 15 hr 45 min | 1 hr 32 min |
| Outcome | GmGT(I) | GmGT(II) | GmGT(I) | GmGT(I) |

| | Sample 4.5 | Sample 4.6 | Sample 4.7 | Sample 4.8 |
|---|---|---|---|---|
| Starting sample | Sample 3.13 | Sample 3.3 | Sample 3.4 | Sample 3.11 |
| Furnace type | tube furnace | high vacuum | high vacuum | high vacuum |
| Material containment | open | covered | covered | covered |
| Material loading | ~1 mg/cm$^2$ | 12 mg/cm$^2$ | 33 mg/cm$^2$ | 31 mg/cm$^2$ |
| Material form factor | flakes | powder | flakes | flakes |
| Base pressure | N/A | $2 \times 10^{-6}$ torr | $2 \times 10^{-6}$ torr | $2 \times 10^{-6}$ torr |
| Gas | Nitrogen | N/A | N/A | N/A |
| Gas flow rate | 4.2 L/min | N/A | N/A | N/A |
| Final temperature, $T_f$ | 725° C. | 780 ± 20° C. | 780 ± 20° C. | 780 ± 20° C. |
| Soak at $T_f$ | 10 min | 4 hr | 4 hr | 4 hr |
| Time to heat from $T_m$ to $T_f$ | 1 hr 32 min | 15 hr 45 min | 15 hr 45 min | 15 hr 45 min |
| Outcome | GmGT(I) | GmGT(I) | GmGT(I) | negative (no α-GmO) |

| | Sample 4.9 | Sample 4.10 | Sample 4.11 | Sample 4.12 |
|---|---|---|---|---|
| Starting sample | Sample 3.6 | Sample 3.0 | Sample 3.19 | Sample 3.12 |
| Furnace type | high vacuum | high vacuum | high vacuum | tube furnace |
| Material containment | covered | covered | covered | open |
| Material loading | 10 mg/cm$^2$ | ~55 mg/cm$^2$ | 4.2 mg/cm$^2$ | 12 mg/cm$^2$ |
| Material form factor | flakes | flakes | powder | powder |
| Base pressure | $2 \times 10^{-6}$ torr | $2 \times 10^{-6}$ torr | $2 \times 10^{-6}$ torr | N/A |
| Gas | N/A | N/A | N/A | Nitrogen |
| Gas flow rate | N/A | N/A | N/A | 1.4 L/min |
| Final temperature, $T_f$ | 705 ± 20° C | 680 ± 20° C | 780 ± 20° C | 800° C |
| Soak at $T_f$ | 10 min | 10 min | 4 hr | 10 min |
| Time to heat from $T_m$ to $T_f$ | 15 hr 5 min | 14 hr 51 min | 15 hr 45 min | 1 hr 40 min |
| Outcome | negative (no α-GmO) | GmGT(I) | negative (no α-GmO) | GmGT(I) |

| | Sample 4.13 | Sample 4.14 | Sample 4.15 | Sample 4.16 |
|---|---|---|---|---|
| Starting sample | Sample 3.18 | Sample 3.5 | Sample 3.7 | Sample 3.15 |
| Furnace type | tube furnace | tube furnace | high vacuum | tube furnace |
| Material containment | open | open | covered | open |
| Material loading | 15 mg/cm^2 | ~5 mg/cm$^2$ | 23 mg/cm$^2$ | 8 mg/cm$^2$ |
| Material form factor | powder | flakes | flakes | flakes |
| Base pressure | N/A | N/A | $2 \times 10^{-6}$ torr | N/A |
| Gas | Nitrogen | Nitrogen | N/A | Nitrogen |
| Gas flow rate | 4.5 L/min | 1.4 L/min | N/A | 1.4 L/min |
| Final temperature, $T_f$ | 725° C. | 725° C. | 780 ± 20° C. | 800° C. |
| Soak at $T_f$ | 10 min | 10 min | 10 min | 10 min |
| Time to heat from $T_m$ to $T_f$ | 1 hr 32 min | 1 hr 32 min | 15 hr 45 min | 1 hr 40 min |
| Outcome | GmGT(I) | GmGT(I) | GmGT(I) | GmGT(I) |

| | Sample 4.17 | Sample 4.18 | Sample 4.19 |
|---|---|---|---|
| Starting sample | Sample 3.16 | Sample 3.20 | Sample 3.14 |
| Furnace type | high vacuum | tube furnace | high vacuum |
| Material containment | covered | open | covered |
| Material loading | 26 mg/cm$^2$ | ~5 mg/cm$^2$ | 5 mg/cm$^2$ |
| Material form factor | flakes | flakes | film (3 pieces) |
| Base pressure | $2 \times 10^{-6}$ torr | N/A | $2 \times 10^{-6}$ torr |
| Gas | N/A | Nitrogen | N/A |

TABLE 4-continued

Positive and negative examples to synthesize GmGT(I) and GmGT(II) materials.

| | | | |
|---|---|---|---|
| Gas flow rate | N/A | 1.4 L/min | N/A |
| Final temperature, $T_f$ | 780 ± 20° C. | 725° C. | 780 ± 20° C. |
| Soak at $T_f$ | 4 hr | 10 min | 4 hr |
| Time to heat from $T_m$ to $T_f$ | 15 hr 45 min | 1 hr 32 min | 15 hr 45 min |
| Outcome | GmGT(I) | GmGT(I) | negative (no α-GmO) |

Effect of Variations of Carbon Sources, Additives, TM Sources and Process Conditions on Synthesizing GmGT(I) and GmGT(II) Materials:

The general process description for this section follows the process descriptions given in the above sections, documented in Tables 1-4 and their illustrative examples, but with one important difference. Here we demonstrate results from intentional and controlled perturbations to the starting sources and, in some embodiments, the process parameters that go beyond the source compositions and process parameter ranges detailed in the above sections.

Carbon Sources and Additives: In addition to using commercial aqueous suspensions of GO as a starting carbon source, as was done in Table 1, Suspensions 1.1, 1.2, 1.3, 1.5, 1.6, 1.7, and 1.8 are used again and exposed to further process perturbations as detailed in Table 5 that further includes several alternative carbon sources as feed stock to established processes. Some of the alternative carbon sources are in close proximation to GO, like exploring concentrated graphene oxide aqueous suspensions and powders to reduce times for drying, adding acids or bases to established C/TM mixtures to change the pH of the suspension, exploring chemically treated partially reduced GO from commercial sources, and using hydrothermal methods to making GO from sugar solutions at laboratory scales. Commercial graphite and expanded graphite powders were also explored. Lignin powder was the most dissimilar source because it does not contain graphene or graphene oxide layers.

TM Sources: Transition metal oxides are added to the carbon and additive source, or not, as specified in Table 5, to design a desirable range of atomic or molar ratios of the constituent components of the final composites. The preparation of TM-containing solutions is described in Table 2 and the accompanying text.

Mixing, Drying, Recovery, and Sizing: Mixing of the carbon and TM source, with or without an additive, is done in specified amounts and stirred for specified time at specified temperature. Drying is performed on trays in a dehydrator, by spray drying, by freeze drying, by thermally assisted milling, or other methods in the known state of art. Recovery is different for differing drying methods and can be done according to any known state of art suitable to the drying method. The material is sized either once, or in sequential steps, to optimize the demands of the thermal processing steps and the final intended application of the product materials, and can be done using any known state of art method suitable for sizing dried or essentially dried material.

Thermal Processing: A dried and sized material composition from the steps above is assessed for macroscopic homogeneity before use in a two-step thermal processing in two different types of furnaces, or in a one-step thermal process in the same furnace, but with controlled variable heating rates in the lower and high temperature regions. Furnace types from known states of art can be used as described above. It is important to control exothermic reactions to avoid run away of the controlled perturbations at the lower-temperature thermal processing steps, and to provide a substantially oxygen-free environment at the higher-temperature thermal processing steps.

FIGS. 8-14 show characterizations for specific perturbations relating to GmGT materials from Table 5. These figures are described in detail in the examples section below under Examples 6-11.

TABLE 5

Perturbations to process variables.

| | Sample 6.1 | Sample 6.2 | Sample 6.3 | Sample 6.4 |
|---|---|---|---|---|
| Carbon source | Suspension 1.7 | 0.5 wt % GO solution | lignin powder | expanded graphite (EG) powder |
| Amount of carbon source | 10 mL | 20 mL | 26 mg | 700 mg |
| TM source | Solution 2.1 | Solution 2.1 | Solution 2.1 | Solution 2.1 |
| Amount of TM source | 20 mL | 50 mL | 5.2 mL | 140 mL |
| Additive | N/A | 330 mL water | N/A | N/A |
| Mixing | stirring rod | magnetic stirrer | stirring rod | magnetic stirrer |
| Mixing time | 3-4 min | 3-4 min | 2 min | 3-4 min |
| Mixing temperature | 21° C. | 21° C. | 21° C. | 21° C. |
| Drying | silicone tray | glass tray | silicone tray | glass tray |
| Drying time | 24 hr | 24 hr | 24 hr | 24 hr |
| Drying temperature | 21° C. | 49° C. | 21° C. | 52° C. |

TABLE 5-continued

| Perturbations to process variables. | | | | |
|---|---|---|---|---|
| Recovery of dried material | peel | scrape | scrape | scrape |
| Sizing | tear, 5-10 mm | chop, 5-10 mm | N/A | N/A |
| Furnace type | high vacuum | high vacuum | high vacuum | high vacuum |
| Base pressure | $2 \times 10^{-6}$ torr | $2 \times 10^{-6}$ torr | $2 \times 10^{-6}$ torr | $2 \times 10^{-6}$ torr |
| Gas | N/A | N/A | N/A | N/A |
| Gas flow rate | N/A | N/A | N/A | N/A |
| Material containment | covered | covered | covered | covered |
| Material loading | 3.3 mg/cm$^2$ | 10 mg/cm$^2$ | 2.2 mg/cm$^2$ | 31 mg/cm$^2$ |
| Material form factor | flakes | flakes | powder | powder |
| Temperature at maximum rate of mass loss, $T_m$ | 230 ± 45° C. | 230 ± 45° C. | 230 ± 45° C. | 230 ± 45° C. |
| Heating rate approaching $T_m$ | 0.15° C./min | 0.1° C./min | 0.05° C./min | 0.1° C./min |
| Heating rate leaving $T_m$ | 0.29° C./min | 0.1° C./min | 0.05° C./min | 0.1° C./min |
| Final temperature, $T_f$ | 630 ± 20° C. | 780 ± 20° C. | 705 ± 20° C. | 780 ± 20° C. |
| Soak at $T_f$ | 0 min | 4 hr | 10 min | 4 hr |
| Time to heat from $T_m$ to $T_f$ | 9 hr 7 min | 15 hr 45 min | 16 hr 45 min | 15 hr 45 min |
| Outcome | GmGT(I)-X | GmGT(I)-X | GmGT(I)-X | EG + TMO-NC |

| | Sample 6.5 | Sample 6.6 | Sample 6.7 | Sample 6.8 |
|---|---|---|---|---|
| Carbon source | graphite powder | chemically reduced graphene oxide powder | hydrothermally produced GO | GO powder (Ceylon) |
| Amount of carbon source | 209 mg | 400 mg | 10 mL | 100 mg |
| TM source | Solution 2.1 | Solution 2.1 | Solution 2.1 | Solution 2.1 |
| Amount of TM source | 40 mL | 80 mL | 40 mL | 50 mL |
| Additive | N/A | N/A | N/A | 325 ml water |
| Mixing | stirring rod | magnetic stirrer | magnetic stirrer | ultrasonic |
| Mixing time | 2 min | 3-4 min | 3-4 min | 3-4 min |
| Mixing temperature | 21° C. | 21° C. | 21° C. | 21° C. |
| Drying | glass beaker | glass tray | glass tray | glass tray |
| Drying time | ~10 min | 24 hr | 24 hr | 24 hr |
| Drying temperature | 65-70° C. | 52° C. | 49° C. | 52° C. |
| Recovery of dried material | scrape | scrape | scrape | scrape |
| Sizing | N/A | N/A | N/A | N/A |
| Furnace type | high vacuum | high vacuum | high vacuum | high vacuum |
| Base pressure | $2 \times 10^{-6}$ torr | $2 \times 10^{-6}$ torr | $2 \times 10^{-6}$ torr | $2 \times 10^{-6}$ torr |
| Gas | N/A | N/A | N/A | N/A |
| Gas flow rate | N/A | N/A | N/A | N/A |
| Material containment | covered | covered | covered | covered |
| Material loading | 21 mg/cm$^2$ | 40 mg/cm$^2$ | 2.5 mg/cm$^2$ | 5.8 mg/cm$^2$ |
| Material form factor | powder | powder | flakes | powder |
| Temperature at maximum rate of mass loss, $T_m$ | 230 ± 45° C. | 230 ± 45° C. | 230 ± 45° C. | 230 ± 45° C. |
| Heating rate approaching $T_m$ | 1.0° C./min | 0.1° C./min | 0.1° C./min | 0.1° C./min |
| Heating rate leaving $T_m$ | 2.5° C./min | 0.1° C./min | 0.1° C./min | 0.1° C./min |
| Final temperature, $T_f$ | 680 ± 20° C. | 780 ± 20° C. | 780 ± 20° C. | 780 ± 20° C. |
| Soak at $T_f$ | 0 min | 4 hr | 4 hr | 4 hr |
| Time to heat from $T_m$ to $T_f$ | 51 min | 15 hr 45 min | 15 hr 45 min | 15 hr 45 min |
| Outcome | Gr + TMO-NC | prGO + TMO-NC | GmGT(I)-X | GmGT(I)-X |

TABLE 5-continued

| | | Perturbations to process variables. | | |
| --- | --- | --- | --- | --- |
| | Sample 6.9 | Sample 6.10 | Sample 6.11 | Sample 6.12 |
| Carbon source | Suspension 1.6 | 2.5% graphene oxide suspension in water | Suspension 1.1 | Suspension 1.1 |
| Amount of carbon source | 7 mL | 4.2 mL | 25 mL | 25 mL |
| TM source | Solution 2.1 | Solution 2.1 | Solution 2.1 | Powder 2.6 |
| Amount of TM source | 140 mL | 50 mL | 50 mL | 128 mg |
| Additive | N/A | 346 mL water | 325 ml water | 375 ml water |
| Mixing | ultrasonic | magnetic stirrer | magnetic stirrer | magnetic stirrer |
| Mixing time | 45 min | 2 day | 3-4 min | 3-4 min |
| Mixing temperature | 21° C. | 65-70° C. | 21° C. | 21° C. |
| Drying | glass tray | glass tray | glass tray | glass tray |
| Drying time | 24 hr | 24 hr | 24 hr | 24 hr |
| Drying temperature | 52° C. | 52° C. | 52° C. | 52° C. |
| Recovery of dried material | scrape | scrape | scrape | scrape |
| Sizing | chop, 5-10 mm | chop, 5-10 mm | chop, 5-10 mm | chop, 5-10 mm |
| Furnace type | high vacuum | tube furnace | tube furnace | high vacuum |
| Base pressure | $2 \times 10^{-6}$ torr | N/A | N/A | $2 \times 10^{-6}$ torr |
| Gas | N/A | Nitrogen | Argon | N/A |
| Gas flow rate | N/A | 4.2 L/min | 4.2 L/min | N/A |
| Material containment | covered | open | open | covered |
| Material loading | 18 mg/cm$^2$ | 10 mg/cm$^2$ | 8 mg/cm$^2$ | 5.8 mg/cm$^2$ |
| Material form factor | flakes | flakes | flakes | flakes |
| Temperature at maximum rate of mass loss, $T_m$ | 230 ± 45° C. | 200° C. | 200° C. | 230 ± 45° C. |
| Heating rate approaching $T_m$ | 0.1° C./min | 4.5° C./min | 4.5° C./min | 0.1° C./min |
| Heating rate leaving $T_m$ | 0.1° C./min | soak 20 min | soak 20 min | 0.1° C./min |
| Final temperature, $T_f$ | 780 ± 20° C. | 725° C. | 725° C. | 780 ± 20° C. |
| Soak at $T_f$ | 4 hr | 10 min | 10 min | 4 hr |
| Time to heat from $T_m$ to $T_f$ | 15 hr 45 min | 1 hr 32 min | 1 hr 32 min | 15 hr 45 min |
| Outcome | GmGT(I)-X | GmGT(I)-X | GmGT(I)-X | GmGT(I)-X |
| | Sample 6.13 | Sample 6.14 | Sample 6.15 | Sample 6.16 |
| Carbon source | Suspension 1.8 | Suspension 1.1 | Suspension 1.1 | Suspension 1.2 |
| Amount of carbon source | 336 mL | 25 mL | 25 mL | 15.5 mL |
| TM source | Solution 2.1 | Solution 2.1 | Solution 2.1 | Solution 2.1 |
| Amount of TM source | 50 mL | 50 mL | 50 mL | 10 mL |
| Additive | N/A | 345 mL 0.3% acetic acid solution | 329 mL 0.4% NH$_4$OH solution | N/A |
| Mixing | magnetic stirrer | magnetic stirrer | magnetic stirrer | magnetic stirrer |
| Mixing time | 3-4 min | 3-4 min | 3-4 min | 3-4 min |
| Mixing temperature | 21° C. | 21° C. | 21° C. | 21° C. |
| Drying | glass tray | glass tray | glass tray | polyethylene tray |
| Drying time | 24 hr | 24 hr | 24 hr | 24 hr |
| Drying temperature | 52° C. | 52° C. | 52° C. | 21° C. |
| Recovery of dried material | scrape | scrape | scrape | peel |
| Sizing | chop, 5-10 mm | chop, 5-10 mm | chop, 5-10 mm | chop, 5-10 mm |
| Furnace type | high vacuum | high vacuum | high vacuum | low vacuum/tube furnace |
| Base pressure | $2 \times 10^{-6}$ torr | $2 \times 10^{-6}$ torr | $2 \times 10^{-6}$ torr | N/A |
| Gas | N/A | N/A | N/A | Nitrogen |
| Gas flow rate | N/A | N/A | N/A | 4.2 L/min |
| Material containment | covered | covered | covered | open |

TABLE 5-continued

| Perturbations to process variables. | | | | |
|---|---|---|---|---|
| Material loading | 13 mg/cm² | 6.7 mg/cm² | 2.5 mg/cm² | 40 mg/cm² |
| Material form factor | flakes | flakes | flakes | flakes |
| Temperature at maximum rate of mass loss, $T_m$ | 230 ± 45° C. | 230 ± 45° C. | 230 ± 45° C. | 200° C. (low vacuum) |
| Heating rate approaching $T_m$ | 0.1° C./min | 0.1° C./min | 0.1° C./min | 7° C./min (low vacuum) |
| Heating rate leaving $T_m$ | 0.1° C./min | 0.1° C./min | 0.1° C./min | 7° C./min (low vacuum) |
| Final temperature, $T_f$ | 705 ± 20° C. | 780 ± 20° C. | 780 ± 20° C. | 725° C. |
| Soak at $T_f$ | 10 min | 4 hr | 4 hr | 10 min |
| Time to heat from $T_m$ to $T_f$ | 20 hr 50 min | 15 hr 45 min | 15 hr 45 min | 1 hr 32 min |
| Outcome | GmGT(I)-X | GmGT(I)-X | GmGT(I)-X | notGmGT(I)-X |

| | Sample 6.17 | Sample 6.18 | Sample 6.19 |
|---|---|---|---|
| Carbon source | Suspension 1.3 | Suspension 1.5 | Suspension 1.7 |
| Amount of carbon source | 15 mL | 15 mL | 0.4 mL |
| TM source | Solution 2.1 | Solution 2.1 | Solution 2.3 |
| Amount of TM source | 10 mL | 10 mL | 0.2 mL |
| Additive | N/A | N/A | 2 mL water |
| Mixing | magnetic stirrer | magnetic stirrer | stir |
| Mixing time | 3-4 min | 3-4 min | ~min |
| Mixing temperature | 21° C. | 21° C. | 21° C. |
| Drying | polyethylene tray | polyethylene tray | Ni TEM grid |
| Drying time | 24 hr | 24 hr | 24 hr |
| Drying temperature | 21° C. | 21° C. | 21° C. |
| Recovery of dried material | peel | peel | N/A |
| Sizing | chop, 5-10 mm | chop, 5-10 mm | N/A |
| Furnace type | tube furnace | tube furnace | TEM furnace |
| Base pressure | N/A | N/A | 3.4 × 10⁻⁷ torr |
| Gas | Nitrogen | Nitrogen | N/A |
| Gas flow rate | 1.4 L/min | 1.4 L/min | N/A |
| Material containment | open | open | open |
| Material loading | 5 mg/cm² | 5 mg/cm² | 10⁻³ mg/cm² |
| Material form factor | flakes | flakes | film |
| Temperature at maximum rate of mass loss, $T_m$ | 200° C. | 200° C. | N/A |
| Heating rate approaching $T_m$ | 4.5° C./min | 4.5° C./min | N/A |
| Heating rate leaving $T_m$ | soak 20 min | soak 20 min | N/A |
| Final temperature, $T_f$ | 725° C. | 725° C. | 100-600° C. |
| Soak at $T_f$ | 10 min | 10 min | N/A |
| Time to heat from $T_m$ to $T_f$ | 1 hr 32 min | 1 hr 32 min | N/A |
| Outcome | GmGT(I)-X | GmGT(I)-X | GmGT(I)-X |

As an illustrative example of the tabular process description in Table 5, embodiment of Sample 6.2 is explicitly described as an example of the process to synthesize GmGT(I)-X. A 0.5 wt % GO suspension (20 mL) was used as carbon source, combined with 25 mL of Solution 2.1 as TM source. Deionized distilled water (330 mL) was added to the mixture and stirred with a glass rod for 3-4 minutes at room temperature. The solution was dried in a borosilicate glass tray for 24 hours at 49° C., scraped and chopped to about 5-10 mm lateral dimensions, and loaded at 10 mg/cm² in flake form in an alumina coated tantalum boat with a lid. The covered material load was heated resistively in high vacuum at a starting base pressure of 2×10⁻⁶ torr with variable heating rates in different temperature windows. The heating rate approaching and departing $T_m$, the 230±45° C. temperature of maximum mass loss, was symmetrically slow at 0.1° C./min, and the final annealing was done for 4 hours at temperature $T_f$=780±20° C. The time to reach $T_f$ from $T_m$ was 15 hrs 45 min. Upon cooling to room temperature and removal from the vacuum furnace, the produced material is characterized and found consistent with GmGT(I)-X material.

Composition of Matter by Predictive Modeling—GmO Crystal Phases and their Chemical Moieties:

As disclosed herein, GmO can be produced at practical macroscopic scale with the processes described above as part of GmO-based composite materials named GmGT. Two families GmGT(I) and GmGT(II) are demonstrated with details in their compositions of matter wherein the GmO component can be crystalline (GmGT(I)-X) or amorphous (GmGT(I)-A and GmGT(II)-A). The great majority of the produced crystalline GmO-based compositions of matter have unique interatomic spacings that result in unique measured diffraction signatures, and hence in defined desirable properties in electrochemical cells. Some perturbations to the processing parameters can produce variability to the observable 2D diffraction and vibrational signatures of the dominant GmO phase (hereafter, α-GmO). Predictive modeling, utilizing DFT, identifies new GmO crystal structures and their component chemical moieties.

Figure 1:
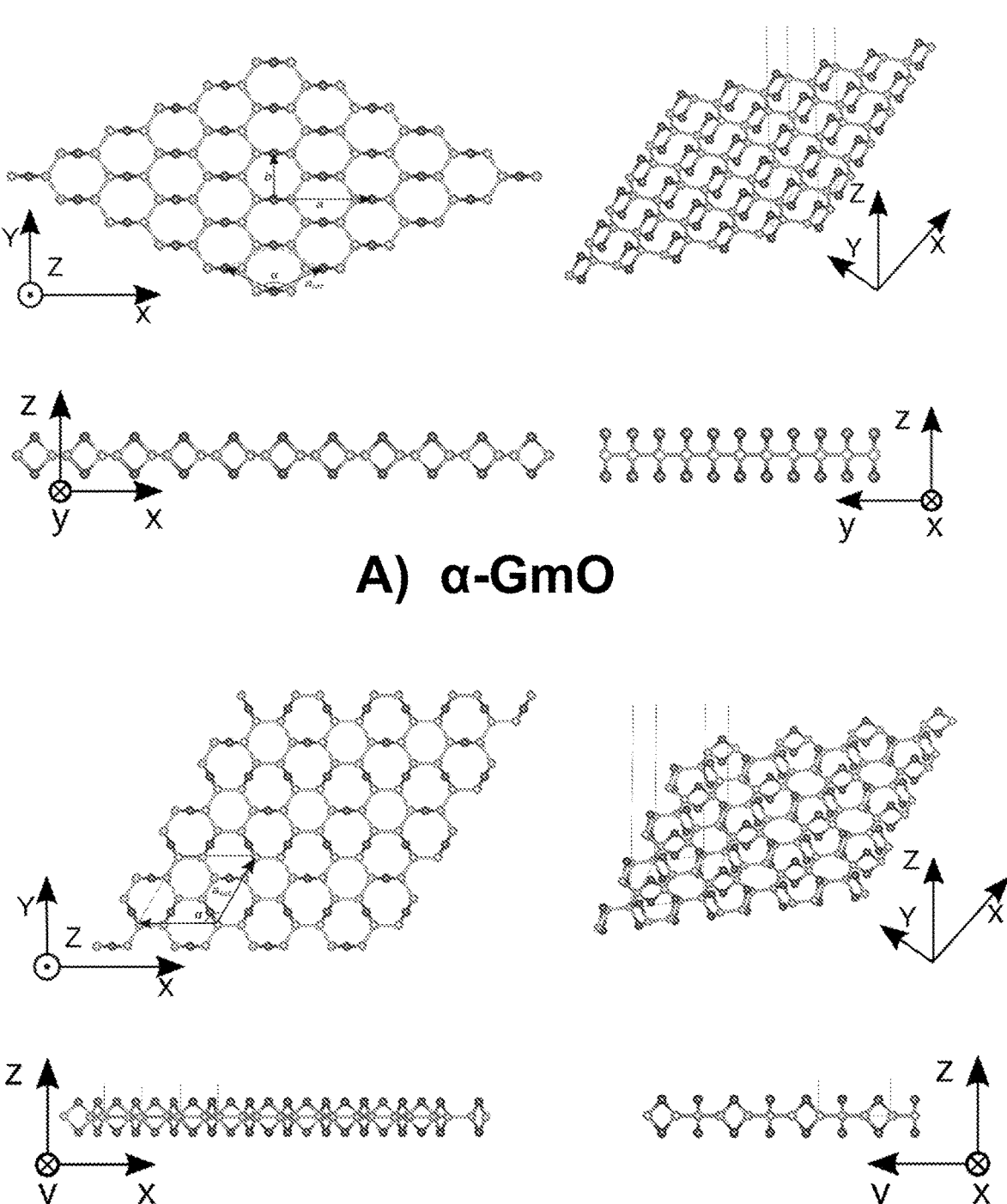
FIG. 1: Four two-dimensional crystal structure phases of solid CO created from the building blocks shown in FIG. 2 and labeled α-GmO (A) through δ-GmO (D). Each structure is depicted with a top view projection, two side view projections, one perspective atomic structure. Carbon (oxygen) atoms are depicted as light (dark) grey spheres.
Figure 1:
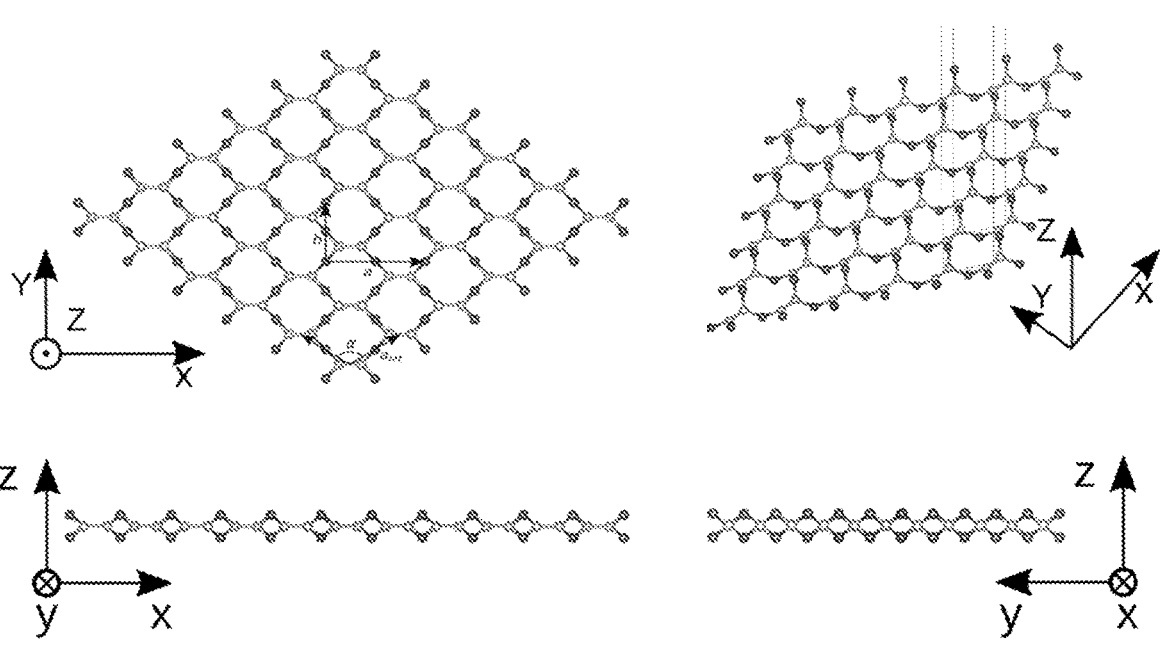
Figure 1:
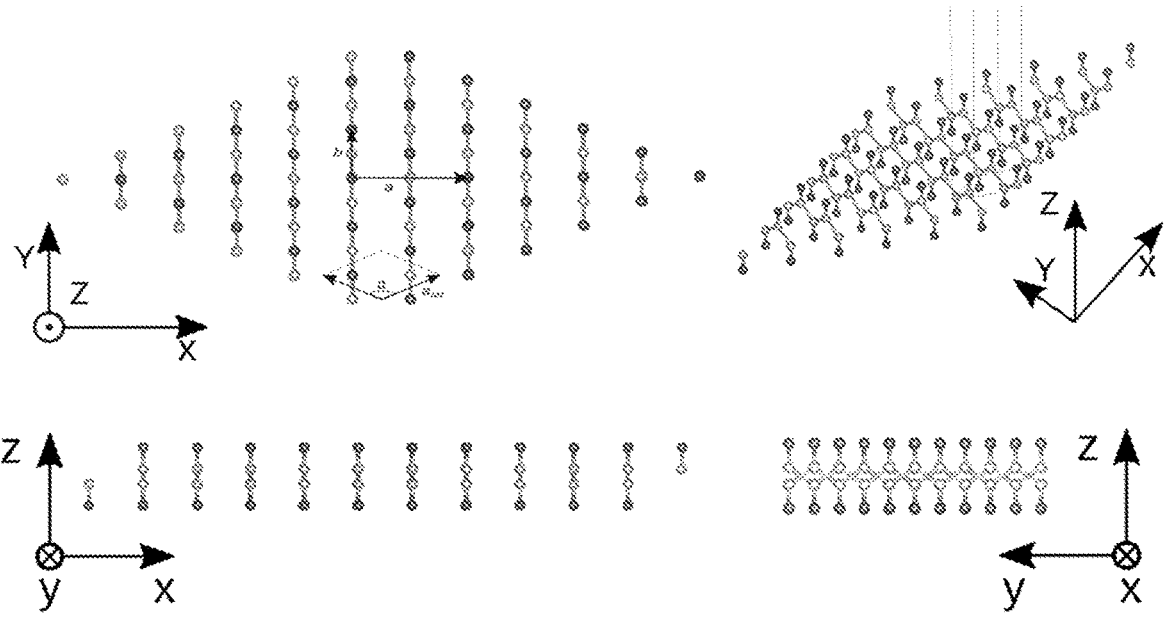
Figure 2:
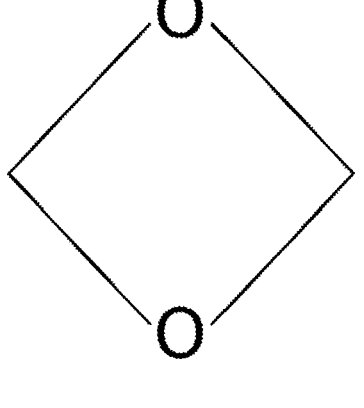
FIG. 2: Molecular building blocks of two-dimensional Graphene Monoxide crystals shown in FIG. 1. The 1,3 dioxetane (A) is a four-member heterocyclic ring with two oxygens and two carbons. It is a sub-block of 1,5-dioxacyclooctane (B) and of 1,4,7-trioxacyclononane. Two additional moieties are 3,5,8,10-tetraoxa-1,6-cyclodecadiene (D) and Polycarbonyl chains (E).
Figure 2:
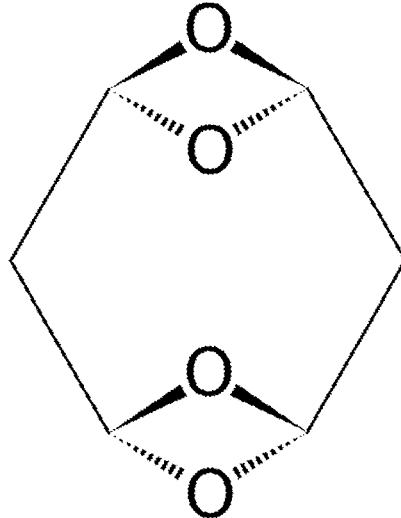
Figure 2:
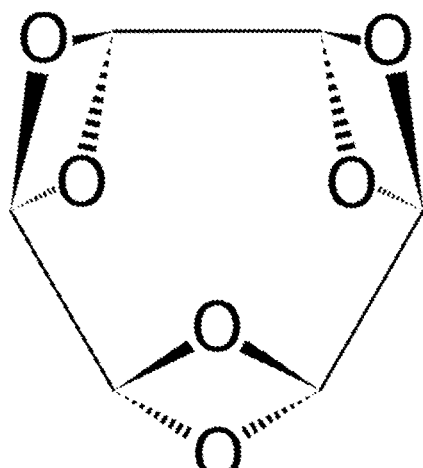
Figure 2:
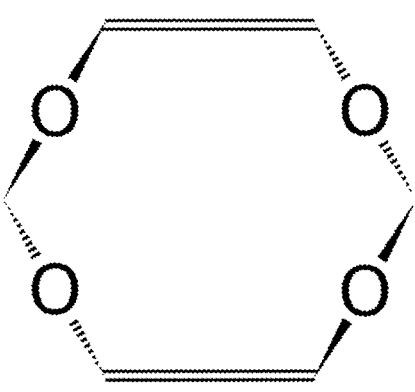
Figure 2:
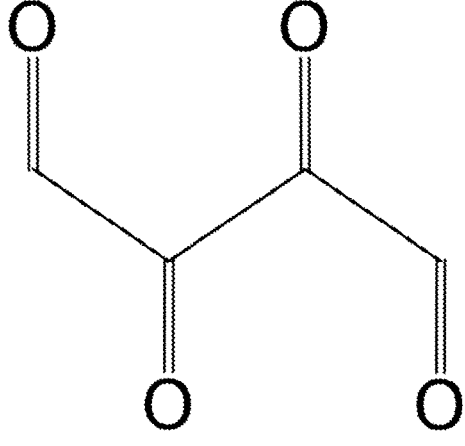

Predictive DFT computations were performed with Quantum ESPRESSO 6.4.1 (Giannozzi, et al. "Advanced capabilities for materials modelling with quantum ESPRESSO," *Journal of Physics: Condensed Matter* 29:465901 (2017).) Projector augmented-wave (PAW) scalar-relativistic pseudopotentials with Perdew-Burke-Emzerhof (PBE) generalized gradient approximation exchange-correlation were generated for carbon, oxygen, and lithium atoms from PSlibrary 1.0.0 (A. D. Corso "Pseudopotentials periodic table: From H to Pu," *Computational Materials Science* 95:337 (2014).) A plane wave kinetic energy cut-off 50 Ry (180 eV) for the expansion of the wave functions and kinetic energy cutoff of 326 Ry (1175 eV) for the charge density and potential were used. Since Quantum ESPRESSO works with periodic boundary conditions in all three directions, the way to model single layers of GmO was to make the distance between adjacent GmO layers reasonably large in the z-direction (e.g., 20 Å in these calculations). FIG. 1 shows schematic drawings (in top view, two side views and a perspective view) of atomic models of the predicted crystalline atomic structures for four phases of GmO. labeled α, β, γ and δ. and FIG. 2 shows schematic drawings of their constituent carbon and oxygen building blocks.

Crystal Phases of GmO:

α-GMO, as shown in FIG. 1A, is composed of eight-member heterocyclic rings (shown in FIG. 2B) each containing two bridging 1,3 dioxetanes (shown in FIG. 2A) that are parallel to each other and aligned in the carbon sublattice arm-chair direction. The symmetry elements are #65 D2h-19 Cmmm. The rhombic unit cell has lattice constant of 0.313 nm and angle of 130° when fully relaxed with oxygen distance from the carbon atomic plane of ±0.104 nm. When hexagonally constrained, the above parameters are 0.295 nm, 120°, and ±0.108 nm respectively. This structure can present itself in three equivalent domains where the pair of dioxetanes are on one of the three arm-chair resonance configurations. All carbons in α-GmO structure are in sp3 hybridization.

β-GMO, as shown in FIG. 1B, is composed of nine-member heterocyclic rings (shown in FIG. 2C) each containing three bridging 1,3 dioxetanes (shown in FIG. 2A) in arm-chair direction, alternating with hexagonal carbon rings without oxygen. The symmetry elements are #191 D6h-1 P6/mmm. The rhombic unit cell has lattice constant of 0.507 nm and angle of 120° with oxygen distance from the carbon atomic plane of ±0.104 nm. All carbons in β-GmO structure are in sp3 hybridization.

γ-GMO, as shown in FIG. 1C, is composed of ten-member heterocyclic rings (shown in FIG. 2D) with bridging oxygens in planar zig-zag direction. The symmetry elements are #21 D2-6 C222. The rhombic unit cell has lattice constant of 0.344 nm and angle of 119° when fully relaxed with oxygen distance from the carbon atomic plane of ±0.065 nm. When hexagonally constrained, the above parameters are 0.344 nm, 120°, and ±0.066 nm. nm respectively. This structure can form superlattice arrangements based on the order in which the oxygens are placed above/below the plane of carbon. Parameters for the 2×2 and 4×4 superlattice structures are given below. All carbons in γ-GmO structure are in sp2 hybridization.

γ-GmO (2×2) The symmetry elements are #53 D2h-7 Pmna. The rhombic unit cell has lattice constant of 0.668 nm and angle of 114° when fully relaxed with oxygen distance from the carbon atomic plane of ±0.074 nm. When hexagonally constrained, the above parameters are 0.688 nm, 120°, and ±0.076 nm respectively. All carbons in γ-GmO structure are in sp2 hybridization.

γ-GmO (4×4) The symmetry elements are #49 D2h-3 Pccm. The rhombic unit cell has lattice constant of 1.378 nm and angle of 109° when fully relaxed with oxygen distance from the carbon atomic plane of 0.060 nm. All carbons in γ-GmO structure are in sp2 hybridization.

δ-GmO, as shown in FIG. 1D, is composed of linear poly carbon monoxide chains (shown in FIG. 2E) in perpendicular zig-zag direction. The symmetry elements are #67D2h-21 Cmma. The rhombic unit cell has lattice constant of 0.333 nm and angle of 135° when fully relaxed with oxygen distance from the carbon atomic plane of ±0.121 nm. All carbons in δ-GmO structure are in sp3 hybridization.

Table 6 organizes the predicted bond-lengths and angles for the building blocks and the unit cell dimensions for these two-dimensional GmO crystal phases. It also shows predicted diffraction peak positions for the most intense Bragg beams and gives their relative intensities with respect to the most intense peak. Predicted formation energies are included, all being negative and indicative of the possibility to form these structures under favorable thermodynamic and kinetic conditions. The NMR isotopic shifts are also predicted for some of the structures.

TABLE 6

| | DFT predictions for ordered GmO atomic structures shown in FIG. 1. | | | | | | |
|---|---|---|---|---|---|---|---|
| GmO 2D crystal phases | α relaxed | α constrained | β relaxed = constrained | γ relaxed | γ constrained | δ relaxed | δ constrained |
| Space group | 65 D2h-19 Cmmm | 65 D2h-19 Cmmm | 191 D6h-1 P6/mmm | 21 D2-6 C222 | 21 D2-6 C222 | 67 D2h-21 Cmma | 67 D2h-21 Cmma |

TABLE 6-continued

| DFT predictions for ordered GmO atomic structures shown in FIG. 1. | | | | | | | |
|---|---|---|---|---|---|---|---|
| GmO 2D crystal phases | α relaxed | α constrained | β relaxed = constrained | γ relaxed | γ constrained | δ relaxed | δ constrained |
| Formation energy per O, eV | −1.16 | −0.64 | −0.07 | −0.38 | −0.33 | −1.38 | −1.02 |
| NMR isotropic chemical shift, ppm | 116 | | | | | | |
| C—C bond, Å | 1.58 | 1.64 | 1.56 | 1.35 | 1.36 | 1.55 | 1.77 |
| C—O bond, Å | 1.44 | 1.41 | 1.43 | 1.36 | 1.37 | 1.21 | 1.19 |
| C—O—C angle, ° | 86.7 | 80.5 | 86.53 | 122.84 | 122.34 | N/A | N/A |
| Most intense diffraction peak positions, 1/Å | 0.418, 0.758, 0.960 | 0.393, 0.68, 1.039 | 0.228, 0.394, 0.455, 0.602, 0.683, 0.788, 0.910, 0.992, 1.843, 1.204, 1.366 | 0.331, 0.338, 0.581, 0.661, 0.883, 0.891, 1.013, 1.138 | 0.333, 0.577, 0.666, 0.881, 0.999, 1.153 | 0.326, 0.625, 0.780, 0.845, 1.016 | 0.383, 0.663, 0.766, 1.013, 1.327 |
| Most intense diffraction peak intensities, a.u. | 100.0, 25.9, 18.8 | 100.0, 32.9, 29.7 | 18.3, 100.0, 83.4, 24.1, 11.9, 16.0, 48.4, 12.8, 21.7, 16.4 | 100.0, 53.3, 17.2, 68.2, 80.8, 12.9, 14.9, 18.3 | 100.0, 11.0, 45.5, 68.3, 12.6, 14.7 | 100.0, 29.6, 18.3, 28.9, 16.1 | 100.0, 34.6, 70.5, 19.9, 11.6 |

FIG. 2 gives schematic representations of the chemical moieties that are building blocks for the different crystal phases of two-dimensional GmO shown in FIG. 1. These moieties, or their variants or substructure components, may also be present in the amorphous GmO.

Heterocyclic building units containing carbon and oxygen (FIG. 1A-D):

a) 4-member heterocyclic ring with two oxygens (FIG. 2A): 1,3 dioxetane;

b) 8-member heterocyclic ring with two bridging dioxetanes (FIG. 2B): 1,5 dioxa-cyclooctane with two additional bridging oxygens at the (2,8) and the (4,6) positions that constitute the dioxetanes defined in (FIG. 1A);

c) 9-member heterocyclic ring with three bridging dioxetanes (FIG. 2C): 1,4,7 trioxa-cyclononane with three bridging oxygens at the (2,9), (3,5) and (6,8) positions that constitute the dioxetanes defined in (FIG. 1A);

d) 10-member heterocyclic ring with four oxygens (FIG. 2D): (3,5,8,10) tetraoxa-(1,6)-cyclodecadiene without additional bridging oxygens and without dioxetanes.

Chain building units containing carbon and oxygen (FIG. 2E)

e) Zig-zag chain (FIG. 2E): Polycarbonyl with each C═O bond dipole moment opposing the previous C═O bond dipole moment.

Charge-Storage Devices Made Using the Inventive Materials:

In one embodiment these materials have improved electrode performance to graphite. In general, cell builds for charge-storage devices can be tuned for optimal performance characteristics by adjusting, for example, anode formulations, cathode choice, electrolyte formulations, electrode loadings, and/or combinations thereof. To demonstrate improved performance of these inventive materials, anode formulations, cathode choice, loadings, and electrolyte formulations were chosen to be typical for and well-suited to graphite or graphite/silicon cell builds. Choices for cell builds that could further improve performance of these inventive materials could encompass different anode formulations, cathode choice, loadings, electrolyte formulations, cell format, or combinations thereof.

As specific examples, three active anode compositions were examined in pouch cells: pure graphite (Gr), graphite with 3% (by mass) silicon (GrSi3), and graphite with 3% silicon and 10% of the subject GmGT(II)-A material (GrSi3GmGT(II)-A) disclosed herein. Through half-cell testing, the specific capacity of the pure GmGT(II)-A material was determined to be 540 mAh/g. See FIGS. 15 and 16.

FIG. 15 shows charge/discharge curves for an anode half-cell, where the anode active material was composed of 100% GmGT(II)-A. Two formation cycles at C/20 established the GmGT(II)-A material capacity to be 540 mAh/g. This value was used in later calculations to determine theoretical capacities of composite anodes used in pouch cells. A noteworthy characteristic of the material is its sloping potential profile. This makes it difficult to define a potential with respect to lithium. However, the profile shape could be advantageous in predicting the battery's capacity as a function of voltage. Comparatively, a graphite anode half-cell (FIG. 16) showed a capacity of 351 mAh/g at a current during approximately C/20. This graph shows two formation cycles at C/20, followed by cycling data at C/3. The graphite half-cell shows a characteristic voltage plateau around 0.2 V.

Using this result, the specific capacities of the inventive composite material GrSiGmGT(II)-A was determined to be 445 mAh/g. This value is higher than the specific capacities of graphite and GrSi3, which are 340 mAh/g and 425 mAh/g, respectively. A summary of materials cycled in pouch cells is shown in Table 7.

TABLE 7

| Active anode compositions used for full pouch cell testing. | | |
|---|---|---|
| Material/Composite Name | Composition (by mass) | Specific Capacity (mAh/g) |
| Gr | Pure Gr | 340 |
| GrSi3 | 97:3 Gr:Si | 425 |
| GrSi3GmGT(II)-A | 87:3:10 Gr:Si:GmGT(II)-A | 445 |

The cathode used in these tests was LiNiCoAlO$_2$ (NCA). An alternative considered for the cathode material was Li(Ni$_{0.6}$Mn$_{0.2}$Co$_{0.2}$)O$_2$ (NMC622), which has been proposed in literature (Chevrier et al. (Sep. 19, 2018) "Design of Positive Electrodes for Li-Ion Full Cells with Silicon," J. Electrochem. Soc. 165(13): A2968-A2977) to stabilize the Si alloy in graphite/Si alloy negative electrodes, resulted in improved cycling performance and Coulombic efficiency. NCA was chosen after half-cell testing was conducted for both NCA and NMC622 cathodes. Tests were conducted with voltage ranges of 2.7 to 4.3V and 2.7 to 4.5V. Each half-cell underwent two cycles at a C/10 rate followed by two cycles at a 1C rate. NMC622 electrodes had an average capacity loading of 1.90 mAh/cm$^2$. NCA electrodes had an average capacity loading of 1.99 mAh/cm$^2$. Cycling results are shown in FIG. 17 (old 5) (A-D).

FIG. 17A is a charge/discharge curve for NMC622, cycled with an upper voltage cutoff at 4.3 V. The C/10 specific capacity was 165 mAh/g, and the initial Coulombic efficiency was 87%. FIG. 17B is a charge/discharge curve for NMC622, cycled with an upper voltage cutoff at 4.5 V. The C/10 specific capacity was 187 mAh/g, and the initial Coulombic efficiency was 85%. FIG. 17C is a charge/discharge curve for NCA, cycled with an upper voltage cutoff at 4.3 V. The C/10 specific capacity was 194 mAh/g, and the initial Coulombic efficiency was 90.4%. FIG. 17D is a charge/discharge curve for NCA, cycled with an upper voltage cutoff at 4.3 V. The C/10 specific capacity was 207 mAh/g and the initial Coulombic efficiency was 90.4%.

The anode slurry was composed of 94% active material; either pure graphite, a 97:3 mixture of graphite and silicon, or an 87:3:10 mixture of graphite, silicon, and the active material disclosed herein. Inactive materials included in the slurry were 3% carbon black, which is a standard conductive agent for graphite, and 3% total water-based binder (1.5% sodium carboxymethyl cellulose, 1.5% styrene butadiene rubber). The anode slurry was cast on 12 μm Cu foil. For half cells, the electrodes were punched to size for CR2032 coin cells.

In 200-mAh pouch batteries, the anodes being tested were paired with lithium nickel cobalt aluminum oxide (NCA) cathodes, cast on 20 μm aluminum foil. The active cathode and anode slurries were made from binders and carbon black, spread onto aluminum and copper foils (respectively), and allowed to dry. The cathode thickness was greater than that of the anode (because the cathode has a lower specific capacity), but the length and width of the cathode is smaller than those of the anode.

The N:P ratio used was 1.1. This ratio was previously determined through testing in full coin cells. The capacity of the anode was in excess compared to that of the cathode to prevent lithium deposition on the anode surface. The sizes were chosen based on the theoretical capacity of NCA and the empirical capacity of the inventive material disclosed herein, determined through half-cell testing.

After the electrodes were dried overnight, they were assembled into pouch batteries. At this stage, electrolyte was added, and the pouch was sealed. The battery was then cycled for two days at a current rate of C/20 to form the solid electrolyte interface (SEI) and activate the electrodes. The battery was then degassed and resealed.

Overall, 11 full pouch batteries were fabricated: three with graphite anodes, three with GrSi3 anodes, and five with GrSi3GmGT(II)-A anodes. A summary of cycled cells and their electrodes is shown in Table 8, including electrode pairing information.

TABLE 8

| Cell ID | Cathode | Cathode | Cathode | Anode | Anode | Anode | N:P Ratio |
|---|---|---|---|---|---|---|---|
| Gr5-N17 | NCA | 1.12 | 192.3 | Graphite | 0.71 | 226.6 | 1.05 |
| Gr4-C3 | NCA | 1.11 | 189.8 | Graphite | 0.7 | 223.7 | 1.1 |
| Gr3-N15 | NCA | 1.12 | 192 | Graphite | 0.69 | 221.5 | 1.08 |
| GrSi2-N26 | NCA | 1.26 | 215.1 | GrSi3 | 0.62 | 241.3 | 1.04 |
| GrSi6-N27 | NCA | 1.28 | 219.7 | GrSi3 | 0.65 | 252.6 | 1.07 |
| GrSi1-N25 | NCA | 1.19 | 203.3 | GrSi3 | 0.62 | 240.2 | 1.11 |
| GmGT(II)-A12-C4 | NCA | 1.12 | 191 | GrSi3GmGT(II)-A | 0.55 | 224.7 | 1.1 |
| GrSiGmGT(II)-A8-N13-NP1_1 | NCA | 1.11 | 189.8 | GrSi3GmGT(II)-A | 0.55 | 224.3 | 1.1 |
| GmGT(II)-A10-N20 | NCA | 1.14 | 194.9 | GrSi3GmGT(II)-A | 0.57 | 230.4 | 1.08 |
| GmGT(II)-A13-N16 | NCA | 1.12 | 192.2 | GrSi3GmGT(II)-A | 0.56 | 226.1 | 1.1 |
| GmGT(II)-A14-C18 | NCA | N/A | N/A | GrSi3GmGT(II)-A | 0.58 | 233.6 | N/A |

Summary of pouch cells tested.

Low-temperature charge and discharge performance, at 0° C. and –20° C., was also tested. See Table 9 for a complete list of the various test conditions:

TABLE 9

Summary of cycling tests conducted for full pouch cells.

| Test Number | Test Description | Control Batteries | Inventive Batteries |
|---|---|---|---|
| 1 | Purpose: Compare rate capability<br>Cycling: Charge rates of 0.1 C, 0.2 C, 0.5 C, 1 C, 2 C, 4 C, 5 C; discharge rate of C/3, with cycling continued at highest functioning rate<br>Temperature: room temperature | Gr5-N17 | GmGT(II)-A8-N13 |
| 2 | Purpose: Simulate typical usage of electronic devices<br>Cycling: Charge and discharge rates of C/2 over lifetime<br>Temperature: room temperature | Gr and GrSi3 | —<br>GmGT(II)-A |

TABLE 9-continued

Summary of cycling tests conducted for full pouch cells.

| Test Number | Test Description | Control Batteries | Inventive Batteries |
|---|---|---|---|
| 3 | Purpose: Simulate fast-charge conditions Cycling: Charge rate of 5 C, discharge rate of C/3 over lifetime Temperature: room temperature | Gr4-C3 Gr5-N17 GrSi2-N26 | GmGT(II)-A8-N13 GmGT(II)-A10-N20 GmGT(II)-A14-C18 |
| 4 | Purpose: Examine low-temperature behavior Cycling: Charge rate of C/2, discharge rate of C/3 over lifetime Temperature: −20° C. for 10 cycles, followed by 0° C. over lifetime | Gr3-N15 (does have −20 LT, but still C/3 DCHG) | GmGT(II)-A13-N16 |
| 5 | Purpose: Compare low-temperature performance Cycling: Charge rate of C/2, discharge rate of C/3 over lifetime Temperature: 0° C. | Gr3-N15 Gr4-C3 GrSi6-N27 | GmGT(II)-A14-C18 GmGT(II)-A12-C4 |

Each pouch cell was subjected to conditioning before being subjected to specific tests. The design capacity was ~190-200 mAh, but was ~220 mAh for GrSi because the capacity loading of GrSi was slightly higher than expected. All anodes were matched with cathodes using a N/P ratio of 1:1. The specific capacity loading was 2.05-2.2 mAh/cm$^2$ and 2.35 mAh/cm$^2$ for the cathode matching GrSi. The cells were cycled at C/10 for one cycle, followed by nine cycles at C/2. Because the relatively low initial Coulombic efficiency, the GmGT(II)-A cells showed a capacity of ~175 mAh/g at C/10 after formation.

Test 1 was conducted to evaluate the rate capability of the inventive material compared to pure graphite. Cells were charged at various rates up to 5C and discharged at a rate of C/3. Cycling was continued at the highest rate at which the cell still functioned, until failure. Test 1 results are shown in FIG. 18(A-C).

FIG. 18A is a graph of rate capability. FIG. 18B shows rate capability normalized based on the capacity at C/10 to compare the actual rate performance directly. FIG. 18C is a graph showing the charge/discharge curves at high rates of the pouch cells with the graphite (Gr) and the graphite/silicon/GmGT(II)-A composite (GrSiGmGT(II)-A) anodes (1C=200 mAh). The capacity of the pouch cell with the graphite is close to the designed value (200 mAh), while the pouch cell with the GrSiGmGT(II)-A is 154 mAh, which is due to the irreversible capacity loss and could be improved by pre-lithiation technologies. As indicated in FIG. 18A, although the capacity of the GrSiGmGT(II)-A cell is lower at C/10 than the Gr cell, the GrSiGmGT(II)-A cell exhibits a higher capacity at the high rate of 5C. More directly, from FIG. 18B, the GrSiGmGT(II)-A cell depicts better rate capability than the Gr cell when the current rate is higher than C/2. There was a mechanical error in the battery tester resulting in no capacity being recorded for the two (2) of the three (3) cycles at C/5 in FIGS. 18A and B. FIG. 18C compares the charge/discharge curves between the pouch cells with the Gr and GrSiGmGT(II)-A. The cell with GrSiGmGT(II)-A shows significantly lower voltage plateaus upon charging than the Gr cell, which is very helpful to alleviate possible lithium deposition on the anodes.

Test 2 was conducted to compare the cycle life of cells containing the inventive GmGT(II)-A material disclosed herein to graphite-only and GrSi3 cells. Cells were charged and discharged at a rate of C/2 for many cycles to evaluate lifetime under typical usage conditions for electronics. Results are shown in FIG. 19(A-D).

Normalized Capacity: Test 3 was used to examine how the GmGT(II)-A material composite anodes performed under fast-charge conditions compared to pure graphite and graphite-Si combinations. Cells were charged at 5C and discharged at C/3 for many cycles to evaluate fast charging under typical usage and lifetime. This test was conducted twice to reproduce results. The results are shown in FIG. 19E.

FIG. 19A shows cycling performance from Test 3a after formation at C/10 for one cycle, followed by cycling at 5C. FIG. 19B depicts cycling behavior from Test 3a, normalized based on the reversible capacity. FIGS. 19C and 19D show the capacity and normalized capacity, respectively, for Test 3b. FIG. 19E shows the same test conducted on a cell GrSi3 cell, although for fewer cycles. The designed capacity was 200 mAh with an N:P ratio of 1:1. The GrSi3GmGT(II)-A cells initially showed a lower capacity due to irreversible capacity loss during formation. During 5C cycling, however, the GrSi3GmGT(II)-A cells maintained a higher percentage of their reversible capacity: 42 mAh (28% of reversible capacity) for GrSi3GmGT(II)-A, compared to 42 mAh (21% of reversible capacity) for graphite. The 5C capacity for GrSi3 was ~110 mAh, which faded to ~70 mAh (64% of reversible capacity) by cycle 14. Comparatively, at cycle 14, GrSi3GmGT(II)-A showed ~25% capacity retention.

Test 4 was conducted to evaluate low-temperature behavior under typical usage by charging at a rate of C/2 and discharging at a rate of C/3 at −20° C. for 10 cycles, followed by lifetime cycling at 0° C. For graphite, the voltage range was 1.5V to 4.3V. For GrSi3GmGT(II)-A, cycling at 0° C. was performed with a voltage range of 1.5V to 4.2V, and again with the upper voltage cutoff changed to 4.3V. See FIGS. 20A and B and FIG. 21.

FIGS. 22 through 24 are a series of SEM images and elemental maps that characterize the atomic composition and morphology of electrodes fabricated with the GmGT(II)-A materials disclosed herein. FIG. 22 is a lower magnification backscattered electron (BSE) SEM image which shows homogeneous distribution of the inventive particles (bright features) within the graphite matrix. There is good connectivity to the particle matrix and good packing density of slurry particles. FIG. 23 is a high magnification secondary electron SEM image of a GmGT(II)-A particle (large central particle) that shows evidence of two-dimensional flake-like morphology. Neighboring particles (mainly graphite) are well-connected to the GmGT(II)-A particle. FIG. 24 shows a BSE image in the upper left panel and a series of three elemental maps from the same area of the electrode showing carbon distribution (upper right panel), molybdenum distribution (lower left panel), and oxygen distribution (lower right panel). The intensity scale between the maps shown in FIG. 24 is not quantitative. This is clear evidence that the GmGT(II)-A materials incorporate into the electrode preparation without chemical or mechanical decomposition.

FIG. 25 is a series of graphs depicting cycling performance of a 200 mAh pouch battery made using a LCO cathode and cathode comprising 10% of the inventive material disclosed herein (GmGT(I)-X and GmGT(II)-A) and 90% graphite (Gr). The pouch cells were formatted at C/10, and then conditioned at C/2 for nine (9) cycles, followed by charging to a 50% state of charge for impedance analysis. Of specific note in this series of graphs is that panel (c) presents a comparison of the charge/discharge curves of pouch cells with pure graphite (Gr), Gr with GmGT(I)-X, and Gr with GmGT(II)-A anodes. These cells were charged at 10C and discharged at C/3 to mimic super-fast charging and normal-driving EV conditions (i.e., commercially desirable performance characteristics for batteries powering electric vehicles). Panel (d) depicts the corresponding cyclic performance of the batteries charged and discharged under these conditions. It is well known that batteries with graphite anodes cannot charge quickly. As expected, under these charging conditions, the pouch cell with a graphite anode was barely charged at 10C (to only 2 mAh). In contrast, with 10 wt. % of the GmGT material disclosed herein, the pouch cells with GmGT(I)-X/Gr and GmGT(II)-A/Gr at 10C were charged to 16 and 21 mAh, respectively (at 10C). This is approximately 10% of the capacity obtained at C/10. In short, batteries that incorporate the inventive anode material disclosed herein display promising ultra-fast charging capability. The batteries also display admirable performance at lower temperature. FIG. 25, panels (e) and (f) show the charge/discharge profiles and cyclic performance at −20° C. Here, the cells were charged at 1C and discharge at C/3, and displayed a capacity of 33 mAh. This is roughly 20% of the capacity when charged/discharged at the same rates, but at room temperature.

FIGS. 26, 27 and 28 are a series of photographs of separators made according to the present disclosure and conventional graphite separators after cycling showing the extent of lithium deposition. Thus, FIG. 26 is a photograph of a conventional graphite separator retrieved from a cycled 200 mAh graphite-only active-anode pouch cell. The photo clearly shows lithium powder deposition (brown regions). FIG. 27, in contrast, shows a separator made according to the present disclosure and cycled under identical conditions. FIG. 27 shows significantly less lithium powder deposition as compared to FIG. 26. FIG. 28 is a side-by-side comparison of an inventive separator (on left) and a conventional graphite separator (on right). The lighter contrast of the conventional anode indicates significant Li-plating (observed as a golden/tan color on visual inspection). The darker contrast of the anode containing the inventive material indicates healthy battery performance (observed as a dark brown/black color on visual inspection).

Predictive Modeling of Interactions of Li with Gmo:

Disclosed herein are compositions of matter comprising GmO-based materials in combination with lithium atoms and methods of forming these materials. The synthesis methods described above were used to form crystalline GmGT(I)-X and amorphous GmGT(II)-A composites with crystalline graphene and molecular TMO. These materials were used to form anodes of single cell Lithium-Ion Batteries (LIBs) that were cycled at different number of cycles and were autopsied to analyze the material crystal signatures upon lithiation (charging) and de-lithiation (discharging). Specific examples are illustrated for single (FIG. 29), and moderate and large (FIG. 30) number of cycles. Crystalline α-GmO, in both cases regardless of starting crystalline or amorphous versions, and G signatures exist after cycling. Five additional peaks are seen to form new diffraction signatures.

Predictive DFT computations were performed with Quantum ESPRESSO 6.4.1 with projector augmented-wave (PAW) scalar-relativistic pseudopotentials with Perdew-Burke-Emzerhof (PBE) generalized gradient approximation exchange-correlation were generated for carbon, oxygen, and lithium atoms from PSlibrary 1.0.0. A plane wave kinetic energy cutoff of 50 Ry (180 eV) for the expansion of the wave functions and kinetic energy cutoff of 326 Ry (1175 eV) for the charge density and potential were used. For different concentrations of lithium atoms, 1×1, 2×2, 3×3, 4×4, and 5×5 periodic supercells were used, with care to select k-points that make energies for different concentrations of lithium atoms comparable. Since Quantum ESPRESSO works with periodic boundary conditions in all three directions, the way to model interactions of lithium atoms with a single layer of model α-GmO was to make the distance between adjacent GmO layers reasonably large in the z-direction (e.g. 20 Å in these calculations). To avoid long-range electric dipole effects, two layers of α-GmO per supercell were used when the number of lithium atoms above the monolayer was more than (or less than) below the monolayer. Adding the second layer of α-GmO with the inverted number of lithium atoms above and below in the same supercell cancels possible long-range electric dipoles created by a periodic structure in z-direction. In both cases, the distance between adjacent α-GmO layers was kept at 20 Å. The change of energy of one lithium atom, $\Delta E_{Li}$, when it leaves the pure Li structure and adsorbs onto the surface of an α-GmO monolayer can be found by calculating the total energy of one (super-) cell of GmO, $E_{GmO}$ knowing that $E_{Li}$=−204.67 eV is the total energy of one lithium atom in a pure lithium crystal (body centered or hexagonal close packed), calculating $E_{GmO+Li}$ as the total energy of one (super-) cell of GmO, and counting $N_{Li}$ as the number of intercalated lithium atoms.

The goals of the DFT predictive computations for lithium atom interaction with the α-GmO monolayer were: 1) to determine if the monolayer of GmO can hold lithium atoms, and 2) predict the maximum theoretical capacity of this new anode material for Li-ion batteries. Results shown below predict that, unlike the graphene monolayer, the α-GmO monolayer holds lithium atoms by making Li—O bonds. Only α-GmO crystalline monolayers are shown in the following tables and figures; nevertheless, predictive computations for the other crystalline phases of GmO (β, γ, and δ) also find formation of Li—O bonds. Lithium atoms are adsorbed on the GmO monolayer, either on one side or on both sides of the monolayer. A wide range of lithium concentrations are considered starting with a single lithium atom case and ending with a full coverage of lithium atoms above and below H sites of each GmO hexagon.

Single Lithium Atom Near the GmO Monolayer:

The first step toward understanding the interaction of lithium atoms with GmO monolayers is to explore preferred sites for adsorption of a single lithium atom on the α-GmO monolayer in the absence of other lithium atoms. The lowest energy configurations start with the following high-symmetry sites: i) O is a site just above the O-atom; ii) T is a top-site above the C-atom; iii) B-site (bridge-site) is above the middle of the C—C bridge; iv) H-site (hollow-site) is just above the quasi-hexagonal hollow (FIG. 31A), or, in other words, is a hollow site of the carbon sublattice; and v) S-site (special-site) is above a centroid of the triangle formed by three neighboring O-atoms (FIG. 31B), or, in other words, S is a hollow site of the oxygen sublattice.

TABLE 10

Change of lithium atom energy with respect to bulk lithium BCC structure and distance to the GmO monolayer above the high symmetry sites. GmO structure was constrained to have $\alpha = 130°$ and $\alpha_{lat} = 3:13$ Å. 4 × 4 supercell with single lithium atom was used to minimize interactions between lithium atoms in periodic structure.

| Site | $\Delta E_{Li}$, eV | z-axis Li, Å |
|------|---------------------|--------------|
| O | 0.03 | 2.85 |
| T | 0.01 | 2.68 |
| B | −0.08 | 2.40 |
| S | −0.21 | 2.31 |
| H | −0.36 | 2.44 |

Table 10 shows the change of energy of the single lithium atom and its coordinate above the high-symmetry sites of the GmO monolayer constrained to constant unit cell parameters ($\alpha$=130° and $\alpha_{lat}$=313 Å). The H-site is the lowest energy site for a single adsorbed lithium atom. Even though $\Delta E_{Li}$ is less negative for S- and B-sites than for the H-site, they are more preferred energetically for the lithium atom than the bulk lithium metal. Thus, the S- and B-sites may be occupied during lithium adsorption at higher concentrations.

To check if other preferred sites were not missed, the z coordinate of a single lithium atom was optimized above multiple points on the GmO monolayer with fixed small steps along corresponding x- and y-components of the lattice constant. From this information, the change of the lithium atom energy and height above the GmO monolayer were mapped to x, y coordinates (not shown here). This calculation confirms that the H-site is the most energetically preferred site for a single lithium atom and that the lithium atom has the closest approach to the GmO monolayer above the S-site. Thus S-site may be preferred for multilayer systems when lithium atoms must be packed tightly between GmO layers.

For the lithium atom above the H-site, change of the electron density distribution of the GmO monolayer+ single Li system with respect to solely GmO monolayer and lithium atom is calculated to find gain of electron charge density on the Li—O bonds. A lithium atom relatively easily abandons its electron while leaving the structure and turning into a Li$^+$-ion. Such behavior is necessary for the GmO to function as an anode in a Li-ion battery. Integration of the electron charge density $\rho$ over the area of the supercell gives linear electron charge density along the z-axis (not shown here) and confirms the finding that the lithium atom shares its electron charge with the GmO monolayer. Actual electron charge density distribution around the lithium atom finds that the oxygen atoms have the highest density of states. In this sense, the interaction of a single lithium atom with a monolayer of GmO is stronger and advantageous for a Li-ion battery when compared to its interaction with a graphene monolayer.

Parameters for Different Concentrations of Lithium Atoms on a GmO Monolayer:

Using the terminology for lithium-intercalated graphite, where the highest capacity for lithium (and hence for charge) is denoted as the hexal ordering of LiC$_6$, the new Li$_2$C$_n$O$_n$ structures have pairs of lithium atoms above and below the same hollow sites and LiC$_n$O$_n$ structures have lithium atoms only on one side of the GmO monolayer. As an example of the GmO monolayer and lithium structures, Li$_2$C$_6$O$_6$ (Li$_{0.67}$C$_2$O$_2$) and Li$_2$C$_2$O$_2$ configurations are shown in FIGS. 32A and B. Table 11 shows the average change of lithium atom energy for fully relaxed structures and demonstrates that lithium atoms are generally more bound to the GmO monolayer at low lithium concentrations (corresponding to low charge capacity). It also suggests that lithium atoms tend to stay further from each other rather than forming lithium metal clusters on the monolayer. Repellent behavior between lithium atoms is important for the Li transport on GmO and possible application for fast charging in batteries.

Theoretical capacities were computed for all compositions of matter sampled in Table 11. The largest theoretical capacity of 957 mAh/g is predicted for the Li$_2$C$_2$O$_2$ configuration when lithium atoms are placed above and below each hollow site of the GmO monolayer. This capacity is 2.6 times higher than the theoretical capacity of graphite (372 mAh/g for LiC$_6$). The case when each hollow site holds a lithium atom on only one side of the GmO monolayer has capacity that is 1.3 times higher than that of graphite. All other configurations have lower capacities than graphite. The gradual increase in capacity from the bottom to the top of Table 11 is equivalent to the increase in capacity of graphite as more lithium intercalates to reach the final hexal ordering of LiC$_6$.

TABLE 11

Average change of lithium atom energy, opening angle of the GmO monolayer unit cell, unit cell lattice constant length, and corresponding theoretical capacity for considered fully relaxed GmO monolayer and Li structures. 1 × 1 and 2 × 2 supercells were used for LiC$_4$O$_4$ and Li$_2$C$_8$O$_8$, respectively. The LiC$_4$O$_4$ structure had lithium atoms only on top of the GmO monolayer; the Li$_2$C$_8$O$_8$ structure had lithium atoms above and below the GmO monolayer.

| Composition of matter: Li(CO)$_{2n}$ and Li$_2$(CO)$_{2n}$ notation | Composition of matter: Li$_x$C$_2$O$_2$ notation | $\Delta E_{Li}$, eV | $\alpha$, deg | $\alpha_{lat}$, Å | Theoretical Specific Capacity (mAh/g) |
|---|---|---|---|---|---|
| Li$_2$C$_2$O$_2$ | Li$_2$C$_2$O$_2$ | 0.06 | 134 | 3.34 | 957 |
| LiC$_2$O$_2$ | LiC$_2$O$_2$ | 0.12 | 134 | 3.34 | 478 |
| Li$_2$C$_6$O$_6$ | Li$_{0.67}$C$_2$O$_2$ | −0.04 | 133 | 3.22 | 319 |
| LiC$_4$O$_4$ | Li$_{0.5}$C$_2$O$_2$ | 0.06 | 132 | 3.2 | 239 |
| Li$_2$C$_8$O$_8$ | Li$_{0.5}$C$_2$O$_2$ | −0.11 | 132 | 3.22 | 239 |
| LiC$_6$O$_6$ | Li$_{0.33}$C$_2$O$_2$ | −0.07 | 131 | 3.18 | 159 |
| LiC$_8$O$_8$ | Li$_{0.25}$C$_2$O$_2$ | −0.16 | 131 | 3.17 | 120 |
| Li$_2$C$_{18}$O$_{18}$ | Li$_{0.22}$C$_2$O$_2$ | −0.44 | 131 | 3.18 | 106 |
| Li$_2$C$_{32}$O$_{32}$ | Li$_{0.13}$C$_2$O$_2$ | −0.58 | 132 | 3.13 | 60 |
| LiC$_{18}$O$_{18}$ | Li$_{0.11}$C$_2$O$_2$ | −0.45 | 130 | 3.19 | 53 |
| LiC$_{32}$O$_{32}$ | Li$_{0.06}$C$_2$O$_2$ | −0.59 | 130 | 3.09 | 30 |
| LiC$_{50}$O$_{50}$ | Li$_{0.04}$C$_2$O$_2$ | −0.58 | 130 | 3.09 | 19 |

Although the highest capacity Li$_2$C$_2$O$_2$ and LiC$_2$O$_2$ structures from the Table 11 all have a $\Delta E_{Li}$>0 eV, (and thus are not more attractive for lithium atoms than bulk lithium metal), these energies are much closer to 0 eV than their equivalents in graphene. For example, the hexal structure equivalent of lithium atoms on both sides of graphene (Li$_2$C$_6$) has a predicted energy of +0.60 eV while the same structure on GmO (Li$_2$C$_6$O$_6$) gives $\Delta E_{Li}$ of −0.04 eV. In addition, previous experience with graphene and graphite indicates that these structures would be feasible in multilayers of GmO used in anodes of Li-ion batteries, as shown above in batteries made with GmO-based anode materials.

Therefore, in the case of multiple lithium atoms, lower concentrations are energetically more stable than higher. The lithium atoms prefer to stay away from each other. Repellent behavior may be substantial contributor to the observed fast charging in lithium-ion batteries using GmO-containing electrodes. The highest considered concentration of lithium in the $Li_2C_2O_2$ configuration has superior charge capacity of 957 mAh/g, 2.6 times higher than in graphite. It is notable that the $Li_2C_6O_6$ configuration is energetically stable while an equivalent configuration for graphene ($Li_2C_6$) is not much favorable in the reported ab initio studies.

The lithiated GmO materials described above could be generated outside of incorporating GmGT materials in a manufactured LIB cell that is subsequently cycled. The LGm material could be produced by electrochemical insertion methods, for example. Alternatively, pre-GmGT material could be suspended in an aqueous solution of $Li_2CO_3$, dried, and thermally processed to higher temperatures sufficient to produce GmO-based materials described above. Alternatively, final-product GmGT material could be suspended in an aqueous solution of $Li_2CO_3$ and dried by methods described above. This modified GmGT powder could be used directly in LIB electrode formation as described above to facilitate conventional formation cycling and reduce irreversible loss of lithium.

Band Structure, Density of States and Electronic Conductivity:

Energy bands for lithiated ($Li_xC_2O_2$) and un-lithiated ($\alpha$-GmO) compositions of matter were compared confirming that a pure $\alpha$-GmO monolayer is a semiconductor [Refs: Mattson et al. (2011). "Evidence of nanocrystalline semiconducting graphene monoxide during thermal reduction of graphene oxide in vacuum," *ACS Nano* 5:9710 and Pu et al. (2013) "Strain-induced band-gap engineering of graphene monoxide and its effect on graphene, Phys. Rev. B 87:085417], and uncovering that even at as low concentration of lithium atoms as $Li_2C_{32}O_{32}$ the composition of matter is a conductor. The highest considered concentration of lithium in $Li_2C_2O_2$ from FIG. 32B has the best metallic properties, indicating that addition of Li closes the energy band gap of a semiconducting GmO monolayer turning the new composition of matter into a conductor. Density of states for the fully relaxed GmO monolayer, $LiC_6O_6$, $Li_2C_6O_6$, and $Li_2C_2O_2$ structures are shown in FIG. 33. The lithiated configurations have more states around the Fermi energy and are conductive, consistent with the band structure, and desirable for a battery anode.

Therefore, analysis of the band structure and density of states confirmed conducting properties of the composition of matter even at as low concentrations as $Li_2C_{32}O_{32}$. Integration of the density of states for different structures around the Fermi energy and analysis of the charge density redistribution proved that lithium atoms can easily donate electrons and turn into the $Li^+$-ions, while leaving GmO. This makes GmO a suitable battery anode material in lithium-ion batteries.

Li Transfer Near the GmO Monolayer:

Energy plots for lithium transport near the $\alpha$-GmO monolayer were obtained with the nudged elastic band (NEB) method implemented in Quantum ESPRESSO [Henkelman and Jónsson (2000) "A climbing image nudged elastic band method for finding saddle points and minimum energy paths," *J. Chem. Phys.* 113:9901-9904]. Transition of the lithium atom through the GmO hollow is unlikely due to the energy barrier of 4.5 eV (not shown here), but lithium transfer on the surface of the GmO monolayer proceeds in a facile manner from one H-site to the next H-site, passing through the S-, B-, and S-sites. The highest energy barrier has a height of 0.34 eV at the B-site, indicating that lithium can move fast parallel to the GmO layer.

Therefore, the transfer of lithium atoms, considered with the nudged elastic band method, excludes lithium transfer through the hollow of the GmO lattice due to high energy barrier. On the surface of GmO, transfer of lithium goes fast between neighboring H-sites through S-, B-, and S-sites. This result supports the measurements of the electrochemical cells made with GmO-based materials that show much faster charging than equivalently built graphite anodes.

EXAMPLES

The following Examples are intended to illustrate the Invention above and should not be construed as to narrow its scope. One skilled in the art will readily recognize that the Examples may suggest other ways in which the present invention could be practiced. It should be understood that variations and modifications may be made while remaining within the scope of the invention.

Example 1. Synthesis and Characterization of Pre-GmGT Materials

Sample 3.18 from Table 3 typifies a synthesis process to produce pre-GmGT(I) material. Therein, Suspension 1.1 is combined with Solution 2.1 in a typical ratio followed by a typical lower-temperature processing in low-vacuum oven. Sample 3.18 is known to lead to GmGT(I)-X with further higher-temperature processing described in Table 4 as Sample 4.13. FIG. 3 summarizes identifying fingerprints of the pre-GmGT(I) material from several characterizations.

FIG. 3A-D shows TEM data collected, for example, from a Hitachi H-9000NAR 300 keV transmission electron microscope and subsequent data analysis of the pre-GmGT (I) material. The rings evident in the SAED pattern shown in FIG. 3C are characteristic of the G component of pre-GmGT (I) material. It indicates that the G-component of the composite pre-GmGT(I) material is crystalline in nature, having several distinct orientational domains within the area of the sample selected by the 1.5 μm diameter aperture of the TEM (indicated by the spottiness of the rings), and that a multitude of smaller orientational domains of crystalline G also exist as indicated by the smoothness of the diffraction rings in between distinct diffraction spots. There is no detectable diffraction feature that could be associated with regions of crystalline TM compounds. FIG. 3D is a brightfield TEM image of the region corresponding to the SAED data, and shows the compact flake-like nature of the material. Furthermore, there is no indication of nanocrystalline or agglomeration of TM-containing nanoparticles. FIG. 3A is obtained from the SAED pattern and involves centering the diffraction pattern, rotationally averaging the intensity distribution, subtracting a piece-wise linear background that is constrained to be everywhere less than raw data intensity, and plotting the result as a function of calibrated spatial frequency. Measurement of the peak positions corresponding to the rings present in the SAED pattern, FIG. 3B, confirm spatial frequency and atomic spacings corresponding to graphitic or graphene in-plane spacings. There is no evidence for crystalline TM particles present in this area of the sample, which is characteristic of pre-GmGT materials.

FIG. 3E shows representative IR data collected from pre-GmGT(I) material using, for example, using diffuse reflectance method (DIFFIR from PIKE instruments) with a commercial FTIR (Bruker Vertex) Infrared Spectrometer.

Approximately 1-5% by weight of ground sample is measured and added to 5 mg of potassium bromide powder and loaded into a cup for reflectance measurement. A background measurement of 5 mg of potassium bromide powder is measured similarly to the prior example and subtracted from the former measurement to obtain the reflected/scattered infrared intensity of the sample. This data is similar to an infrared absorption spectrum of arbitrary units and provides a vibrational fingerprint signature of the sample. The spectrum shows typical fingerprint features characteristic of pre-GmGT materials: 1) comparatively sharp absorption lines just below 1,000 $cm^{-1}$ typical for Mo—O vibrations in an $MoO_3$ bonding configuration; 2) broad features in the region of 1250 $cm^{-1}$ typical for C—O—C type vibrations; and 3) derivative-like features around 1700 $cm^{-1}$ indicative of defective sp2 C—C vibrations.

FIG. 3F shows representative SEM data collected from pre-GmGT(I) material, for example, using a Hitachi S-4800 FE-SEM operated at 15 keV. The specific experimental sample in this case was obtained by processes identical to Sample 3.18, but without the sizing step to produce a powdered form of material. Typical SEM images of pre-GmGT(I) material, e.g., FIG. 3F, show large flakes having a compact layered sheet-like morphology different than the wispy G or rGO morphology described in the literature.

FIGS. 3G&H shows TGA and DSC data, respectively, for pre-GmGT(I) material produced identically as described above in FIG. 3F for the SEM sample material. The TGA/DSC data was collected, for example, using a TA Instruments Discovery SDT 650 simultaneous TGA/DSC instrument. The material sample was heated at a rate of 10° C./min from room temperature to 300° C. under a 100 mL/minute flow of argon gas. The sample did not exhibit an exothermic peak below 300° C., which is typically seen for graphene oxide. The enthalpy, calculated by integrating the heat flow curve over a temperature range of 122-266° C., was 149.7 J/g without baseline subtraction. The heat flow peak of 2.243 W/g occurred at 187.5° C. The maximum rate of mass loss occurred as the heating profile ended. These features represent a characteristic fingerprint of pre-GmGT material, namely that any exothermic nature of the material is substantially absent. At the end of heating to 300° C., the sample retained 86.6% of its starting mass, also a fingerprint of pre-GmGT material.

BET measurements of pre-GmGT(I) material (Sample 3.18), for example, used a Micromiritics ASAP 2020 BET Surface area/Pore size analyzer to obtain a full nitrogen adsorption isotherm. Degassing was performed with evacuation at 50 mmHg/s to 10 μmHg for 90 minutes at 90° C., followed by heating at a rate of 10° C./min and held at 240 minutes at 240° C., with a hold pressure of 100 mmHg. For pre-GmGT(I) material, the BET surface area was 6.5 $m^2/g$ in this example. A fingerprint of pre-GmGT materials is measured BET surface area indicating a compact material with specific surface area like graphite, and pointedly unlike the specific surface area of expended graphite, graphene, or typical rGO materials.

In this example, pre-GmGT material is typified as a compact layered material (seen by SEM and TEM) with a low specific surface area (similar to graphite) as determined by BET surface area measurements and having essentially no exothermic nature when heated to about 300° C. as determined by TGA/DSC measurements. The Gm component of pre-GmGT material contains functional groups related to C—O—C moieties as determined by FTIR measurements that further indicate the T component of pre-GmGT is at least in part a fully oxidized TMO. The G component of pre-GmGT is substantially crystalline while the T component is substantially non-crystalline and uniformly distributed in the material as determined by SAED measurements and imaging.

Example 2. Synthesis and Characterization of GmGT(I) and GmGT(II) Materials

Examples of GmGT(I) and GmGT(II) materials are used to show the fingerprints from standard measurements. Select examples produced in the processes outlined in Tables 3 and Table 4 are described above in the detailed discussion. The characterization of the samples are described here.

Figure 4:
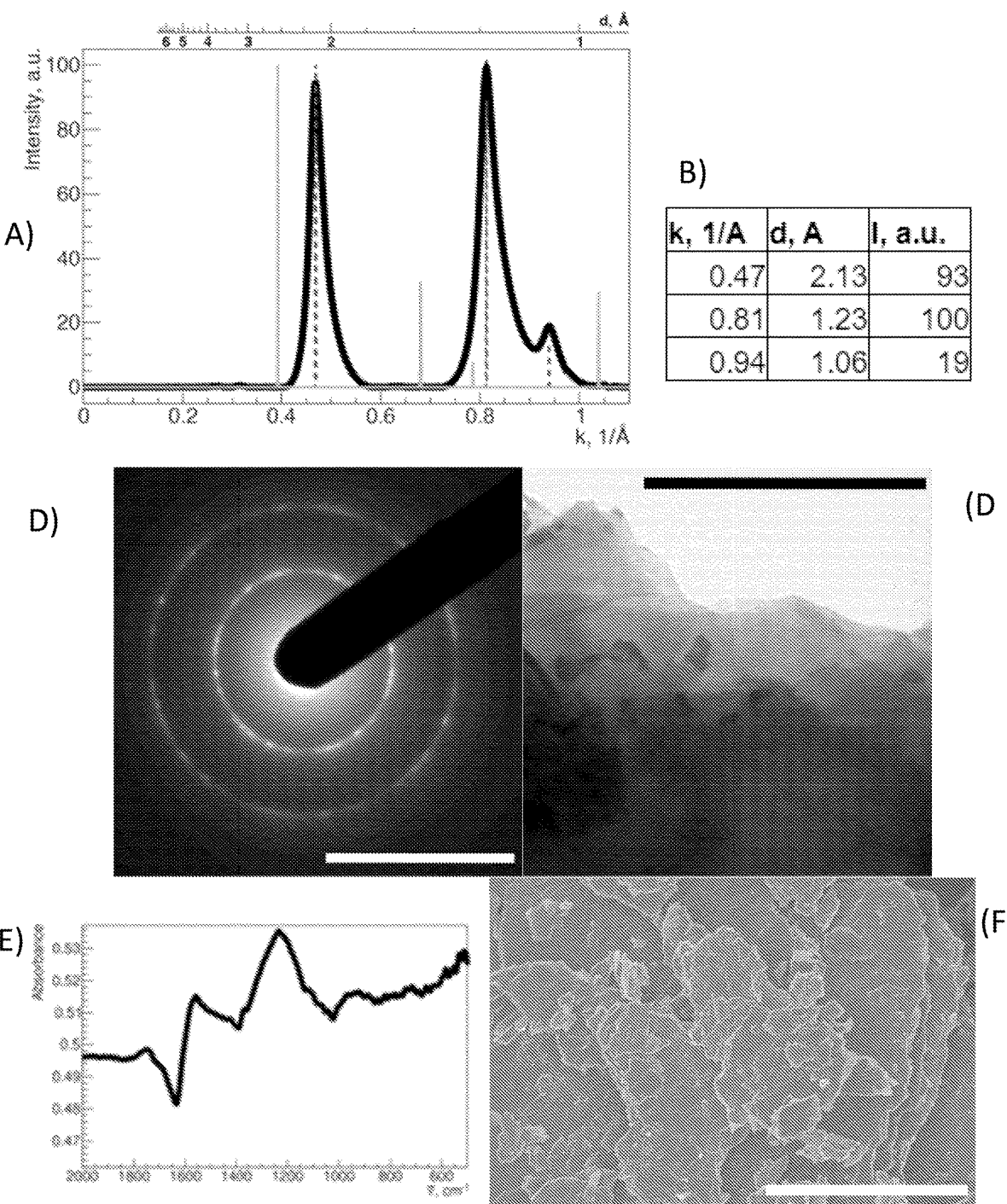
FIG. 4: Characterization signatures of GmGT(I)-A product material: (A) SAED intensity profile (solid bold black) and peak positions for graphene (dashed dark gray). Note absence of crystalline α-GmO (solid bright gray) peaks; (B)

FIG. 4 shows data collected for GmGT(I)-A according to Sample 4.1 in Table 4, but with a final temperature about 625° C. The rings evident in the SAED pattern shown in FIG. 4C are characteristic of the G component of GmGT(I) material. It indicates that the G-component of the composite GmGT(I) material is crystalline in nature, having several distinct orientational domains within the area of the sample selected by the 1.5 μm diameter aperture of the TEM (indicated by the spottiness of the rings), and that a multitude of smaller orientational domains of crystalline G also exist as indicated by the smoothness of the diffraction rings in between distinct diffraction spots. There is no detectable diffraction feature that could be associated with regions of crystalline TM compounds or crystalline GmO compounds. FIG. 4D is the corresponding brightfield TEM image and shows the compact flake-like nature of the material. The small dark patches are likely small fragments of the larger flake as they do not show any crystalline diffraction features. It is possible that the dark features are agglomerations of TM-containing nanoparticles. FIG. 4A is the rotationally averaged SAED intensity line profile (see Example 1, above), and FIG. 4B, measured from the line profile, confirm spatial frequency and atomic spacings corresponding to graphitic or graphene in-plane spacings. There is no evidence for crystalline TM particles present in this area of the sample, which is characteristic of GmGT(I)-A materials.

FIG. 4E shows representative IR data with typical fingerprint features characteristic of GmGT(I)-A materials: 1) broad features in the region of 1250 $cm^{-1}$ typical for C—O—C type vibrations; and 2) derivative-like features around 1700 $cm^{-1}$ indicative of defective sp2 C—C vibrations. The characteristic Mo—O features present in pre-GmGT material is significantly reduced and considerably broadened for this material where the processing temperature is significantly higher.

FIG. 4F shows representative SEM data collected from GmGT(I)-A material. Typical SEM images of GmGT(I)-A material show large flakes having a compact layered sheet-like morphology different than the wispy G or rGO morphology.

FIG. 5 shows data collected for GmGT(I)-X according to Sample 4.1 in Table 4. The spots/rings and faint rings evident in the SAED pattern shown in FIG. 5C are characteristic of the G and GmO components of GmGT(I)-X material, respectively. The spots indicate that the G-component of the composite GmGT(I)-X material is crystalline in nature, having primarily one orientational domain within the area of the sample selected by the 1.5 μm diameter aperture of the TEM (indicated by the spots), and that the GmO component of the composite is crystalline in nature, having several orientational domains within the area of the sample, with a multitude of smaller orientational domains of crystalline GmO as indicated by the smoothness of the diffraction rings. There is no detectable diffraction feature that could be associated with regions of crystalline TM compounds. FIG. 5D is the corresponding brightfield TEM image, and shows the compact flake-like nature of the material. There is little or no indication of nanocrystalline or agglomeration of TM-containing nanoparticles. FIG. 5A is the SAED line scan, and FIG. 5B confirms measured spatial frequency and atomic spacings corresponding to graphitic or graphene and GmO in-plane spacings.

FIG. 5E shows representative IR data with typical fingerprint features characteristic of GmGT(I)-X materials: 1) broad features in the region of 1250 $cm^{-1}$ typical for C—O—C type vibrations; and 2) derivative-like features around 1700 $cm^{-1}$ indicative of defective sp2 C—C vibrations. The characteristic Mo—O features present in GmGT (I)-X material is significantly reduced and considerably broadened similar to GmGT(I)-A material above.

FIG. 5F shows representative SEM data collected from GmGT(I)-X material. Typical SEM images of GmGT(I)-X material show large flakes having a compact layered sheet-like morphology different than the wispy G or rGO morphology.

Synthesis of GmGT(I)-NC follows processing steps, for example, according to Sample 4.1 in Table 4, but with a final temperature above 800° C. The rings evident in the SAED pattern (not shown) are characteristic of the G component of GmGT(I) material with additional rings consistent with diffraction signatures of $MoO_2$ nanocrytsals. The characteristic α-GmO rings are close in position to some of the $MoO_2$ rings and are visible in samples with smaller number of nanocrystals but can be obscured when the ratio of TM:C atoms becomes large leading to larger number of nanocrystals and with increased size.

IR data (not shown here) displays fingerprint features characteristic of GmGT(I)-NC materials similar to what is observed for GmGT(I)-X: 1) broad features in the region of 1250 $cm^{-1}$ typical for C—O—C type vibrations; and 2) derivative-like features around 1700 $cm^{-1}$ indicative of defective sp2 C—C vibrations. 3) The absence of Mo—O vibrations attributable to $MoO_3$ which are visible in starting material that has unreduced $MoO_3$. Mo—O vibrations attributable to $MoO_2$ are too weak to be detected in spectra due to the weak dipole.

FIG. 6 shows data collected for GmGT(II)-A according to Sample 4.2 in Table 4. The rings evident in the SAED pattern shown in FIG. 6C are characteristic of the G component of GmGT(II)-A material. It indicates that the G-component of the composite GmGT(II) material is crystalline in nature, having several orientational domains within the area of the sample selected by the 1.5 μm diameter aperture of the TEM (indicated by the varying intensity along the rings) with a multitude of smaller orientational domains as indicated by the smoothness of the diffraction rings. There is no detectable diffraction feature that could be associated with regions of crystalline TM compounds or well-ordered crystallographic GmO compounds. FIG. 6D is the corresponding brightfield TEM image and shows the compact flake-like nature of the material on a holey carbon grid. FIG. 6A is the SAED line scan, and FIG. 6B confirms spatial frequency and atomic spacings corresponding to graphitic or graphene in-plane spacings. There is no evidence for significant crystalline TM particles present in this area of the sample, which is characteristic of GmGT(II)-A materials.

FIG. 6E shows representative IR data with typical fingerprint features characteristic of GmGT(II)-A materials: 1) broad features in the region of 1250 $cm^{-1}$ typical for C—O—C type vibrations; and 2) derivative-like features around 1700 $cm^{-1}$ indicative of defective sp2 C—C vibrations.

BET measurements, as described in Example 1, indicate the BET surface area was 8.4 $m^2/g$ for GmGT(I)-X material. For a blend of GmGT(I)-X and GmGT(II)-A material, BET surface area was 8.5 $m^2/g$. A fingerprint of GmGT materials is measured BET surface area indicating a compact material with specific surface area like graphite, and pointedly unlike the specific surface area of expended graphite, graphene, or typical rGO materials.

FIGS. 7A and B shows TGA and DSC data, respectively, for a blend of GmGT(I)-X and GmGT(II)-A material. The TGA/DSC data was collected, for example, using a TA Instruments Discovery SDT 650 simultaneous TGA/DSC instrument. Sample material was heated at a rate of 10° C./min from room temperature to 600° C., then continued heating at a rate of 3° C./min from 600° C. to 1100° C. The sample did not exhibit an exothermic peak below 300° C., which is typically seen for graphene oxide. When the heat flow curve was integrated between 122-266° C., the enthalpy was 263.7 J/g, without baseline subtraction. The peak heat flow of 3.307 W/g occurred at 191.94° C. These features (between RT and 300° C.) represent a characteristic fingerprint of GmGT material, namely that any exothermic nature of the material is substantially absent. At the end of heating in this example, the sample retained 58.7% of its starting mass. Mass loss occurred at maximum rate at between 727-750° C., and is a characteristic fingerprint of GmGT material.

FIG. 7C shows $^{13}C$ solid state NMR data for a blend of GmGT(I)-X and GmGT(II)-A material. Material powder is, for example, packed into a 3.2 mm rotor where 128 scans were acquired with a recycle delay of 0.5 s at 20 kHz on a Bruker Avance III HD 600 MHz instrument. Lead-up experiments with carbon and hydrogen NMR indicate that GmGT materials have low amounts of hydrogen, they exhibit conductive properties, and that high power decoupling is not required. The short recycle delay is a fingerprint of GmGT materials, as are the peaks at about 117 and about 160 ppm chemical shifts. Peaks in FIG. 7C that are marked with an asterisk are fully interpreted as sidebands of the 117 and 160 ppm peaks.

Example 3. Determination of Relative Fraction of Components in Composite GmGT Product Materials from EDS Measurements of Atomic Percentages

TABLE 12

EDS measurements to estimate the relative amount of GmO-like material in GmGT composites.
Atomic Composition [%]

| Composition | Pre-GmGT(I) | GmGT(I)-A | GmGT(I)-NC | GmGT(I)-X | GmGT(I)-X | GmGT(I)-X |
|---|---|---|---|---|---|---|
| Nominal recipe Mo:C content [arb. units] | 2:1 | 2:1 | 10:1 | 1:1 | 1:5 | 2:1 |

TABLE 12-continued

EDS measurements to estimate the relative amount of GmO-like material in GmGT composites.
Atomic Composition [%]

| Composition | Pre-GmGT(I) | GmGT(I)-A | GmGT(I)-NC | GmGT(I)-X | GmGT(I)-X | GmGT(I)-X |
|---|---|---|---|---|---|---|
| Carbon [at. %] | 69.2 | 80 | 21.4 | 73.7 | 79.8 | 65.5 |
| Oxygen [at. %] | 26.3 | 15.7 | 50.7 | 16.9 | 15.7 | 25.7 |
| Molybdenum [at. %] | 1.6 | 2.4 | 22.6 | 2.8 | 0.8 | 5.2 |
| MoO$_2$ Content [%] | 7.8 | 12.2 | 85.7 | 15 | 4.2 | 24 |
| GmO Content [%] | 54.5 | 30.6 | 0 | 30 | 38 | 36 |
| Graphene Content [%] | 37.7 | 57.1 | 14.3 | 55 | 57.7 | 40 |

Table 12 gives quantitative measures of atomic percent of carbon, oxygen, and molybdenum and derivations of relative molecular percentages of GmGT-based material containing GmO-like component (calculated as $C_2O_2$), G-like component (calculated as $C_6$), and TMO component (calculated as $MoO_2$) for final and intermediate composite materials. The measured atomic percent of C, O, and Mo obtained by EDS are normalized such that the sum of relative percentages of the individual atomic species is unity. Impurities are neglected in this estimation. The relative oxygen content is then divided into fractions of two distinct types of oxygen species: one of the oxygen species is assumed to be associated with Mo atoms as $MoO_2$, and the remaining oxygen content is assumed to be a species associated with GmO-like material as $C_2O_2$. This designation of oxygen species similarly divides the carbon into two species: one species associated with the aforementioned GmO-like material as $C_2O_2$, and the remaining carbon content assumed to be a species associated with graphene-like material as $C_6$. Artificially separating oxygen and carbon atoms as two distinct species each and making molecular assignments in this manner allows one to roughly characterize the relative molecular percentages of the G, GmO-like, and TMO components of the final or intermediate composite materials, and to semi quantitatively access material composition as a function of feed materials and synthesis process. Importantly, the molar concentration of the GmO-like component in these product-material composites is generally substantial. For the sample with 10:1 recipe Mo:C, the TMO precipitated out substantially as determined by TEM/SAED characterization (not shown), leaving $MoO_2$ nanocrystals (as determined by SAED measurements) many 10's micron in size decorated throughout flakes of the material.

Example 4. Synthesis of GmGT-X Product Materials Using Inert Gas Environments Sample 4.4 in Table 4 provides a second example to generate the GmGT(I) material in a tube furnace under flowing nitrogen gas. The starting material is Sample 3.17 from Table 3, in a form factor of powder, loaded in an open quartz crucible at mass loading of 16 mg/cm$^2$ and placed at the central temperature zone of a tube furnace before establishing a 3.1 L/min flow of ultra-high purity nitrogen gas. The final temperature (T$_f$) of 725° C. is kept for 10 min. The time to reach T$_f$ from T$_m$ is 1 hr 32 min, considerably shorter compared to the vacuum anneal and chosen as the fastest temperature ramping recommended by the furnace manufacturer. The faster heating rate is allowed at least in part due to the uncovered containment vessel (quartz crucible) and subsequent capability of the flowing gas supply to quickly transfer evolving gases away from the sample area. Upon cooling to room temperature and removal from the tube furnace the material is already the desired size and form to be incorporated in the formation of battery electrode materials. The final product is characterized with multitude of methods in a similar manner as to Examples above to show that it has the characteristics of GmGT(I) material.

Example 5. Synthesis of rGO Using Process that Produce GmGT Materials

Sample 4.8 of Table 4 starts with precursor material (Sample 3.11 from Table 3) and stays long at the maximum temperature (4 hours at T$_f$); all other vacuum furnace heat treatment parameters essentially the same as for Sample 4.1: same nonreactive tantalum boat with a cover, material loading of 31 mg/cm$^2$, form factor of flakes, base pressure of $2\times10^{-6}$ torr, final temperature (T$_f$) of 780 t 20° C. ramp time of 15 hr 45 min to reach T$_f$ from T$_m$. The final product does not display the characterization fingerprints of GmGT materials. The failure to produce GmGT material illustrates the necessities of the enabling TM component of the synthesis process.

Example 6. Using Commercial GO Powders and prGO Powders as Alternative Carbon Sources (Sample 6.6 in Table 5): Commercial partially reduced graphene oxide (prGO) was procured from Graphenea (Cambridge, MA, USA) to serve as a carbon source where chemical methods were used to produce prGO with 13-17% oxygen in the material. A quantity of 400 mg of prGO was combined with 80 mL of Solution 2.1 as TM source and stirred with a magnetic stirrer for 3-4 min at room temperature. The solution was dried in a borosilicate glass tray for 24 hours at 52° C., scraped and loaded at 40 mg/cm$^2$ in powder form in an alumina coated tantalum boat with a lid. The covered material load was heated resistively in high vacuum at a starting base pressure of $2\times10^{-6}$ torr with variable heating rates in different temperature windows. The heating rate approaching and departing T$_m$, the 230±45° C. temperature of maximum mass loss, was symmetrically slow at 0.1° C./min, and the final annealing was done for 4 hours at temperature T$_f$=780±20° C. The time to reach T$_f$ from T$_m$ was 15 hrs 45 minutes. Upon cooling to room temperature and removal from the vacuum furnace the produced material was characterized. Characterization of this material is contained in FIG. 8.

The rings evident in the SAED pattern shown in FIG. 8C are characteristic of prGO-like material where the G-like component of the composite material is crystalline in nature with a multitude of smaller orientational domains as indicated by the smoothness of the diffraction ring between distinct spots. There are limited diffraction features associated with regions of crystalline TMO evident as stray spots in FIG. 8C. FIG. 8D is the corresponding brightfield TEM image and shows the wispy-like nature of the material characteristic of prGO materials, and a few TMO nanocrystals that are evident. FIG. 8A is the SAED line scan, and FIG. 8B confirms measured spatial frequency and atomic spacings corresponding to prGO in-plane spacings.

FIG. 8E shows representative IR data with broad features in the region of 1250 cm$^{-1}$ typical for C—O—C type vibrations remaining in the prGO material, derivative-like features around 1700 cm$^{-1}$ indicative of defective sp2 C—C vibrations present in prGO, and comparatively well-defined Mo—O vibrations characteristic of MoO$_3$ remaining in the material as inhomogeneously incorporated TMO. While some of these IR features are shared in GmGT materials, when combined with TEM/SAED or BET surface area measurements (not shown), the consensus fingerprint criteria for GmGT materials is not met.

This example is significant because it shows that commercial prGO cannot be used to produce the desired compositions of matter. The relative atomic ratio of oxygen to carbon for the starting carbon material in this case was about 0.15:1 and provides a lower bound to what is required to synthesize GmO-based materials when processed in vacuum.

FIG. 9 shows data collected for GmGT(I)-X, made according to Sample 6.8 in Table 5 where GO powder is used as a starting carbon source. The rings evident in the SAED pattern shown in FIG. 9C are characteristic of the G and α-GmO components of GmGT(I)-X material. It indicates that the G and GmO-components of the composite GmGT(I)-X material is crystalline in nature with a multitude of smaller orientational domains as indicated by the smoothness of the diffraction rings. There is no detectable diffraction feature that could be associated with regions of crystalline TM compounds. FIG. 9D is the corresponding brightfield TEM image and shows the compact flake-like nature of the material. FIG. 9A is the SAED line scan, and FIG. 9B confirms measured spatial frequency and atomic spacings corresponding to α-GmO and graphitic or graphene in-plane spacings. There is no evidence for crystalline TM particles present in this area of the sample, which is characteristic of GmGT(I)-X materials.

FIG. 9E shows representative IR data with typical fingerprint features characteristic of GmGT(I)-X materials: 1) broad features in the region of 1250 cm$^{-1}$ typical for C—O—C type vibrations; 2) derivative-like features around 1700 cm$^{-1}$ indicative of defective sp2 C—C vibrations; and 3) broad or absent Mo—O features below 1000 cm$^{-1}$ that would be indicative of MoO$_3$.

This example shows that powders of GO could be used as the starting carbon source, which allows synthesis routes with lower water content processing routes that are faster and more economical than low-concentration aqueous GO routes.

Example 7. Using Lignin as a Bio-Renewable Carbon Source to Produce GmGT(I)-X Material Table 5, embodiment of Sample 6.3, using lignin as starting carbon source to create GmGT(I)-X material, is used. Lignin powder (26 mg) was used as carbon source, combined with 5.2 mL of Solution 2.1 as TM source, and stirred with a glass rod for 2 minutes at room temperature. The solution was dried in a silicone tray for 24 hours at room temperature, scraped and loaded at 2.2 mg/cm$^2$ in powder form in an alumina coated tantalum boat with a lid. The covered material load was heated resistively in high vacuum at a starting base pressure of $2\times10^{-6}$ torr with variable heating rates in different temperature windows. The heating rate approaching and departing T$_m$, the 230±45° C. temperature, was symmetrically slow at 0.05° C./min, and the final annealing was done for 10 minutes at temperature T$_f$=705±20° C. The thermal processing parameters in this case were chosen to match thermal profiles known to produce GmGT(I)-X material when GO-based carbon sources are used as starting materials. The value of T$_m$ in this case, does not necessarily directly correspond to the temperature of maximum rate of mass loss. The time to reach T$_f$ from T$_m$ was 16 hrs 45 min. Upon cooling to room temperature and removal from the vacuum furnace the produced material is characterized and found consistent with GmGT (I)-X material.

FIG. 10 shows data collected for GmGT(I)-X, made from lignin. The rings evident in the SAED pattern shown in FIG. 10C are characteristic of the G and α-GmO components of GmGT(II)-X material. It indicates that the G and GmO-components of the composite GmGT(I)-X material is crystalline in nature with a multitude of very small orientational domains as indicated by the smoothness and broadness of the diffraction rings. There is no detectable diffraction feature that could be associated with regions of crystalline TM compounds. FIG. 10D is the corresponding brightfield TEM image and shows an agglomerated assembly of small particle-like structures that have a possible sense of layered nature in the thinnest regions of the sample. FIG. 10A is the SAED line scan, and FIG. 10B confirms measured spatial frequency and atomic spacings corresponding to α-GmO and graphitic or graphene in-plane spacings. There is no evidence for crystalline TM particles present in this area of the sample, which is characteristic of GmGT(I)-X materials.

FIG. 10E shows representative IR data with typical fingerprint features characteristic of lignin and GmO. The IR measurement is a macroscopic measurement of milligrams of material, while the microscopic TEM can detect microscopic crystallinity. The IR spectrum include the several additional signatures for lignin in addition to the characteristic features for GmO such as the broad features in the region of 1250 cm$^{-1}$ typical for C—O—C type vibrations and the derivative-like features around 1700 cm$^{-1}$ indicative of defective sp2 C—C vibrations.

FIG. 10A-D shows characteristic signatures of crystalline layers of α-GmO that coexist with crystalline layers of graphene obtained by transmission electron microscopy methods and analysis. The molecular MoO$_2$ is evenly distributed and detectable by EDS (not shown), but without evidence of any crystalline nature of the TM component from SAED. IR data, FIG. 10E, shows the same characteristic absorption features of GmGT materials synthesized from starting carbon sources derived from GO. This example is significant because it opens a pathway to economical starting source materials. Alternative carbon sources from the same or similar family of materials as lignin could also be used as feed stock to this synthesis route.

Example 8. Using Hydrothermally Produced GO from a Bio-Renewable Carbon Source to Produce GmGT Materials (Sample 6.7 in Table 5): Lab-based hydrothermal processing of sugar was used to synthesize GO layers and separate them from the other products using surface tension of the liquid. This GO was collected and resuspended in water, combining 10 mL of this suspension with 40 mL of the TM containing Solution 2.1. Magnetic stirring was used for 3-4 min at room temperature and the solution was dried in a borosilicate glass tray for 24 hours at 49° C. The dried matter was scraped and loaded at 2.5 mg/cm² in flake form in an alumina coated tantalum boat with a lid. The covered material load was heated resistively in high vacuum at a starting base pressure of 2×10⁻⁶ torr with variable heating rates in different temperature windows. The heating rate approaching and departing $T_m$, the 230±45° C. temperature of maximum mass loss for GO-based processing, was symmetrically slow at 0.1° C./min, and the final annealing was done for 4 hours at temperature $T_f$=780±20° C. The time to reach $T_f$ from $T_m$ was 15 hrs 45 min.

FIG. 11 shows data collected for GmGT(I)-X synthesized according to Sample 6.7 in Table 5. The spots and faint rings evident in the SAED pattern shown in FIG. 11C are characteristic of the G and GmO components of GmGT(I)-X material, respectively. The spots indicate that the G-component of the composite GmGT(I)-X material is crystalline in nature, primarily in a single orientational domain within the area of the sample selected by the 1 μm diameter aperture of the TEM (indicated by the spots of the rings), and that the GmO component of the composite is crystalline in nature, having several orientational domains within the area of the sample, with a multitude of smaller orientational domains of crystalline GmO as indicated by the smoothness of the diffraction rings. The SAED data shown in the figure is obtained from the featureless region of the flake (see FIG. 11D); consequently, there is no detectable diffraction feature that could be associated with crystalline TM compounds. SAED data (not shown) collected from the nearby region that appear to be agglomerations of particles on the flake confirm that the features are MoO₂ nanoparticles. FIG. 11D is the corresponding brightfield TEM image, and shows a few layered flake of the sample, with dark regions that are agglomerated TMO nanoparticles. FIG. 11A is the SAED line scan, and FIG. 11B, confirms measured spatial frequency and atomic spacings corresponding to graphitic or graphene and α-GmO in-plane spacings.

FIG. 11E shows representative IR data with features characteristic of glucose and GmO-based materials. The IR measurement is a macroscopic measurement of milligrams of material, while the microscopic TEM can detect microscopic fingerprints. The IR spectrum includes several additional signatures for glucose in addition to the characteristic features for inhomogeneously incorporated TMO and GmO: 1) comparatively sharp absorption lines just below 1,000 cm⁻¹ typical for Mo—O vibrations in an MoO₃ bonding configuration; 2) broad features in the region of 1250 cm⁻¹ typical for C—O—C type vibrations; and 3) derivative-like features around 1700 cm⁻¹ indicative of defective sp2 C—C vibrations.

This example is significant because it shows that renewable biogenic sources of carbon, in the form of sugar, can be used as cheaper and greener feedstock that produces the desired compositions of matter.

Example 9. Organometallic TM Powder as Alternative to Produce GmGT Materials Using organometalic powder as TM Source to create GmGT(I)-X (Sample 6.12 in Table 5): GO Suspension 1.1 (25 mL) from Table 1 was combined with 128 mg of dry C₁₀H₁₄MoO₆ powder (Powder 2.6 from Table 2) and 375 mL water to probe the utility of organometallic Mo TM source. Magnetic stirring is used for 3-4 min at room temperature and the solution was dried in a borosilicate glass tray for 24 hours at 52° C. The dried matter was scraped, chopped into 5-10 mm sized flakes and loaded at 5.8 mg/cm² in an alumina coated tantalum boat with a lid. The covered material load was heated resistively in high vacuum at a starting base pressure of 2×10⁻⁶ torr with variable heating rates in different temperature windows. The heating rate approaching and departing $T_m$, the 230±45° C. temperature of maximum mass loss, was symmetrically low at 0.1° C./min, and the final annealing was done for 4 hours at temperature $T_f$=780±20° C. The time to reach $T_f$ from $T_m$ is 15 hrs 45 min.

FIG. 12 shows data collected for GmGT(I)-X made according to Sample 6.12 in Table 5. The rings evident in the SAED pattern shown in FIG. 12C are characteristic of the G and GmO components of GmGT(I)-X material. It indicates that the G and GmO-components of the composite GmGT(I)-X material is crystalline in nature with a multitude of smaller orientational domains as indicated by the smoothness of the diffraction rings. There is no detectable diffraction feature that could be associated with regions of crystalline TM compounds. FIG. 12D is the corresponding brightfield TEM image and shows the shows the compact flake-like nature of the material. FIG. 12A is the TEM line scan, and FIG. 12B confirms measured spatial frequency and atomic spacings corresponding to α-GmO and graphitic or graphene in-plane spacings. There is no evidence for crystalline TM particles present in this area of the sample, which is characteristic of GmGT(I)-X materials.

FIG. 12E shows representative IR data with typical fingerprint features characteristic of GmGT(I)-X materials: 1) broad features in the region of 1250 cm⁻¹ typical for C—O—C type vibrations; and 2) derivative-like features around 1700 cm⁻¹ indicative of defective sp2 C—C vibrations.

This example is significant because it shows that an organanometallic TM source combined with the carbon containing solution is proven as another path to produce GmGT(I)-X, as evidenced by the fingerprints observed in the TEM and IR data.

Example 10. Using Hydrogen Peroxide as Additive to GO Carbon Source (Sample 6.13 in Table 5): Suspension 1.8 (336 mL) from Table 1 contains commercial GO and H₂O₂. It was combined with 50 mL of Solution 2.1 from Table 2 and 50 mL of deionized distilled water. Magnetic stirring was used for 3-4 min at room temperature and the solution was dried in a borosilicate glass tray for 24 hours at 52° C. The dried matter was scraped, chopped into 5-10 mm sized flakes, and loaded at 13 mg/cm² into an alumina coated tantalum boat with a lid. The covered material load was heated resistively in high vacuum at a starting base pressure of 2×10⁻⁶ torr with variable heating rates in different temperature windows. The heating rate approaching and departing $T_m$, the 230±45° C. temperature of maximum mass loss, was symmetrically slow at 0.1° C./min, and the final annealing was done for 10 min at temperature $T_f$=705±20° C. The time to reach $T_f$ from $T_m$ was 20 hrs 50 min.

FIG. 13 shows data collected for GmGT(I)-X, made according to Sample 6.13 in Table 5. The rings evident in the SAED pattern shown in FIG. 13C are characteristic of the G and GmO components of GmGT(I)-X material. It indicates that the G and GmO-components of the composite GmGT (I)-X material is crystalline in nature with a multitude of smaller orientational domains as indicated by the smoothness of the diffraction rings. There is no detectable diffraction feature that could be associated with regions of crystalline TM compounds. FIG. 13D is the corresponding brightfield TEM image and shows the shows the compact flake-like nature of the material. A few regions of darker patches in the image could be evidence of slight precipitation of TMO particles. FIG. 13A is the SAED line scan, and FIG. 13B confirms measured spatial frequency and atomic spacings corresponding to α-GmO and graphitic or graphene in-plane spacings. There is little to no evidence for crystalline TM particles present in this area of the sample, which is characteristic of GmGT(I)-X materials.

FIG. 13E shows representative IR data with typical fingerprint features characteristic of GmGT(I)-X materials: 1) broad features in the region of 1250 cm$^{-1}$ typical for C—O—C type vibrations; and 2) derivative-like features around 1700 cm$^{-1}$ indicative of defective sp2 C—C vibrations. This example is significant because it shows that an oxidizing agent added to the standard process of record is proven as another path to produce GmGT(I)-X, as evidenced by the fingerprints observed in the TEM and IR data, and could be used in conjunction with reducing agents in a two-step process to chemically passivate (reducing agent) followed by an oxidizing step to provide the necessary oxygen or tailored oxygen functionals on GO to enable GmGT production.

Example 11. Acetic Acid after Mixing M2/C2

Characterization of the material described in Sample 6.14 of Table 5, is contained in FIG. 14 that shows data collected for GmGT(I)-X. The rings evident in the SAED pattern shown in FIG. 14C are characteristic of the G and GmO components of GmGT(I)-X material. It indicates that the G and GmO-components of the composite GmGT(I)-X material is crystalline in nature with a multitude of smaller orientational domains as indicated by the smoothness of the diffraction rings. There are minority diffraction features (isolated spots at spatial frequencies that do not correspond to G or α-GmO spacings) that are associated with regions of nanocrystalline MoO$_2$. FIG. 14C is the corresponding brightfield TEM image, and shows the compact flake-like nature of the material where a few isolated small crystals can be observed. FIG. 14A is the SAED line scan, and FIG. 14B confirms measured spatial frequency and atomic spacings corresponding to α-GmO and graphitic or graphene in-plane spacings.

FIG. 14E shows representative IR data with typical fingerprint features characteristic of GmGT(I)-X materials: 1) broad features in the region of 1250 cm$^{-1}$ typical for C—O—C type vibrations; and 2) derivative-like features around 1700 cm$^{-1}$ indicative of defective sp2 C—C vibrations.

This example is significant because it shows that adding an acid to the mixture of starting carbon/TM material in the standard process of record (essentially adjusting pH with an additive acid) is proven as another path to produce GmGT(I)-X, as evidenced by the fingerprints observed in the TEM and IR data. Similar results are obtained when the pH is adjusted to the basic side of neutral by addition of ammonium hydroxide.

Example 12. Using GmGT(II)-A as Additive Active Anode Material in Pouch Lithium Ion Battery Cells In a specific working example, the material is an anode slurry comprising 94% active material; either pure graphite or a 97:3 (by mass) mixture of graphite and silicon in the case of control cells, or a 90:10 mixture of graphite and GmGT(II)-A material or an 87:3:10 mixture of graphite, silicon, and GmGT(II)-A material. Inactive materials included in the slurry were 3% carbon black, which is a standard conductive agent for graphite, and 3% total water-based binder (1.5% sodium carboxymethyl cellulose, 1.5% styrene butadiene rubber). Slurries were mixed in an ultrasonic mixer. The anode slurry was cast on 12 μm Cu foil and dried. Electrode foils were calendared and cut to size for coin and pouch cell builds. In half cells, the material was punched to size for CR2032 coin cells. In 200-mAh pouch batteries, the anodes being tested were paired with lithium nickel cobalt aluminum oxide (NCA) cathodes cast on 20 μm aluminum foil. The active cathode and anode slurries were made from binders and carbon black, spread onto aluminum and copper foils (respectively), and allowed to dry. The cathode thickness was greater than that of the anode (because the cathode has a lower specific capacity), but the length and width of the cathode was typically smaller than those of the anode. The N:P ratio used was 1.1; the capacity of the anode was in excess compared to that of the cathode to prevent lithium deposition on the anode surface. The sizes were chosen based on the theoretical capacity of NCA and the empirical capacity of the GmGT(II)-A material (determined through half-cell testing). After the electrodes were dried overnight, they were transferred to a dry lab and were assembled into pouch batteries. At this stage, electrolyte was added, and the pouches were sealed.

Example 13. GmGT Materials as Active Anode Materials in Lithium Metal Half Cells Electrodes may also be made using mix and coat techniques with specific examples described in Table 13. For example, a slurry dispersion of roughly 50% solids and a viscosity of about 6450 mPa was made using a FlackTek planetary centrifugal mixer. The resulting dispersion is simply coated onto a suitable electrode substrate material using conventional methods (e.g., drop coating, dip coating, spray coating, etc.) The resulting electrodes exhibited good electronic behavior and had uniform physical characteristics, e.g., limited number of large particles, very few or no pin holes, rendering this a drop-in replacement for graphite in current commercial processes.

In one embodiment these GmO-based materials have improved performance when compared to expanded graphite with TMO nanoparticles, prGO with TMO nanoparticles, expanded graphite, and prGO as an electrode opposite a Li metal electrode. In general, cell builds for charge-storage devices can be tuned for optimal performance characteristics by adjusting, for example, anode formulations, cathode choice, electrolyte formulations, electrode loadings, and/or combinations thereof.

To demonstrate improved performance of these inventive materials, a variety of electrode formulations with GmGT materials with standard electrolytes and Li metal were compared to half cells assembled with electrodes formulated with various carbon-based materials or carbon and TMO combined materials. The electrodes exhibit desirable performance when incorporated into electrochemical cells (See Table 13).

TABLE 13

Material specific capacity and Coulombic efficiency at various rates and cycle life.

| | | Process Perturbations | | | | |
|---|---|---|---|---|---|---|
| | GmGT(I) and (II) | GmGT(I)-X made with a renewable feedstock | GmGT(I)-X made with a spray-dried intermediate | GmGT(I)-X annealed in an inert environment | GmGT(I)-X made using a powdered TM source | GmGT(I)-X made using high-concentration feedstock |
| First Lithiation Specific Capacity (mAh/g) | 1163 ± 11 | 948 ± 35 | 1137 ± 82 | 825 ± 31 | 908 ± 21 | 913 ± 20 |
| First Cycle Coulombic Efficiency | 60.4 ± 1.0% | 50.5 ± 0.2% | 54.8 ± 0.8% | 54.6 ± 0.7% | 72.8 ± 0.5% | 68.5 ± 1.1% |
| Reversible Specific Capacity at the end of Formation (mAh/g) | 626 ± 40 | 427 ± 16 | 582 ± 43 | 432 ± 15 | 650 ± 14 | 604 ± 14 |
| Second Cycle Coulombic Efficiency | 97.5 ± 1.3% | 91.0 ± 0.1% | 90.3 ± 1.0% | 92.7 ± 0.5% | 102.1 ± 0.7% | 101.4 ± 1.5% |
| 1st C/3 Charge Specific Capacity (mAh/g) | 520 | 332 | 441 | 320 | 545 | 504 |
| 10th C/3 Charge Specific Capacity (mAh/g) | 448 | 239 | 380.9 | 279 | 489 | 405 |
| C/3 Coulombic Efficiency (Cycle 10) | 98.7 | 97.4 | 98.1 | 98.8 | 99.3 | 99 |
| 1st 1C Charge Specific Capacity (mAh/g) | 416 | N/A | N/A | 201.67 | 468 | 405 |
| 20th 1C Charge Specific Capacity (mAh/g) | 354 | N/A | N/A | 198.92 | 370 | 305 |
| 1C Coulombic Efficiency (Cycle 20) | 99 | N/A | N/A | 98.6 | 98.4 | 100.2 |
| 1st 10C Charge Specific Capacity (mAh/g) | 199 | 30 | 119.1 | 1.04 | 267 | 180 |
| 50th 10C Charge Specific Capacity (mAh/g) | 114 | 28 | 101.3 | 0.21 | 120 | 109 |
| 10C Coulombic Efficiency (Cycle 50) | 99.6 | 94 | 101.8 | 0 | 100.2 | 100.1 |

| | Control Perturbations | | | |
|---|---|---|---|---|
| | Pre-GmGT(I) | Thermally-reduced GO | prGO + TMO | EG + TMO |
| First Lithiation Specific Capacity (mAh/g) | 1090 ± 25 | 877 ± 105 | 645 ± 43 | 487 ± 12 |
| First Cycle Coulombic Efficiency | 47.3 ± 0.5% | 54.6 ± 1.2% | 67.4 ± 3.8% | 77.3 ± 1.0% |

TABLE 13-continued

Material specific capacity and Coulombic efficiency at various rates and cycle life.

| | | | | |
|---|---|---|---|---|
| Reversible Specific Capacity at the end of Formation (mAh/g) | 449 ± 11 | 444 ± 46 | 416 ± 18 | 386 ± 8 |
| Second Cycle Coulombic Efficiency | 86.9 ± 0.3% | 96.7 ± 1.2% | 100.1 ± 1.9% | 104.6 ± 1.6% |
| 1st C/3 Charge Specific Capacity (mAh/g) | 370 | N/A | 359 | 152 |
| 10th C/3 Charge Specific Capacity (mAh/g) | 240 | N/A | 334 | 353 |
| C/3 Coulombic Efficiency (Cycle 10) | 97 | N/A | 98.3 | 101.2 |
| 1st 1C Charge Specific Capacity (mAh/g) | 252 | 309 | 289 | 71 |
| 20th 1C Charge Specific Capacity (mAh/g) | 170 | 261 | 258 | 308 |
| 1C Coulombic Efficiency (Cycle 20) | 94.1 | 99.6 | 97.9 | 99.7 |
| 1st 10C Charge Specific Capacity (mAh/g) | 26 | 34 | 229 | 27 |
| 50th 10C Charge Specific Capacity (mAh/g) | 12 | 42 | 167 | 24 |
| 10C Coulombic Efficiency (Cycle 50) | 95.8 | 98 | 99.4 | 99.7 |

| | Commercial Controls | | |
|---|---|---|---|
| | Gr | prGO | EG |
| First Lithiation Specific Capacity (mAh/g) | 360 ± 9 | 1594 ± 68 | 439 ± 19 |
| First Cycle Coulombic Efficiency | 84.9 ± 1.8% | 31.9 ± 0.7% | 75.3 ± 4.4% |
| Reversible Specific Capacity at the end of Formation (mAh/g) | 313 ± 13 | 407 ± 12 | 366 ± 16 |
| Second Cycle Coulombic Efficiency | 97.1 ± 1.0% | 83.5 ± 0.7% | 101.42 ± 1.0% |
| 1st C/3 Charge Specific Capacity (mAh/g) | 72 | 313 | 163 |
| 10th C/3 Charge Specific Capacity (mAh/g) | 161 | 228 | 338 |
| C/3 Coulombic Efficiency (Cycle 10) | 99.5 | 98.1 | 100.37 |
| 1st 1C Charge Specific Capacity (mAh/g) | 30 | 234 | 64 |
| 20th 1C Charge Specific Capacity (mAh/g) | 57 | 184 | 123 |
| 1C Coulombic Efficiency (Cycle 20) | 92.3 | 98.4 | 99.9 |
| 1st 10C Charge Specific Capacity (mAh/g) | 3 | 120 | 5 |
| 50th 10C Charge Specific Capacity (mAh/g) | 3 | 109 | 14 |
| 10C Coulombic Efficiency (Cycle 50) | 95.2 | 99.4 | 100 |

Anode half-cells were tested to evaluate how material synthesis perturbations impacted battery performance, with comparison to commercial and lab-made controls. Materials were tested in CR2032 coin cells were active anode material was varied (Table 13), the counter electrode was lithium metal, the separator was Celgard, and the electrolyte was 1.0M $LiPF_6$ in 2:4:4 EC:DEC:DMC.

Formation and cycling procedures were kept consistent across sets. Cell performance is summarized in Table 13, where the first cycle and reversible lithiation capacities specify how much lithium is consumed during formation on the first lithiation and second delithation, respectively; the first and second cycle coulombic efficiency report the percentage of lithiation capacity retained during delithiation during the first and second formation cycles, respectively. Similarly, the specific capacities and coulombic efficiencies are reported for each material under varying charge/discharge rates at different points during cycle life.

Materials tested included GmGT materials; Gr, prGO, and expanded graphite (EG) commercial controls; control materials prepared in the lab by adding the TMO to the commercial prGO, commercial EG, and processing similarly to GmGT materials; and lab-synthesized pre-GmGT(I) and in-house thermally rGO as other controls. Each of these controls demonstrated the necessity of a particular step in the process of record, indicating that all steps are necessary to attain GmGT performance in batteries, and commercial controls performed differently than GmGT in half-cells.

Results from half-cells with commercial prGO+ TMO and EG+ TMO showed that a starting GO with high oxygen-content, rather than rGO or Gr, was required for the process, even with the addition of the TMO. Half-cells containing lab-made thermally rGO without TMO showed that the heating profile alone yielded battery performance inferior to that of GmGT, and therefore the TM source is a necessary component in material synthesis. Pre-GmGT(I), heated only to about 245° C. in an oven, also yielded inferior battery performance compared to GmGT, demonstrating that the final high-temperature annealing steps in the process of record are necessary to attain GmGT battery performance.

Two varieties of GmGT were tested as additives to graphite in anode half-cells, comprising 10% of the active material, with graphite comprising the other 90%. Both GmGT(II)-X and GmGT(I)-A showed distinct performance enhancement of pure graphite when used as a 10% additive.

Material processing perturbations to various steps of the synthesis process impacted battery performance. When GmGT(I)-X was made using renewable feedstock, all performance measures were lower than for the baseline material blend. When the intermediate material was spray-dried in the process of making GmGT(I)-X, this was comparable to materials created with a temperature-controlled environment. When GmGT(I)-X was annealed in an inert environment, half-cell performance deviated from that of the standard blend in a preliminary round of testing. In particular, this material did not function at 10C. Alternative: Two perturbations that significantly increased ICE while maintaining material specific capacity at rates beyond formation were GmGT(I)-X made using a powdered catalyst and GmGT(I)-X made using a high-concentration starting GO source.

Example 14. Synthesis of GmO-Based Materials Substantially Free of TM Components To synthesize metal-free or substantially metal-free GmO-based materials, one can start with material GmGT (I)-X obtained through any of the appropriate synthesis routes detailed in Tables 4 or 5 and further process the material to remove the TM component from the product material. For example, GmGT material could be treated under flowing nitrogen gas that contains a partial pressure of chlorine gas as known in the art, or other reactive gas like hydrogen, while heating it at a temperature around 800° C. Alternatively, solid GmGT(I)-X material can be suspended in a solvent that will dissolve the TM species present therein. Possible solvents could include water and alcohols (e.g. methanol, ethanol, propanol, isopropanol, and the like). A pH adjustment of the aqueous solvent could also be utilized to increase transition metal solubility and possibly alter the oxidation state of the transition metal to preferably dissolve it in solution. Further oxidation of the transition metal oxide by gentle heating in any combination of oxidizing (e.g. oxygen or air) or reducing (e.g. $H_2$, $N_2H_4$) atmosphere prior to removal by standard washing as a means of increasing the solubility of the TM component could also be utilized.

Example 15. Synthesis of GmGT(I)-X Material in the Presence of Sn

Suspension 1.7, Table 1 was mixed with Solution 2.1, Table 2 in volumetric proportion of 100 mL and 80 mL, respectively. The mixture was processed according to known processes that produce GmGT(I)-X material, closely typified by the columns corresponding to Samples 3.0 and 4.1 in Tables 3 and 4, respectively, with the significant difference that the material mixture was dried over 6 days at room temperature in a Sn-cured silicone tray. The final product material thus synthesized was GmGT(I)-X material where the α-GmO component was significantly stronger (as observed by SAED, not shown here) than typical processing absent of drying in the Sn-cured silicone tray. EDS measurements indicated significant Sn "impurities" that were later determined to have leached into the mixture as it dried. This is an example where a reactive tray can provide a metal oxide that is beneficial for the formation of the product material.

As disclosed above, it is believed that the TM component of GmGT material synthesis offers a multivalent metal cation to coordinate oxygen interactions on the carbon material, and that this is a key enabling feature of obtaining the desired material from the described processing steps. TMO materials naturally provide this feature as multiple oxidation states are one of their hallmarks. It is possible that the Sn in this example performed a similar role being a metal oxide having multiple oxidation states, either by itself, or in concert, with the Mo-based TMO that was intentionally delivered to the synthesis route. As a general feature, therefore, this example suggests other non-TM material sources could be used instead of, or in addition to, the TM source otherwise disclosed herein. Possible candidates outside of transition metals include, but are not limited to, Al, Si, or Sn. It has not escaped our attention that the metal oxide component could be precipitated for improved battery performance delivering high specific capacity.

Example 16. Synthesis of GmGT(I)-X Material in the Presence of δ-GmO Constrained Structure Synthesis according to Sample 4.7 of Table 4 shows distinct SAED (not shown here) diffraction signatures consistent with δ-GmO constrained structure, with measured peaks at 0.38 Å$^{-1}$, 0.66 Å$^{-1}$ and 0.77 Å$^{-1}$. These peak positions are consistent with the theoretical predicted positions in Table 6. This example illustrates that additional GmO crystal structures and their associated chemical moieties can be tailored by combined selection of carbon and TM sources.

What is claimed is:

1. A composite material comprising:
   multiple orientational domains of graphitic sheets; and
   domains of graphene monoxide, wherein at least a portion of oxygen molecules present in the graphene monoxide are incorporated into structures having chemical moieties selected from the group consisting of 1,3 dioxetane rings, 1,5-dioxa-cyclooctane rings, 1,4,7-trioxa-cyclononane rings, (3,5,8,10)-tetraoxa-(1,6)-cyclodecadiene rings, and polycarbonyl chains.

2. The composite material of claim 1, wherein the chemical moieties comprise atomically ordered chemical moieties in one or more crystalline phases of two-dimensional graphene monoxide crystal structures having a carbon-to-oxygen atomic ratio of about 1:1.

3. The composite material of claim 2, wherein interatomic lattice spacings for the crystal structures display electron diffraction or x-ray diffraction signatures at 0.38-0.40 Å$^{-1}$ and 0.63-0.68 Å$^{-1}$.

4. The composite material of claim 3, further comprising at least one transition metal oxide.

5. The composite material of claim 4, wherein the transition metal oxide comprises a transition metal selected from the group consisting of Ti, V, Cr, Zr, Nb, Mo, Fe, Co, Ni, Hf, Ta, and W.

6. The composite material of claim 4, wherein interatomic lattice spacings for the crystal structures display electron diffraction or x-ray diffraction signatures at 0.38-0.40 Å$^{-1}$ and 0.63-0.68 Å$^{-1}$.

7. The composite material of claim 6, wherein interatomic lattice spacings for structures within the composite material display carbon-oxygen vibrational peaks between about 1,000 $cm^{-1}$ and 1,500 $cm^{-1}$ and between about 1,550 $cm^{-1}$ and 1,650 $cm^{-1}$ in infrared spectroscopy.

8. The composite material of claim 3, having a Brunauer-Emmett-Teller (BET) surface area between 1-50 $m^2/g$.

9. The composite material of claim 4, wherein: the graphene monoxide is crystalline or amorphous and the transition metal oxide is amorphous and distributed substantially homogeneously throughout the composite material, or is present in the composite material as nanocrystals that are detectable by electron diffraction or x-ray diffraction.

10. The composite material of claim 1, further comprising lithium ions or lithium atoms intercalated or adsorbed onto the graphene monoxide.

11. The composite material of claim 10, wherein the lithium ions or lithium atoms are present in a ratio from $Li_2C_2O_2$ to $LiC_{50}O_{50}$ with respect to carbon and oxygen atoms of the chemical moieties in the graphene monoxide.

12. An electrode comprising a composite material comprising:

multiple orientational domains of graphitic sheets; and
domains of graphene monoxide, wherein at least a portion of oxygen molecules present in the graphene monoxide are incorporated into structures having chemical moieties selected from the group consisting of 1,3 dioxetane rings, 1,5-dioxa-cyclooctane rings, 1,4,7-trioxa-cyclononane rings, (3,5,8,10)-tetraoxa-(1,6)-cyclodecadiene rings, and polycarbonyl chains.

13. The electrode of claim 12, wherein the composite material further comprises at least one transition metal oxide.

14. The electrode of claim 12, wherein the composite material further comprises graphite, silicon, a binder, or a combination thereof.

15. A charge-storage device comprising an electrode comprising:

multiple orientational domains of graphitic sheets; and
domains of graphene monoxide, wherein at least a portion of oxygen molecules present in the graphene monoxide are incorporated into structures having chemical moieties selected from the group consisting of 1,3 dioxetane rings, 1,5-dioxa-cyclooctane rings, 1,4,7-trioxa-cyclononane rings, (3,5,8,10)-tetraoxa-(1,6)-cyclodecadiene rings, and polycarbonyl chains.

16. The charge-storage device of claim 15, wherein the electrode further comprises at least one transition metal oxide.

17. The charge-storage device of claim 16, wherein the charge-storage device exhibits a monotonically decreasing potential versus specific capacity curve.

18. The charge-storage device of claim 15, wherein the charge-storage device is a lithium-ion battery or a sodium-ion battery.

* * * * *